United States Patent
Wang et al.

(10) Patent No.: US 7,555,044 B2
(45) Date of Patent: Jun. 30, 2009

(54) FREQUENCY COEFFICIENT SCANNING PATHS FOR CODING DIGITAL VIDEO CONTENT

(75) Inventors: Limin Wang, San Diego, CA (US); Yue Yu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 856 days.

(21) Appl. No.: 10/679,911

(22) Filed: Oct. 6, 2003

(65) Prior Publication Data

US 2004/0131119 A1 Jul. 8, 2004

Related U.S. Application Data

(60) Provisional application No. 60/416,139, filed on Oct. 4, 2002.

(51) Int. Cl.
*H04N 7/12* (2006.01)
*H04N 11/02* (2006.01)

(52) U.S. Cl. .............................. 375/240.18; 375/240.2

(58) Field of Classification Search ...............
375/240.01–240.07, 240.12–240.16, 240.26
See application file for complete search history.

(56) References Cited

U.S. PATENT DOCUMENTS

| | | | | |
|---|---|---|---|---|
| 6,408,029 B1 * | 6/2002 | McVeigh et al. | ....... | 375/240.13 |
| 6,512,791 B1 * | 1/2003 | Takayama | .............. | 375/240.01 |
| 6,647,061 B1 * | 11/2003 | Panusopone et al. | ... | 375/240.12 |
| 6,671,319 B1 * | 12/2003 | Chang et al. | ........... | 375/240.16 |
| 6,968,091 B2 * | 11/2005 | Faibish et al. | ................ | 382/251 |
| RE39,318 E * | 10/2006 | Nishi et al. | ............ | 375/240.13 |
| 7,173,970 B2 * | 2/2007 | Boyce et al. | ........... | 375/240.15 |
| 2004/0131119 A1 * | 7/2004 | Wang et al. | ............ | 375/240.12 |

* cited by examiner

*Primary Examiner*—David Czekaj
(74) *Attorney, Agent, or Firm*—Larry T. Cullen

(57) ABSTRACT

A method and system of transform-based encoding, decoding, and bitstream generation of digital video content is disclosed. The digital video content comprises a stream of pictures, slices, or macroblocks which can each be intra, predicted or bi-predicted pictures. The pictures, slices, or macroblocks comprise blocks of pixels. The method and system comprises scanning frequency coefficients from each of the block's two dimensional array of frequency coefficients in a manner that is vertically biased, producing a one dimensional array of frequency coefficients. The method and system also provide for scanning/assigning frequency coefficients from a one dimensional array of frequency coefficients, producing a two dimensional array of frequency coefficients.

67 Claims, 9 Drawing Sheets

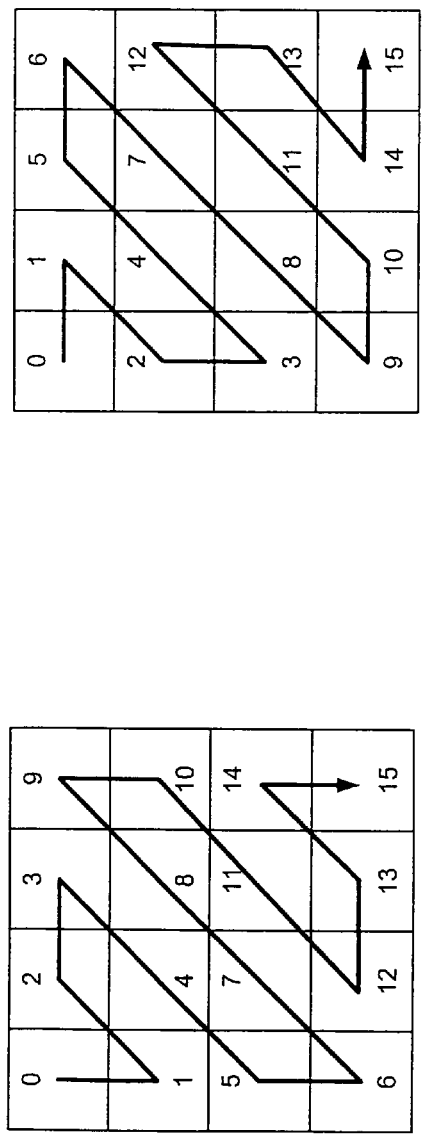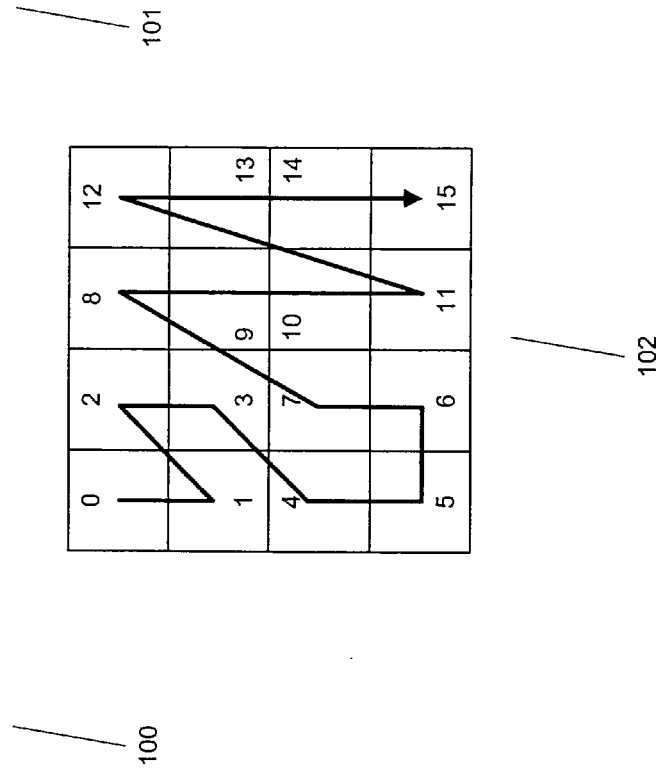
**Fig. 1
(Prior Art)**

|  |  |  |  |
|---|---|---|---|
| 12 | 13 | 14 | 15 |
| 8 | 9 | 10 | 11 |
| 2 | 5 | 6 | 7 |
| 0 | 1 | 3 | 4 |

Fig. 6

| | | | | | | | |
|---|---|---|---|---|---|---|---|
| 20 | 21 | 22 | 27 | 28 | 29 | 30 | 31 |
| 12 | 13 | 14 | 19 | 23 | 24 | 25 | 26 |
| 4 | 5 | 6 | 11 | 15 | 16 | 17 | 18 |
| 0 | 1 | 2 | 3 | 7 | 8 | 9 | 10 |

Fig. 7

| 26 | 29 | 30 | 31 |
|---|---|---|---|
| 22 | 25 | 27 | 28 |
| 18 | 21 | 23 | 24 |
| 14 | 17 | 19 | 20 |
| 10 | 13 | 15 | 16 |
| 6 | 9 | 11 | 12 |
| 2 | 5 | 7 | 8 |
| 0 | 1 | 3 | 4 |

Fig. 8

| 52 | 53 | 58 | 59 | 60 | 61 | 62 | 63 |
|---|---|---|---|---|---|---|---|
| 38 | 45 | 46 | 51 | 54 | 55 | 56 | 57 |
| 30 | 37 | 39 | 44 | 47 | 48 | 49 | 50 |
| 22 | 29 | 31 | 36 | 40 | 41 | 42 | 43 |
| 15 | 21 | 23 | 28 | 32 | 33 | 34 | 35 |
| 8 | 14 | 16 | 20 | 24 | 25 | 26 | 27 |
| 3 | 4 | 7 | 9 | 13 | 17 | 18 | 19 |
| 0 | 1 | 2 | 5 | 6 | 10 | 11 | 12 |

Fig. 9

FREQUENCY COEFFICIENT SCANNING PATHS FOR CODING DIGITAL VIDEO CONTENT

CROSS-REFERENCE TO RELATED APPLICATION

This application is related to U.S. Provisional Patent Application 60/416,139, filed on Oct. 4, 2002, from which priority is claimed.

FIELD OF THE INVENTION

The present invention relates to digital video encoding, decoding, and bitstream generation. More specifically, the present invention relates to scanning paths in transform-based coding as used in MPEG-4 Part 10 Advanced Video Coding/H.264, for example.

BACKGROUND OF THE INVENTION

Video compression is used in many current and emerging products. It is at the heart of digital television set-top boxes ("STB"), digital satellite systems ("DSS"), high definition television ("HDTV") decoders, digital versatile disk ("DVD") players, video conferencing, Internet video and multimedia content, and other digital video applications. Without video compression, the number of bits required to represent digital video content can be extremely large, making it difficult or even impossible for the digital video content to be efficiently stored, transmitted, and/or viewed.

The digital video content comprises a stream of pictures that can be displayed as an image on a television receiver, computer monitor, or other electronic device capable of displaying digital video content. A picture that is displayed in time before a particular picture is in the "backward direction" in relation to the particular picture. Likewise, a picture that is displayed in time after a particular picture is in the "forward direction" in relation to the particular picture.

Video compression is accomplished in a video encoding, or coding, process in which each picture is encoded as either a frame or as two fields. Each frame comprises a number of lines of spatial information. For example, a frame may contain 480 horizontal lines. Each field contains half the number of lines in the frame. For example, if the frame comprises 480 horizontal lines, each field comprises 240 horizontal lines. In a typical configuration, one of the fields comprises the odd numbered lines in the frame and the other field comprises the even numbered lines in the frame. The field that comprises the odd numbered lines will be referred to as the "top" field hereinafter and in the appended claims, unless otherwise specifically denoted. Likewise, the field that comprises the even numbered lines will be referred to as the "bottom" field hereinafter and in the appended claims, unless otherwise specifically denoted. The two fields can be interlaced together to form an interlaced frame.

The general idea behind video coding is to remove data from the digital video content that is "non-essential." The decreased amount of data then requires less bandwidth for broadcast or transmission of the representation of the original signal.

After the compressed (encoded) video data has been transmitted, it must be decoded, or decompressed. In this process, the transmitted video data is processed to generate approximation data that is substituted into the video data to replace the "non-essential" data that was removed in the above-mentioned coding process.

Thus, video coding transforms the digital video content into a compressed form that can be stored using less space and transmitted using less bandwidth than uncompressed digital video content. It does so by taking advantage of temporal and spatial redundancies in the pictures of the video content. The resultant digital video content can then be stored in a storage medium such as a hard drive, DVD, or some other non-volatile storage unit.

There are numerous video coding methods that compress the digital video content. Consequently, video coding standards have been developed to standardize the various video coding methods so that the compressed digital video content is rendered in formats that a majority of video encoders and decoders can recognize. For example, the Motion Picture Experts Group ("MPEG") and International Telecommunication Union ("ITU-T") have developed video coding standards that are in wide use today. Examples of these standards include the MPEG-1, MPEG-2, MPEG-4, ITU-T H.261, and ITU-T H.263 standards. However, with the current increased demand for higher resolutions, more complex graphical content, and faster transmission time, there exist a need for better video compression methods. To this end, a new video coding standard is currently being developed. This new video coding standard is called the MPEG-4 Part 10 Advanced Video Coding (AVC)/H.264 standard.

Most modern video coding standards, including the MPEG-4 Part 10 AVC/H.264 standard, are based in part on a temporal prediction with a motion compensation ("MC") algorithm and a transform domain coding algorithm. Temporal prediction with motion compensation is used to remove temporal redundancy between successive pictures in a digital video broadcast. The temporal prediction with motion compensation algorithm typically utilizes one or two reference pictures to encode a particular picture. Thus, by comparing the particular picture that is to be encoded with one of the reference pictures, the temporal prediction with motion compensation algorithm can take advantage of the temporal redundancy that exists between the reference picture and the particular picture that is to be encoded, and encode the picture with a higher amount of compression than if the picture were encoded without using the temporal prediction with motion compensation algorithm. One of the reference pictures is in the backward direction in relation to the particular picture that is to be encoded. The other reference picture is in the forward direction in relation to the particular picture that is to be encoded.

Transform domain coding is used to remove spatial redundancy within each picture or temporally predicted residual picture. A residual picture is the difference between a picture and a picture that is temporally predicted from that picture. Each picture or temporally predicted residual picture comprises a number of blocks of pixels. Each block refers to an N by M group of pixels where N refers to the number of columns of pixels in the block and M refers to the number of rows of pixels in the block. Each block in the picture or temporally predicted residual picture is represented by an N by M array of luminance and chrominance coefficients which correspond to each pixel in the blocks' N by M grid of pixels. Each luminance coefficient represents the brightness level, or luminance, of its corresponding pixel. Each block in the picture or temporally predicted residual picture is also represented by an N by M array of chrominance coefficients which correspond to each pixel in the blocks' N by M grid of pixels. Each chrominance coefficient represents the color content, or chrominance, of its corresponding pixel. The term "picture" will be used hereinafter and in the appended claims, unless otherwise specifically denoted, to mean either a picture or a temporally predicted residual picture.

Most pictures have smooth color variations, with the fine details being represented as sharp edges in between the smooth variations. The smooth variations in color can be termed as low frequency variations and the sharp variations as high frequency variations. The smooth variations in color, or low frequency components of the picture, constitute the base of an image, and the edges which give detail to the picture, or the high frequency components, add upon the smooth variations in color to refine the picture. The combination of the low and high frequency components results in a detailed image.

Typically, the values of the luminance coefficients only vary slightly between the most of the pixels in a particular picture. Consequentially, in many pictures, most pixels contain more of the low frequency component than the high frequency component. In other words, most of the energy of a signal containing the digital video content lies at low frequencies.

Transform domain coding takes advantage of the fact that most of the energy of a signal containing the digital video content lies at low frequencies. Transform domain coding transforms the luminance coefficients in each N by M array from the spatial domain to the frequency domain. The transformed N by M array comprises coefficients which represent energy levels in the frequency domain. As used hereinafter and in the appended claims, unless otherwise denoted, the coefficients of the transformed N by M array will be referred to as "frequency coefficients." Once the luminance coefficients have been transformed into frequency coefficients, various compression techniques can then be performed on the contents of picture in the frequency domain that would otherwise be impossible to perform in the spatial domain.

The N by M array of frequency coefficients is two dimensional and must be converted into a one dimensional array of frequency coefficients so that the encoder or decoder can use the frequency coefficients to encode or decode the picture. The encoder generates the one dimensional array of frequency coefficients by scanning the two dimensional array of frequency coefficients using a particular scanning path. The scanning path refers to the order in which the frequency coefficients in the two dimensional array are scanned and output by the encoder into the one dimensional array.

A common scanning path that is used by an encoder to scan the frequency coefficients is a zig-zag scanning path. FIG. 1 illustrates two variations of zig-zag scanning paths that are currently used to scan a four by four array of frequency coefficients. As shown in FIG. 1, the first zig-zag scanning path 100 goes in a zig-zag order starting with an upper left coefficient (0) and ending with a lower right coefficient (15) of the array of frequency coefficients. The second zig-zag scanning path 101 is similar to the first in that it starts with the upper left coefficient (0) and ends with the lower right coefficient (15). However, as shown in FIG. 1, the two zig-zag scanning paths 100, 101 differ slightly in the order that the coefficients are scanned. FIG. 1 also shows one non-zig-zag scanning path 102 that is also prior art. Other prior art scanning paths for an 8 by 8 array of frequency coefficients can be found in MPEG-2 (Generic Coding of Moving Pictures and Associated Audio, Draft of International Standard, ISO/IEC 13818-2, March 1994).

It is preferable for the encoder to first scan the high-energy low frequency coefficients and then scan the low-energy high frequency coefficients. Scanning the low frequency coefficients before the high frequency coefficients places the low frequency coefficients before the high frequency coefficients in the resulting one dimensional array of coefficients. This particular order allows efficient coding and compression of the picture.

The zig-zag scanning path scans the two dimensional array of frequency coefficients without any significant bias towards the horizontal or vertical frequency directions. However, for interlaced material, energy tends to be concentrated along the vertical direction.

Thus, there is a need in the art for scanning paths that allow for more compression than do traditional zig-zag scanning paths. In particular, there is a need for a scanning path(s) which is biased in the vertical direction such that non-zero frequency coefficients would be captured first, thereby allowing for better compression efficiency.

SUMMARY OF THE INVENTION

An objective of the present invention is to provide a system and method which scans frequency coefficients in a manner which is biased in the vertical direction, thereby allowing for better digital video compression efficiency.

In order to achieve these objectives, as well as others which will become apparent in the disclosure below, in a first exemplary embodiment, the present invention provides a method of scanning frequency coefficients in a manner that is efficient for interlaced digital video content. The digital video content comprises a stream of pictures, slices, or macroblocks which can each be intra, predicted or bi-predicted pictures. The pictures, slices, or macroblocks comprise blocks of pixels in the configuration of a two dimensional array of two dimensional array frequency coefficients. The method of this exemplary embodiment comprises scanning each of the blocks of the two dimensional array of two dimensional array frequency coefficients in a manner that is vertically biased, thereby producing a one dimensional array of one dimensional array frequency coefficients. Further, the method of the present invention may alternatively scan one dimensional array frequency coefficients of a one dimensional array, coded in the vertically biased manner of the present invention, thereby producing a two dimensional array of two dimensional array frequency coefficients.

In a second exemplary embodiment, the present invention provides an encoder that scans frequency coefficients in a manner that is efficient for interlaced digital video content. The digital video content comprises a stream of pictures, slices, or macroblocks which can each be intra, predicted or bi-predicted pictures. The pictures, slices, or macroblocks comprise blocks of pixels in the configuration of a two dimensional array of two dimensional array frequency coefficients. The encoder scans each of the blocks of the two dimensional array of two dimensional array frequency coefficients in a manner that is vertically biased, thereby producing a one dimensional array of one dimensional array frequency coefficients.

In yet a third exemplary embodiment, the present invention provides a decoder that scans a one dimensional array of one dimensional array frequency coefficients and produces a two dimensional array of two dimensional array frequency coefficients in a manner that is efficient for interlaced digital video content. In this exemplary embodiment, the digital video content comprises a stream of pictures, slices, or macroblocks which can each be intra, predicted or bi-predicted pictures. The pictures, slices, or macroblocks comprise blocks of pixels in the configuration of a one dimensional array of one dimensional array frequency coefficients. The decoder scans one dimensional array frequency coefficients of a one dimensional array, coded in the vertically biased manner of the present invention, thereby producing a two dimensional array of two dimensional array frequency coefficients.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein:

FIG. 1 is prior art and illustrates two variations of zig-zag scanning paths and a non-zig-zag scanning path that are currently used to scan a four by four array of frequency coefficients;

FIG. 6 illustrates a preferable scanning path for a four by four pixel block's frequency coefficient array in accordance with an exemplary embodiment of the present invention;

FIG. 7 illustrates a preferable scanning path for a four by eight pixel block's frequency coefficient array in accordance with an exemplary embodiment of the present invention;

FIG. 8 illustrates a preferable scanning path for an eight by four pixel block's frequency coefficient array in accordance with an exemplary embodiment of the present invention.

FIG. 9 illustrates a preferable scanning path for an eight by eight pixel block's frequency coefficient array in accordance with an exemplary embodiment of the present invention.

Throughout the drawings, identical reference numbers designate similar, but not necessarily identical, elements.

DESCRIPTION OF A PRESENTLY PREFERRED EMBODIMENT

The present invention provides methods for scanning frequency coefficients from a two dimensional array of two dimensional frequency coefficients to produce a one dimensional array of one dimensional array frequency coefficients ("encoding scan"). The present invention also provides methods for scanning/assigning frequency coefficients from a one dimensional array of one dimensional frequency coefficients to produce a two dimensional array of two dimensional array frequency coefficients; the mirror image ("decoding scan"). Further, the present invention provides for an encoder and a decoder, featuring the encoding and decoding scans of the present invention, respectively. In addition, the present invention provides for systems containing both at least one encoder and at least one decoder which employ the encoding and decoding scans, respectively, e.g., transmission systems, transcoders, etc.

These methods can be used in any digital video coding algorithm. In particular, they can be implemented in the MPEG-4 Part 10 AVC/H.264 video coding standard.

As noted above, the MPEG-4 Part 10 AVC/H.264 standard is a new standard for encoding and compressing digital video content. The documents establishing the MPEG-4 Part 10 AVC/H.264 standard are hereby incorporated by reference, including the "Joint Final Committee Draft ("JFCD") of Joint Video Specification" issued on Aug. 10, 2002 by the Joint Video Team ("JVT"). (ITU-T Rec. H.264 & ISO/IEC 14496-10 AVC). The JVT consists of experts from MPEG and ITU-T. Due to the public nature of the MPEG-4 Part 10 AVC/H.264 standard, the present specification will not attempt to document all the existing aspects of MPEG-4 Part 10 AVC/H.264 video coding, relying instead on the incorporated specifications of the standard.

The systems, devices and methods of the present invention can be used in any general digital video coding algorithm or system requiring coefficient scanning. Further, the methods of the present invention can be modified and used to handle the extraction of frequency coefficients from a two dimensional array of two dimensional array frequency coefficients as best serves a particular standard or application.

Using the drawings, the following exemplary embodiments of the present invention will now be explained.

Figure 2:
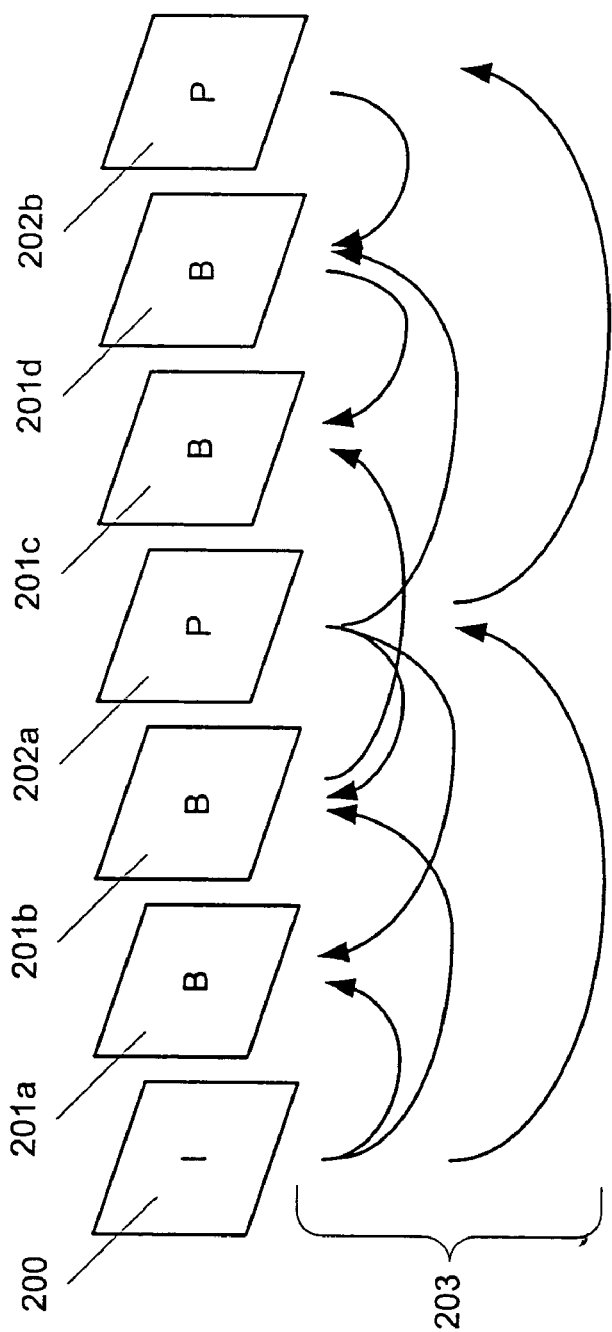
FIG. 2 illustrates an exemplary sequence of three types of pictures according to an embodiment of the present invention, as defined by an exemplary video coding standard such as the MPEG-4 Part 10 AVC/H.264 standard.

As shown in FIG. 2, there are preferably three types of pictures that can be used in the video coding method. Three types of pictures are defined to support random access to stored digital video content while exploring the maximum redundancy reduction using temporal prediction with motion compensation. The three types of pictures are intra ("I") pictures 200, predicted ("P") pictures 202*a-b*, and bi-predicted ("B") pictures 201*a-d*. An I picture 200 provides an access point for random access to stored digital video content. Intra pictures 200 are encoded without referring to reference pictures and can be encoded with moderate compression.

A P picture 202*a-b* is encoded using an I, P, or B picture that has already been encoded as a reference picture. The reference picture can be in either the forward or backward temporal direction in relation to the P picture that is being encoded. The predicted pictures 202*a-b* can be encoded with more compression than the I pictures 200.

A B picture 201*a-d* is encoded using two temporal reference pictures. In accordance with an exemplary embodiment of the present invention, the two temporal reference pictures can be in the same or different temporal direction in relation to the B picture that is being encoded. B pictures 201*a-d* can be encoded with the most compression out of the three picture types.

Reference relationships 203 between the three picture types are illustrated in FIG. 2. For example, the P picture 202*a* can be encoded using the encoded I picture 200 as its reference picture. The B pictures 201*a-d* can be encoded using the encoded I picture 200 and the encoded P pictures 202*a-b* as its reference pictures, as shown in FIG. 2. In accordance with an exemplary embodiment of the present invention, encoded B pictures 201*a-d* can also be used as reference pictures for other B pictures that are to be encoded. For example, the B picture 201*c* of FIG. 2 is shown with two other B pictures 201*b* and 201*d* as its reference pictures.

The number and particular order of the I 200, B 201*a-d*, and P 202*a-b* pictures shown in FIG. 2 are given as an exemplary configuration of pictures, but are not necessary to implement the present invention. Any number of I, B, and P pictures can be used in any order to best serve a particular application. The MPEG-4 Part 10 AVC/H.264 standard does not impose any limit to the number of B pictures between two reference pictures nor does it limit the number of pictures between two I pictures.

Figure 3:
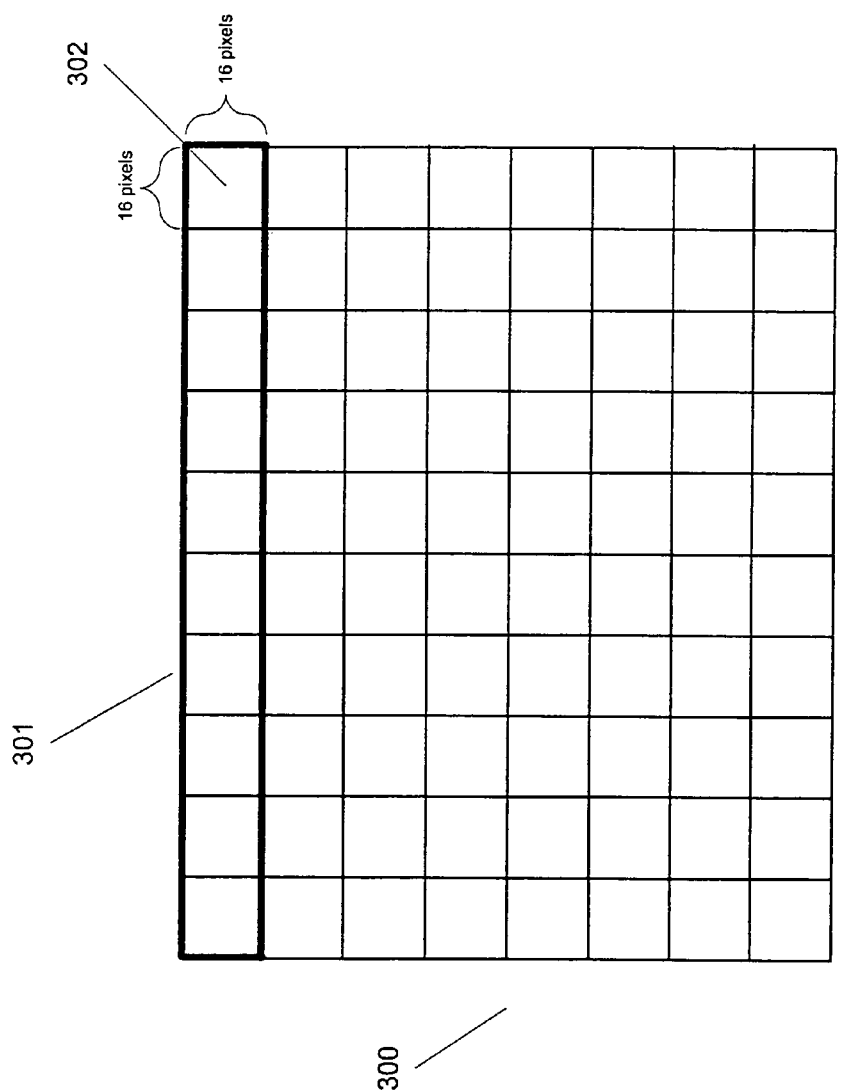
FIG. 3 illustrates that each picture is preferably divided into one or more slices consisting of macroblocks.

FIG. 3 shows that each picture 300 is preferably divided into slices consisting of macroblocks. A slice 301 is a group of macroblocks and a macroblock 302 is a rectangular group of pixels. As shown in FIG. 3, a preferable macroblock 302 size is 16 by 16 pixels.

Each interlaced picture, slice, or macroblock in a stream of pictures that is to be encoded can be encoded using adaptive frame/field ("AFF") coding. In AFF coding, each picture, slice, or macroblock in a stream of pictures that is to be encoded is encoded in either frame mode or in field mode, regardless of the encoding mode of the previous picture, slice, or macroblock. If a picture, slice, or macroblock is encoded in frame mode, the two fields that make up an interlaced frame are coded jointly. Conversely, if a picture, slice, or macroblock is encoded in field mode, the two fields that make up an interlaced frame are coded separately. The encoder determines which type of coding, frame mode coding or field mode coding, is more advantageous for each picture, slice, or macroblock and chooses that type of encoding for the picture, slice, or macroblock. The exact method of choosing between frame mode and field mode is not critical to the present invention and will not be detailed herein.

Figure 4:
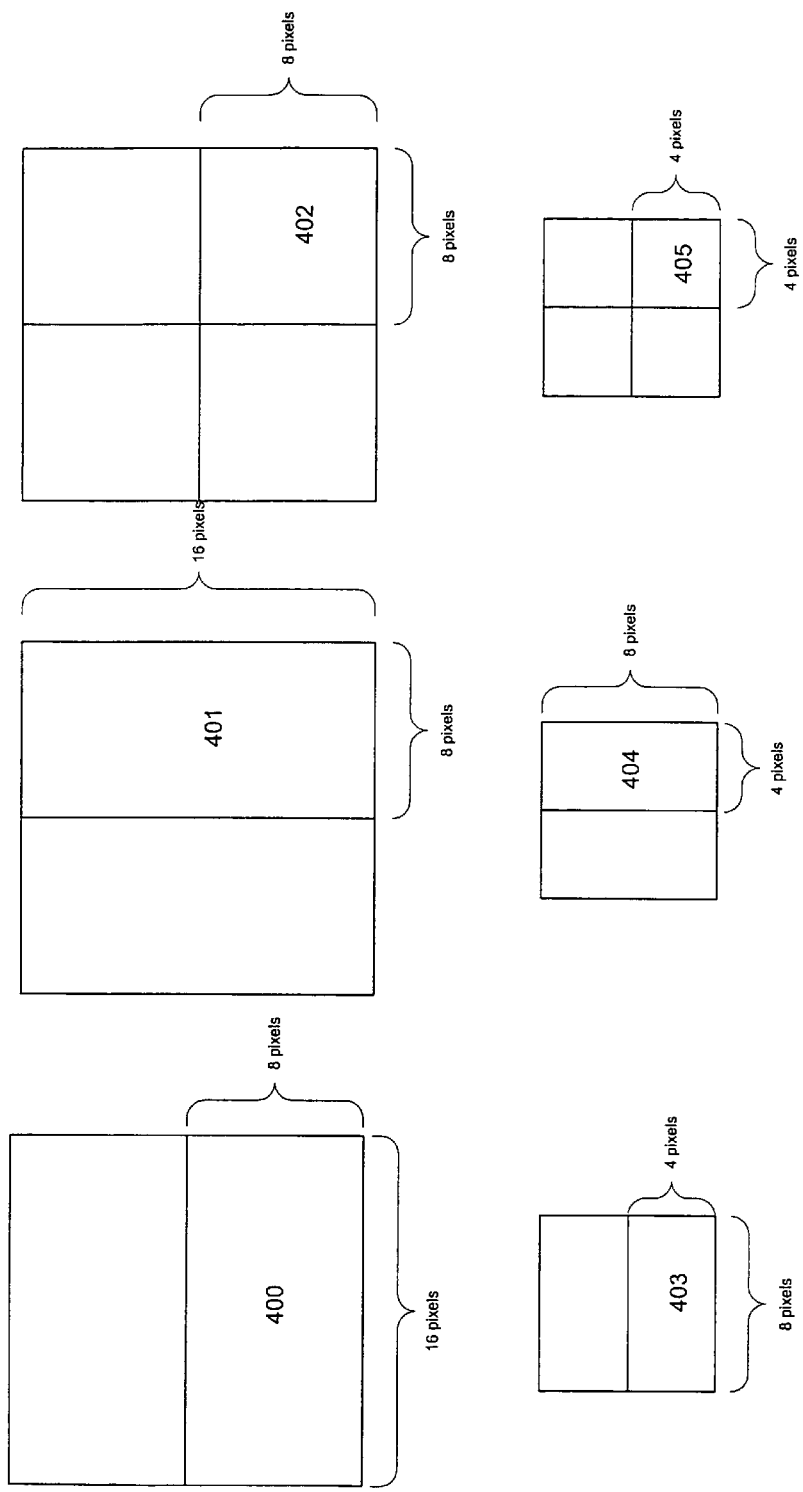
FIG. 4 illustrates that a macroblock can be further divided into smaller sized blocks.

FIG. 4 shows that a macroblock can be further divided into smaller sized blocks. For example, as shown in FIG. 4, a macroblock can be further divided into block sizes of 16 by 8 pixels 400, 8 by 16 pixels 401, or 8 by 8 pixels 402. A block size of 8 by 8 pixels 402 can be further subdivided into block sizes of 8 by 4 pixels 403, 4 by 8 pixels 404, or 4 by 4 pixels 405.

A picture that is to be encoded using transform domain coding can sometimes be encoded with better picture quality or more compression efficiency if the transform domain coding is performed on the smaller block sizes of FIG. 4 rather than on the macroblock itself. Some digital video coding algorithms allow for variable block size transforms. Variable block size transform coding means that the transform domain coding can be performed on blocks of varying sizes. For example, transform domain coding can be performed on 4 by 4 pixel blocks 405 for a particular macroblock and on 4 by 8 pixel blocks 404 for a different macroblock. Transform domain coding on the following block sizes can be implemented in accordance with an exemplary embodiment of the present invention: 4 by 4 pixels 405, 8 by 4 pixels 403, 4 by 8 pixels 404, and 8 by 8 pixels 402.

Figure 5:
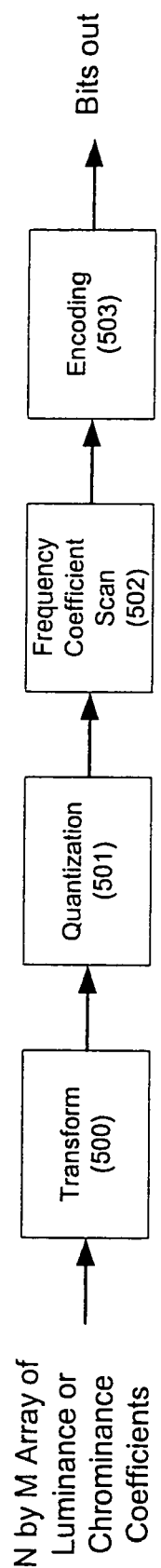
FIG. 5 illustrates a preferable method of transform domain coding in accordance with an exemplary embodiment of the present invention.

FIG. 5 illustrates a preferable method of transform domain coding in accordance with an exemplary embodiment of the present invention. As shown in FIG. 5, a transform 500 is performed on a block's N by M array of luminance or chrominance coefficients. The N by M array of luminance or chrominance coefficients comprises the coefficients that represent the luminance or chrominance of the pixels in the N by M block. The N by M array of luminance or chrominance coefficients can be a 4 by 4 array, 4 by 8 array, 8 by 4 array, or an 8 by 8 array in accordance with this exemplary embodiment of the present invention.

The discrete cosine transform ("DCT") is an example of a transform and is similar to the discrete Fourier transform. The DCT transforms the N by M array of luminance or chrominance coefficients from the spatial domain to the frequency domain. The general equation for a two dimensional, N by M, DCT can be defined by the following equation:

$$F(u, v) = \left(\frac{2}{N}\right)^{\frac{1}{2}} \left(\frac{2}{M}\right)^{\frac{1}{2}} \sum_{i=0}^{N-1} \sum_{j=0}^{M-1} \Lambda(i) \cdot \Lambda(j) \cdot \cos\left[\frac{\pi \cdot u}{2 \cdot N}(2i+1)\right] \cos\left[\frac{\pi \cdot v}{2 \cdot M}(2J+1)\right] \cdot f(i, j)$$

where $\Lambda(\xi) = \begin{cases} \frac{1}{\sqrt{2}} & \text{for } \xi = 0 \\ 1 & \text{otherwise.} \end{cases}$ In the above equations, f (i, j) represents the luminance or chrominance value of the pixel in column i and row j of the N by M array of luminance coefficients. F(u, v) is the corresponding frequency coefficient in column u and row v in the N by M array of frequency coefficients. For most images, much of the signal energy lies at low frequencies. In general, the low frequency coefficients appear in the upper left corner of the N by M array of frequency coefficients. The high frequency coefficients usually appear in the lower right corner of the N by M array of frequency coefficients.

After the luminance or chrominance coefficients have been converted to frequency coefficients by the transform 500, the frequency coefficients are quantized 501, as shown in FIG. 5. Quantization 501 is performed on the frequency coefficients so that the number of bits that must be encoded is reduced. This allows for more compression.

One example of the quantization process 501 consists of dividing each F(u, v) by a constant, q(u, v). A table of q(u, v) is called a quantization table. An exemplary, but not exclusive, quantization table for an 8 by 8 array of frequency coefficients is shown in Table 1 below:

TABLE 1

Eight by eight quantization table

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 36 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Similar quantization tables can be constructed for the other sizes of the N by M frequency coefficient array. As shown in exemplary quantization table, the constants that divide each F(u, v) are larger in value in the lower right corner of the quantization table than they are in the upper left corner. An important result of the quantization process is that many of the high frequency coefficients are quantized to a value of zero.

Returning to FIG. 5, the quantized frequency coefficients are scanned 502 by the encoder to convert them from a two dimensional array of quantized frequency coefficients to a one dimensional array of quantized frequency coefficients. Preferable scanning paths will be described in more detail in connection with FIGS. 6-9 below.

After the quantized frequency coefficients have been scanned into the one dimensional array, they can be encoded 503, as shown in FIG. 5. An exemplary encoding 503 process preferably encodes the quantized frequency coefficients in the one dimensional array into a sequence of run-level pairs. The run is defined as the distance between two non-zero quantized frequency coefficients in the one dimensional array. The level is the non-zero value immediately following a sequence of zeros. This type of coding produces a compact representation of the quantized frequency coefficients because a large number of the quantized coefficients have a value of zero. The run-level pairs can be further compressed using entropy coding. One method of entropy coding is described in detail in the MPEG-4 Part 10 AVC/H.264 standard. MPEG-4 Part 10 AVC/H.264 also uses context-adaptive binary arithmetic coding ("CABAC").

Preferable scanning paths for scanning the frequency coefficients in the two dimensional array into a one dimensional array of frequency coefficients (encoding scan) will now be explained in connection with FIGS. 6-9. An ideal scanning path in any block size would group all the non-zero quantized frequency coefficients together in the one dimensional array followed by all the quantized frequency coefficients that have values of zero. However, in practice, a preferable scanning path can only group together a majority of non-zero quantized frequency coefficients. For interlaced material, the non-zero quantized frequency coefficients tend to be concentrated along the vertical direction and a vertically biased scanning path may be preferable.

FIGS. 6-9 show preferable scanning path orders for a 4 by 4 pixel block, 4 by 8 pixel block, 8 by 4 pixel block, and an 8 by 8 pixel block, respectively. In the following descriptions, $n=0, 1, \ldots, N-1$, where n is a variable that represents the pixel column number in the block as well as the corresponding frequency coefficient column number in the corresponding frequency coefficient array. N is the total number of pixel columns in the block and the total number of frequency coefficient columns in the frequency coefficient array. The left-most column number is 0 and the right-most column number is $N-1$. Likewise, $m=0, 1, \ldots, M-1$, where m is a variable that represents the pixel row number in the block as well as the corresponding frequency coefficient row number in the corresponding frequency coefficient row number in the corresponding frequency coefficient array. M is the total number of pixel rows in the block and the total number of frequency coefficient rows in the frequency coefficient array. The top row number is 0 and the bottom row number is M-1. The scanning paths of FIGS. 6-9 are skewed, or biased, in the vertical direction and result in more compression than traditional zig-zag scanning paths in many applications, including interlaced video encoding.

Figure 6:
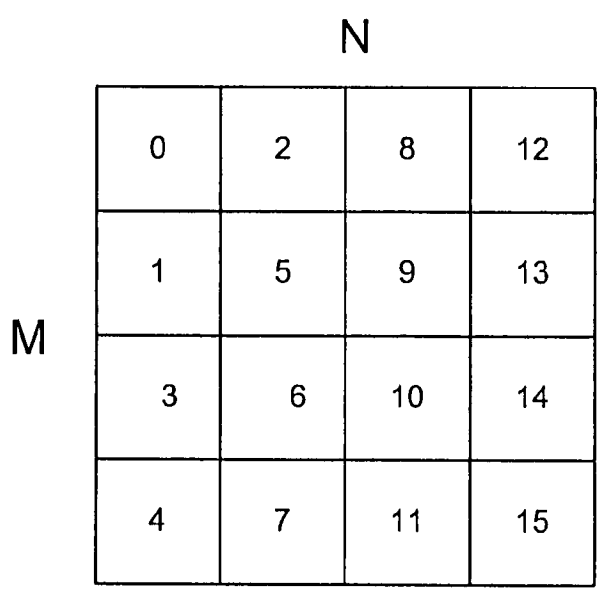

FIG. 6 shows a preferable scanning path for a 4 by 4 pixel block's frequency coefficient array, where N=4 and M=4. The numbers in FIG. 6 represent the frequency coefficient scanning order. For example, the frequency coefficient corresponding to the top left pixel is the first frequency coefficient to get scanned and is thus labeled with a 0. The frequency coefficient corresponding to the bottom right pixel is the last frequency coefficient to get scanned and is thus labeled with a 15. Table 2 lists the frequency coefficient scanning order and the corresponding values for n and m.

TABLE 2

Four by four pixel block scanning order

| Frequency Coefficient Scanning Order | n | m |
|---|---|---|
| 0 | 0 | 0 |
| 1 | 0 | 1 |
| 2 | 1 | 0 |
| 3 | 0 | 2 |
| 4 | 0 | 3 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |
| 12 | 3 | 0 |
| 13 | 3 | 1 |
| 14 | 3 | 2 |
| 15 | 3 | 3 |

FIG. 7 shows a preferable scanning path for a 4 by 8 pixel block's frequency coefficient array, where N=4 and M=8. The numbers in FIG. 7 represent the frequency coefficient scanning order. For example, the frequency coefficient corresponding to the top left pixel is the first frequency coefficient to get scanned and is thus labeled with a 0. The frequency coefficient corresponding to the bottom right pixel is the last frequency coefficient to get scanned and is thus labeled with a 31. Table 3 lists the frequency coefficient scanning order and the corresponding values for n and m.

TABLE 3

Four by eight pixel block scanning order

| Frequency Coefficient Scanning Order | n | m |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 0 | 4 |
| 8 | 0 | 5 |
| 9 | 0 | 6 |
| 10 | 0 | 7 |
| 11 | 1 | 3 |
| 12 | 2 | 0 |
| 13 | 2 | 1 |
| 14 | 2 | 2 |
| 15 | 1 | 4 |
| 16 | 1 | 5 |
| 17 | 1 | 6 |
| 18 | 1 | 7 |
| 19 | 2 | 3 |
| 20 | 3 | 0 |
| 21 | 3 | 1 |
| 22 | 3 | 2 |
| 23 | 2 | 4 |
| 24 | 2 | 5 |
| 25 | 2 | 6 |
| 26 | 2 | 7 |
| 27 | 3 | 3 |
| 28 | 3 | 4 |
| 29 | 3 | 5 |
| 30 | 3 | 6 |
| 31 | 3 | 7 |

FIG. 8 shows a preferable scanning path for an 8 by 4 pixel block's frequency coefficient array, where N=8 and M=4. The numbers in FIG. 8 represent the frequency coefficient scanning order. For example, the frequency coefficient corresponding to the top left pixel is the first frequency coefficient to get scanned and is thus labeled with a 0. The frequency coefficient corresponding to the bottom right pixel is the last frequency coefficient to get scanned and is thus labeled with a 31. Table 4 lists the frequency coefficient scanning order and the corresponding values for n and m.

TABLE 4

Eight by four pixel block scanning order

| Frequency Coefficient Scanning Order | n | m |
|---|---|---|
| 0 | 0 | 0 |
| 1 | 0 | 1 |
| 2 | 1 | 0 |
| 3 | 0 | 2 |
| 4 | 0 | 3 |
| 5 | 1 | 1 |
| 6 | 2 | 0 |
| 7 | 1 | 2 |
| 8 | 1 | 3 |
| 9 | 2 | 1 |
| 10 | 3 | 0 |
| 11 | 2 | 2 |
| 12 | 2 | 3 |
| 13 | 3 | 1 |
| 14 | 4 | 0 |
| 15 | 3 | 2 |
| 16 | 3 | 3 |
| 17 | 4 | 1 |
| 18 | 5 | 0 |
| 19 | 4 | 2 |
| 20 | 4 | 3 |
| 21 | 5 | 1 |
| 22 | 6 | 0 |
| 23 | 5 | 2 |
| 24 | 5 | 3 |
| 25 | 6 | 1 |
| 26 | 7 | 0 |
| 27 | 6 | 2 |
| 28 | 6 | 3 |
| 29 | 7 | 1 |
| 30 | 7 | 2 |
| 31 | 7 | 3 |

FIG. 9 shows a preferable scanning path for an 8 by 8 pixel block's frequency coefficient array, where N=8 and M=8. The numbers in FIG. 9 represent the frequency coefficient scanning order. For example, the frequency coefficient corresponding to the top left pixel is the first frequency coefficient to get scanned and is thus labeled with a 0. The frequency coefficient corresponding to the bottom right pixel is the last frequency coefficient to get scanned and is thus labeled with a 63. Table 5 lists the frequency coefficient scanning order and the corresponding values for n and m.

TABLE 5

Eight by eight pixel block scanning order

| Frequency Coefficient Scanning Order | n | m |
|---|---|---|
| 0 | 0 | 0 |
| 1 | 0 | 1 |
| 2 | 0 | 2 |
| 3 | 1 | 0 |
| 4 | 1 | 1 |
| 5 | 0 | 3 |
| 6 | 0 | 4 |
| 7 | 1 | 2 |
| 8 | 2 | 0 |
| 9 | 1 | 3 |
| 10 | 0 | 5 |
| 11 | 0 | 6 |
| 12 | 0 | 7 |
| 13 | 1 | 4 |
| 14 | 2 | 1 |
| 15 | 3 | 0 |
| 16 | 2 | 2 |
| 17 | 1 | 5 |
| 18 | 1 | 6 |
| 19 | 1 | 7 |
| 20 | 2 | 3 |
| 21 | 3 | 1 |
| 22 | 4 | 0 |
| 23 | 3 | 2 |
| 24 | 2 | 4 |
| 25 | 2 | 5 |
| 26 | 2 | 6 |
| 27 | 2 | 7 |
| 28 | 3 | 3 |
| 29 | 4 | 1 |
| 30 | 5 | 0 |
| 31 | 4 | 2 |
| 32 | 3 | 4 |
| 33 | 3 | 5 |
| 34 | 3 | 6 |
| 35 | 3 | 7 |
| 36 | 4 | 3 |
| 37 | 5 | 1 |
| 38 | 6 | 0 |
| 39 | 5 | 2 |
| 40 | 4 | 4 |
| 41 | 4 | 5 |
| 42 | 4 | 6 |
| 43 | 4 | 7 |
| 44 | 5 | 3 |
| 45 | 6 | 1 |
| 46 | 6 | 2 |
| 47 | 5 | 4 |
| 48 | 5 | 5 |
| 49 | 5 | 6 |
| 50 | 5 | 7 |
| 51 | 6 | 3 |
| 52 | 7 | 0 |
| 53 | 7 | 1 |
| 54 | 6 | 4 |
| 55 | 6 | 5 |
| 56 | 6 | 6 |
| 57 | 6 | 7 |
| 58 | 7 | 2 |
| 59 | 7 | 3 |
| 60 | 7 | 4 |
| 61 | 7 | 5 |
| 62 | 7 | 6 |
| 63 | 7 | 7 |

The above-described scanning paths relate to methods of encoding scans (see definition above) in accordance with the present invention. Such scanning paths may be implemented in an encoder in accordance with the present invention.

As illustrated above, the 4 by 4, 4 by 8, 8 by 4, and 8 by 8 pixel block encoding scans produce a one dimensional array of 16, 32, 32, or 64 one dimensional array frequency coefficients, respectively. Similarly, the scanning/assignment paths for decoding (method of decoding scans) for each one dimensional array of 16, 32, 32, and 64 frequency coefficients is the mirror image of the encoding scanning paths for the 4 by 4, 4 by 8, 8 by 4, and 8 by 8 pixel blocks, respectively. For the preferred decoding scan embodiments described below, one dimensional array frequency coefficients are denoted by the variable "P".

In particular, in accordance with the present invention a preferred scanning path/assignment for a one dimensional array of 16 frequency coefficients, where a 4 by 4 two dimensional array of frequency coefficients is desired, is effectuated by assigning two dimensional frequency coefficients values (N, M) for each P value (frequency coefficient) in the one dimensional in the numerical sequential order of P value, as illustrated below in Table 6.

TABLE 6

1 D of 16 P to four by four pixel block scanning/assignment order

| p | n | m |
|---|---|---|
| 0 | 0 | 0 |
| 1 | 0 | 1 |
| 2 | 1 | 0 |
| 3 | 0 | 2 |
| 4 | 0 | 3 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |
| 12 | 3 | 0 |
| 13 | 3 | 1 |
| 14 | 3 | 2 |
| 15 | 3 | 3 |

In accordance with the present invention a preferred scanning path/assignment for a one dimensional array of 32 frequency coefficients, where a 4 by 8 two dimensional array of frequency coefficients is desired, is effectuated by assigning two dimensional frequency coefficient values (N, M) for each P value (frequency coefficient) in the one dimensional array in the numerical sequential order of P value, as illustrated below in Table 7.

TABLE 7

1 D of 32 P to four by eight pixel block scanning/assignment order

| P | n | m |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 0 | 4 |
| 8 | 0 | 5 |
| 9 | 0 | 6 |
| 10 | 0 | 7 |
| 11 | 1 | 3 |
| 12 | 2 | 0 |
| 13 | 2 | 1 |
| 14 | 2 | 2 |
| 15 | 1 | 4 |
| 16 | 1 | 5 |
| 17 | 1 | 6 |
| 18 | 1 | 7 |
| 19 | 2 | 3 |
| 20 | 3 | 0 |
| 21 | 3 | 1 |
| 22 | 3 | 2 |
| 23 | 2 | 4 |
| 24 | 2 | 5 |
| 25 | 2 | 6 |
| 26 | 2 | 7 |

TABLE 7-continued

1 D of 32 P to four by eight pixel block scanning/assignment order

| P | n | m |
|---|---|---|
| 27 | 3 | 3 |
| 28 | 3 | 4 |
| 29 | 3 | 5 |
| 30 | 3 | 6 |
| 31 | 3 | 7 |

In accordance with the present invention a preferred scanning path/assignment for a one dimensional array of 32 frequency coefficients, where a 8 by 4 two dimensional array of frequency coefficients is desired, is effectuated by assigning two dimensional frequency coefficient values (N, M) for each P value (frequency coefficient) in the one dimensional array in the numerical sequential order of P value, as illustrated below in Table 8.

TABLE 8

1 D of 32 P to eight by four pixel block scanning/assignment order

| p | n | m |
|---|---|---|
| 0 | 0 | 0 |
| 1 | 0 | 1 |
| 2 | 1 | 0 |
| 3 | 0 | 2 |
| 4 | 0 | 3 |
| 5 | 1 | 1 |
| 6 | 2 | 0 |
| 7 | 1 | 2 |
| 8 | 1 | 3 |
| 9 | 2 | 1 |
| 10 | 3 | 0 |
| 11 | 2 | 2 |
| 12 | 2 | 3 |
| 13 | 3 | 1 |
| 14 | 4 | 0 |
| 15 | 3 | 2 |
| 16 | 3 | 3 |
| 17 | 4 | 1 |
| 18 | 5 | 0 |
| 19 | 4 | 2 |
| 20 | 4 | 3 |
| 21 | 5 | 1 |
| 22 | 6 | 0 |
| 23 | 5 | 2 |
| 24 | 5 | 3 |
| 25 | 6 | 1 |
| 26 | 7 | 0 |
| 27 | 6 | 2 |
| 28 | 6 | 3 |
| 29 | 7 | 1 |
| 30 | 7 | 2 |
| 31 | 7 | 3 |

In accordance with the present invention a preferred scanning path/assignment for a one dimensional array of 64 frequency coefficients, where a 8 by 8 two dimensional array of frequency coefficients is desired, is effectuated by assigning two dimensional frequency coefficient values (N, M) for each P value (frequency coefficient) in the one dimensional array in the numerical sequential order of P value, as illustrated below in Table 9.

TABLE 9

1 D of 32 P to four by eight pixel block scanning/assignment order

| p | n | m |
|---|---|---|
| 0 | 0 | 0 |
| 1 | 0 | 1 |
| 2 | 0 | 2 |
| 3 | 1 | 0 |
| 4 | 1 | 1 |
| 5 | 0 | 3 |
| 6 | 0 | 4 |
| 7 | 1 | 2 |
| 8 | 2 | 0 |
| 9 | 1 | 3 |
| 10 | 0 | 5 |
| 11 | 0 | 6 |
| 12 | 0 | 7 |
| 13 | 1 | 4 |
| 14 | 2 | 1 |
| 15 | 3 | 0 |
| 16 | 2 | 2 |
| 17 | 1 | 5 |
| 18 | 1 | 6 |
| 19 | 1 | 7 |
| 20 | 2 | 3 |
| 21 | 3 | 1 |
| 22 | 4 | 0 |
| 23 | 3 | 2 |
| 24 | 2 | 4 |
| 25 | 2 | 5 |
| 26 | 2 | 6 |
| 27 | 2 | 7 |
| 28 | 3 | 3 |
| 29 | 4 | 1 |
| 30 | 5 | 0 |
| 31 | 4 | 2 |
| 32 | 3 | 4 |
| 33 | 3 | 5 |
| 34 | 3 | 6 |
| 35 | 3 | 7 |
| 36 | 4 | 3 |
| 37 | 5 | 1 |
| 38 | 6 | 0 |
| 39 | 5 | 2 |
| 40 | 4 | 4 |
| 41 | 4 | 5 |
| 42 | 4 | 6 |
| 43 | 4 | 7 |
| 44 | 5 | 3 |
| 45 | 6 | 1 |
| 46 | 6 | 2 |
| 47 | 5 | 4 |
| 48 | 5 | 5 |
| 49 | 5 | 6 |
| 50 | 5 | 7 |
| 51 | 6 | 3 |
| 52 | 7 | 0 |
| 53 | 7 | 1 |
| 54 | 6 | 4 |
| 55 | 6 | 5 |
| 56 | 6 | 6 |
| 57 | 6 | 7 |
| 58 | 7 | 2 |
| 59 | 7 | 3 |
| 60 | 7 | 4 |
| 61 | 7 | 5 |
| 62 | 7 | 6 |
| 63 | 7 | 7 |

The above systems and methods may be implemented by many computer languages commonly known in the art and may operate on many computer platforms which include both volatile and non-volatile memory storage devices.

Although the invention has been described herein by reference to an exemplary embodiment thereof, it will be understood that such embodiment is susceptible of modification and variation without departing from the inventive concepts disclosed. All such modifications and variations, therefore, are intended to be encompassed within the spirit and scope of the appended claims.

We claim:

1. A method of transform-based encoding of digital video content, said digital video content comprising a stream of pictures, slices, or macroblocks, each of which are at least one of intra, predicted or bi-predicted pictures, slices, or macroblocks, in the form of blocks of pixels forming a two dimensional array of two dimensional array frequency coefficients including high-energy low frequency coefficients and low-energy high frequency coefficients, said method comprising:

scanning said two dimensional array frequency coefficients, from each of said blocks, in a manner that is vertically biased and producing a one dimensional array of one dimensional array frequency coefficients, wherein the high-energy low frequency coefficients are scanned before the low-energy high frequency coefficients; and wherein when said two dimensional array of said two dimensional array frequency coefficients comprises 4 columns of frequency coefficients and 4 rows of frequency coefficients, said method further comprises:

representing said columns with a variable n=0, 1, 2, or 3, wherein n=0 is at least one of a first or leftmost column, n=1 is a second column, n=2 is a third column, and n=3 is at least one of a fourth or rightmost column;

representing said rows with a variable m=0, 1, 2, or 3, wherein m=0 is at least one of a first or top row, m=1 is a second row, m=2 is a third row, and m=3 is at least one of a fourth or bottom row; and performing encoding of the digital video content by sequentially scanning said two dimensional array of said two dimensional array frequency coefficients in a sequential scanning order that is vertically biased, said sequential scanning order starting at 0 and ending at 15 and producing said one dimensional array of said one dimensional array frequency coefficients wherein said step of sequentially scanning said two dimensional array frequency coefficients in a vertically biased manner comprises:

assigning a scanning order =0 for a two dimensional array frequency coefficient located at n=0 and m=0;

assigning a scanning order =1 for a two dimensional array frequency coefficient located at n=0 and m=1;

assigning a scanning order =2 for a two dimensional array frequency coefficient located at n=1 and m=0;

assigning a scanning order =3 for a two dimensional array frequency coefficient located at n=0 and m=2;

assigning a scanning order =4 for a two dimensional array frequency coefficient located at n=0 and m=3 assigning a scanning order =5 for a two dimensional array frequency coefficient located at n=1 and m=1;

assigning a scanning order 6 for a two dimensional array frequency coefficient located at n=1 and m=2;

assigning a scanning order =7 for a two dimensional array frequency coefficient located at n=1 and m=3;

assigning a scanning order =8 for a two dimensional array frequency coefficient located at n=2 and m=0;
assigning a scanning order =9 for a two dimensional array frequency coefficient located at n=2 and m=1;
assigning a scanning order =10 for a two dimensional array frequency coefficient located at n=2 and m=2;
assigning a scanning order =11 for a two dimensional array frequency coefficient located at n=2 and m=3;
assigning a scanning order =12 for a two dimensional array frequency coefficient located at n=3 and m=0;
assigning a scanning order =13 for a two dimensional array frequency coefficient located at n=3 and m=1;
assigning a scanning order =14 for a two dimensional array frequency coefficient located at n=3 and m=2; and
assigning a scanning order =15 for a two dimensional array frequency coefficient located at n=3 and m=3.

2. The method of claim 1, wherein if said two dimensional array of said two dimensional array frequency coefficients comprises 4 columns of frequency coefficients and 8 rows of frequency coefficients, said method further comprises:
representing said columns with a variable n=0, 1, 2, or 3, wherein n=0 is at least one of a first or leftmost column, n=1 is a second column, n=2 is a third column, and n=3 is at least one of a fourth or rightmost column;
representing said rows with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row; and
sequentially scanning said two dimensional array of said two dimensional array frequency coefficients in a sequential scanning order that is vertically biased, said sequential scanning order starting at 0 and ending at 31 and producing said one dimensional array of said one dimensional array frequency coefficients.

3. The method of claim 2, wherein said step of sequential scanning said two dimensional array frequency coefficients in a vertically biased manner when said two dimensional array of said two dimensional array frequency coefficients comprises 4 columns of frequency coefficients and 8 rows of frequency coefficients comprises:
assigning a scanning order =0 for a two dimensional array frequency coefficient located at n=0 and m=0;
assigning a scanning order =1 for a two dimensional array frequency coefficient located at n=0 and m=1;
assigning a scanning order =2 for a two dimensional array frequency coefficient located at n=0 and m=2;
assigning a scanning order =3 for a two dimensional array frequency coefficient located at n=0 and m=3;
assigning a scanning order =4 for a two dimensional array frequency coefficient located at n=1 and m=0;
assigning a scanning order =5 for a two dimensional array frequency coefficient located at n=1 and m=1;
assigning a scanning order =6 for a two dimensional array frequency coefficient located at n=1 and m=2;
assigning a scanning order =7 for a two dimensional array frequency coefficient located at n=0 and m=4;
assigning a scanning order =8 for a two dimensional array frequency coefficient located at n=0 and m=5;
assigning a scanning order =9 for a two dimensional array frequency coefficient located at n=0 and m=6;
assigning a scanning order =10 for a two dimensional array frequency coefficient located at n=0 and m=7;
assigning a scanning order =11 for a two dimensional array frequency coefficient located at n=1 and m=3;
assigning a scanning order =12 for a two dimensional array frequency coefficient located at n=2 and m=0;
assigning a scanning order =13 for a two dimensional array frequency coefficient located at n=2 and m=1;
assigning a scanning order =14 for a two dimensional array frequency coefficient located at n=2 and m=2;
assigning a scanning order =15 for a two dimensional array frequency coefficient located at n=1 and m=4;
assigning a scanning order =16 for a two dimensional array frequency coefficient located at n=1 and m=5;
assigning a scanning order =17 for a two dimensional array frequency coefficient located at n=1 and m=6;
assigning a scanning order =18 for a two dimensional array frequency coefficient located at n=1 and m=7;
assigning a scanning order =19 for a two dimensional array frequency coefficient located at n=2 and m=3;
assigning a scanning order =20 for a two dimensional array frequency coefficient located at n=3 and m=0;
assigning a scanning order =21 for a two dimensional array frequency coefficient located at n=3 and m=1;
assigning a scanning order =22 for a two dimensional array frequency coefficient located at n=3 and m=2;
assigning a scanning order =23 for a two dimensional array frequency coefficient located at n=2 and m=4;
assigning a scanning order =24 for a two dimensional array frequency coefficient located at n=2 and m=5;
assigning a scanning order =25 for a two dimensional array frequency coefficient located at n=2 and m=6;
assigning a scanning order =26 for a two dimensional array frequency coefficient located at n=2 and m=7;
assigning a scanning order =27 for a two dimensional array frequency coefficient located at n=3 and m=3;
assigning a scanning order =28 for a two dimensional array frequency coefficient located at n=3 and m=4;
assigning a scanning order =29 for a two dimensional array frequency coefficient located at n=3 and m=5;
assigning a scanning order =30 for a two dimensional array frequency coefficient located at n=3 and m=6; and
assigning a scanning order =31 for a two dimensional array frequency coefficient located at n=3 and m=7.

4. The method of claim 3, wherein if said one dimensional array of said one dimensional array frequency coefficients comprises thirty-two one dimensional array frequency coefficients, wherein said thirty-two one dimensional array frequency coefficients are represented with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, in a numerical sequential order, wherein a first one dimensional array frequency coefficient is represented by p=0 and a thirty-second one dimensional array frequency coefficient is represented by p=31, said step of sequentially scanning said two dimensional array frequency coefficients in a vertically biased manner when said two dimensional array of said two dimensional array frequency coefficients comprises 4 columns of frequency coefficients and 8 rows of frequency coefficients further comprises:
assigning a one dimensional array frequency coefficient located at p=0 a value of said two dimensional array frequency coefficient located at n=0 and m=0;

assigning a one dimensional array frequency coefficient located at p=1 a value of said two dimensional array frequency coefficient located at n=0 and m=1;

assigning a one dimensional array frequency coefficient located at p=2 a value of said two dimensional array frequency coefficient located at n=0 and m=2;

assigning a one dimensional array frequency coefficient located at p=23 a value of said two dimensional array frequency coefficient located at n=0 and m=3;

assigning a one dimensional array frequency coefficient located at p=4 a value of said two dimensional array frequency coefficient located at n=1 and m=0;

assigning a one dimensional array frequency coefficient located at p=5 a value of said two dimensional array frequency coefficient located at n=1 and m=1;

assigning a one dimensional array frequency coefficient located at p=6 a value of said two dimensional array frequency coefficient located at n=1 and m=2;

assigning a one dimensional array frequency coefficient located at p=7 a value of said two dimensional array frequency coefficient located at n=0 and m=4;

assigning a one dimensional array frequency coefficient located at p=8 a value of said two dimensional array frequency coefficient located at n=0 and m=5;

assigning a one dimensional array frequency coefficient located at p=9 a value of said two dimensional array frequency coefficient located at n=0 and m=6;

assigning a one dimensional array frequency coefficient located at p=10 a value of said two dimensional array frequency coefficient located at n=0 and m=7;

assigning a one dimensional array frequency coefficient located at p=11 a value of said two dimensional array frequency coefficient located at n=1 and m=3;

assigning a one dimensional array frequency coefficient located at p=12 a value of said two dimensional array frequency coefficient located at n=2 and m=0;

assigning a one dimensional array frequency coefficient located at p=13 a value of said two dimensional array frequency coefficient located at n=2 and m=1;

assigning a one dimensional array frequency coefficient located at p=14 a value of said two dimensional array frequency coefficient located at n=2 and m=2;

assigning a one dimensional array frequency coefficient located at p=15 a value of said two dimensional array frequency coefficient located at n=1 and m=4;

assigning a one dimensional array frequency coefficient located at p=16 a value of said two dimensional array frequency coefficient located at n=1 and m=5;

assigning a one dimensional array frequency coefficient located at p=17 a value of said two dimensional array frequency coefficient located at n=3 and m=6;

assigning a one dimensional array frequency coefficient located at p=18 a value of said two dimensional array frequency coefficient located at n=1 and m=7;

assigning a one dimensional array frequency coefficient located at p=19 a value of said two dimensional array frequency coefficient located at n=2 and m=3;

assigning a one dimensional array frequency coefficient located at p=20 a value of said two dimensional array frequency coefficient located at n=3 and m=0;

assigning a one dimensional array frequency coefficient located at p=21 a value of said two dimensional array frequency coefficient located at n=3 and m=1;

assigning a one dimensional array frequency coefficient located at p=22 a value of said two dimensional array frequency coefficient located at n=3 and m=2;

assigning a one dimensional array frequency coefficient located at p=23 a value of said two dimensional array frequency coefficient located at n=2 and m=4;

assigning a one dimensional array frequency coefficient located at p=24 a value of said two dimensional array frequency coefficient located at n=2 and m=5;

assigning a one dimensional array frequency coefficient located at p=25 a value of said two dimensional array frequency coefficient located at n=2 and m=6;

assigning a one dimensional array frequency coefficient located at p=26 a value of said two dimensional array frequency coefficient located at n=2 and m=7;

assigning a one dimensional array frequency coefficient located at p=27 a value of said two dimensional array frequency coefficient located at n=3 and m=3;

assigning a one dimensional array frequency coefficient located at p=28 a value of said two dimensional array frequency coefficient located at n=3 and m=4;

assigning a one dimensional array frequency coefficient located at p=29 a value of said two dimensional array frequency coefficient located at n=3 and m=5;

assigning a one dimensional array frequency coefficient located at p=30 a value of said two dimensional array frequency coefficient located at n=3 and m=6; and assigning a one dimensional array frequency coefficient located at p=31 a value of said two dimensional array frequency coefficient located at n=3 and m=7.

5. The method of claim 1, wherein if said two dimensional array of said two dimensional array frequency coefficients comprises 8 columns of frequency coefficients and 4 rows of frequency coefficients, said method further comprises:

representing said columns with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column;

representing said rows with a variable m=0, 1, 2, or 3, wherein m=0 is at least one of a first or top row, m=1 is a second row, m=2 is a third row, and m=3 is at least one of a fourth or bottom row; and sequentially scanning said two dimensional array of said two dimensional array frequency coefficients in a sequential scanning order that is vertically biased, said sequential scanning order starting at 0 and ending at 31 and producing said one dimensional array of said one dimensional array frequency coefficients.

6. The method of claim 5, wherein said step of sequentially scanning said two dimensional array frequency coefficients in a vertically biased manner when said two dimensional array of said two dimensional array frequency coefficients comprises 8 columns of frequency coefficients and 4 rows of frequency coefficients comprises:

assigning a scanning order =0 for a two dimensional array frequency coefficient located at n=0 and m=0;

assigning a scanning order =1 for a two dimensional array frequency coefficient located at n=0 and m=1;

assigning a scanning order =2 for a two dimensional array frequency coefficient located at n=1 and m=0;

assigning a scanning order =3 for a two dimensional array frequency coefficient located at n=0 and m=2;

assigning a scanning order =4 for a two dimensional array frequency coefficient located at n=0 and m=3;

assigning a scanning order =5 for a two dimensional array frequency coefficient located at n=1 and m=1;

assigning a scanning order =6 for a two dimensional array frequency coefficient located at n=2 and m=0;

assigning a scanning order =7 for a two dimensional array frequency coefficient located at n=1 and m=2;
assigning a scanning order =8 for a two dimensional array frequency coefficient located at n=1 and m=3;
assigning a scanning order =9 for a two dimensional array frequency coefficient located at n=2 and m=1;
assigning a scanning order =10 for a two dimensional array frequency coefficient located at n=3 and m=0;
assigning a scanning order =11 for a two dimensional array frequency coefficient located at n=2 and m=2;
assigning a scanning order =12 for a two dimensional array frequency coefficient located at n=2 and m=3;
assigning a scanning order =13 for a two dimensional array frequency coefficient located at n=3 and m=1;
assigning a scanning order =14 for a two dimensional array frequency coefficient located at n=4 and m=0;
assigning a scanning order =15 for a two dimensional array frequency coefficient located at n=3 and m=2;
assigning a scanning order =16 for a two dimensional array frequency coefficient located at n=3 and m=3
assigning a scanning order =17 for a two dimensional array frequency coefficient located at n=4 and m=1;
assigning a scanning order =18 for a two dimensional array frequency coefficient located at n=5 and m=0;
assigning a scanning order =19 for a two dimensional array frequency coefficient located at n=4 and m=2;
assigning a scanning order =20 for a two dimensional array frequency coefficient located at n=4 and m=3;
assigning a scanning order =21 for a two dimensional array frequency coefficient located at n=5 and m=1;
assigning a scanning order =22 for a two dimensional array frequency coefficient located at n=6 and m=0;
assigning a scanning order =23 for a two dimensional array frequency coefficient located at n=5 and m=2;
assigning a scanning order =24 for a two dimensional array frequency coefficient located at n=5 and m=3;
assigning a scanning order =25 for a two dimensional array frequency coefficient located at n=6 and m=1;
assigning a scanning order =26 for a two dimensional array frequency coefficient located at n=7 and m=0;
assigning a scanning order =27 for a two dimensional array frequency coefficient located at n=6 and m=2;
assigning a scanning order =28 for a two dimensional array frequency coefficient located at n=6 and m=3;
assigning a scanning order =29 for a two dimensional array frequency coefficient located at n=7 and m=1;
assigning a scanning order =30 for a two dimensional array frequency coefficient located at n=7 and m=2; and
assigning a scanning order =31 for a two dimensional array frequency coefficient located at n=7 and m=3.

7. The method of claim 6 wherein if said one dimensional array of said one dimensional array frequency coefficients comprises thirty-two one dimensional array frequency coefficients, wherein said thirty-two one dimensional array frequency coefficients are represented with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31 in a numerical sequential order, wherein a first one dimensional array frequency coefficient is represented by p=0 and a thirty-second one dimensional array frequency coefficient is represented by p=31, said step of sequentially scanning said two dimensional array frequency coefficients in a vertically biased manner when said two dimensional array of said two dimensional array frequency coefficients comprises 8 columns of frequency coefficients and 4 rows of frequency coefficients further comprises:

assigning a one dimensional array frequency coefficient located at p=0 a value of said two dimensional array frequency coefficient located at n=0 and m=0;
assigning a one dimensional array frequency coefficient located at p=1 a value of said two dimensional array frequency coefficient located at n=0 and m=1;
assigning a one dimensional array frequency coefficient located at p=2 a value of said two dimensional array frequency coefficient located at n=1 and m=0;
assigning a one dimensional array frequency coefficient located at p=3 a value of said two dimensional array frequency coefficient located at n=0 and m=2;
assigning a one dimensional array frequency coefficient located at p=4 a value of said two dimensional array frequency coefficient located at n=0 and m=3;
assigning a one dimensional array frequency coefficient located at p=5 a value of said two dimensional array frequency coefficient located at n=1 and m=1;
assigning a one dimensional array frequency coefficient located at p=6 a value of said two dimensional array frequency coefficient located at n=2 and m=0;
assigning a one dimensional array frequency coefficient located at p=7 a value of said two dimensional array frequency coefficient located at n=1 and m=2;
assigning a one dimensional array frequency coefficient located at p=8 a value of said two dimensional array frequency coefficient located at n=1 and m=3;
assigning a one dimensional array frequency coefficient located at p=9 a value of said two dimensional array frequency coefficient located at n=2 and m=1;
assigning a one dimensional array frequency coefficient located at p=10 a value of said two dimensional array frequency coefficient located at n=3 and m=0;
assigning a one dimensional array frequency coefficient located at p=11 a value of said two dimensional array frequency coefficient located at n=2 and m=2;
assigning a one dimensional array frequency coefficient located at p=12 a value of said two dimensional array frequency coefficient located at n=2 and m=3;
assigning a one dimensional array frequency coefficient located at p=13 a value of said two dimensional array frequency coefficient located at n=3 and m=1;
assigning a one dimensional array frequency coefficient located at p=14 a value of said two dimensional array frequency coefficient located at n=4 and m=0;
assigning a one dimensional array frequency coefficient located at p=15 a value of said two dimensional array frequency coefficient located at n=3 and m=2;
assigning a one dimensional array frequency coefficient located at p=16 a value of said two dimensional array frequency coefficient located at n=3 and m=3;
assigning a one dimensional array frequency coefficient located at p=17 a value of said two dimensional array frequency coefficient located at n=4 and m=1;
assigning a one dimensional array frequency coefficient located at p=18 a value of said two dimensional array frequency coefficient located at n=5 and m=0;
assigning a one dimensional array frequency coefficient located at p=19 a value of said two dimensional array frequency coefficient located at n=4 and m=2;
assigning a one dimensional array frequency coefficient located at p=20 a value of said two dimensional array frequency coefficient located at n=4 and m=3;
assigning a one dimensional array frequency coefficient located at p=21 a value of said two dimensional array frequency coefficient located at n=5 and m=1;

assigning a one dimensional array frequency coefficient located at p=22 a value of said two dimensional array frequency coefficient located at n=6 and m=0;

assigning a one dimensional array frequency coefficient located at p=23 a value of said two dimensional array frequency coefficient located at n=5 and m=2;

assigning a one dimensional array frequency coefficient located at p=24 a value of said two dimensional array frequency coefficient located at n=5 and m=3;

assigning a one dimensional array frequency coefficient located at p=25 a value of said two dimensional array frequency coefficient located at n=6 and m=1;

assigning a one dimensional array frequency coefficient located at p=26 a value of said two dimensional array frequency coefficient located at n=7 and m=0;

assigning a one dimensional array frequency coefficient located at p=27 a value of said two dimensional array frequency coefficient located at n=6 and m=2;

assigning a one dimensional array frequency coefficient located at p=28 a value of said two dimensional array frequency coefficient located at n=6 and m=3;

assigning a one dimensional array frequency coefficient located at p=29 a value of said two dimensional array frequency coefficient located at n=7 and m=1;

assigning a one dimensional array frequency coefficient located at p=30 a value of said two dimensional array frequency coefficient located at n=7 and m=2; and assigning a one dimensional array frequency coefficient located at p=31 a value of said two dimensional array frequency coefficient located at n=7 and m=3.

8. The method of claim 1, wherein if said two dimensional array of said two dimensional array frequency coefficients comprises 8 columns of frequency coefficients and 8 rows of frequency coefficients, said method further comprises:

representing said columns with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column;

representing said rows with a variable m=0, 1, 2, 3, 4, 5, 6, 7, or 8, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row; and sequentially scanning said two dimensional array of said two dimensional array frequency coefficients in a sequential scanning order that is vertically biased, said sequential scanning order starting at 0 and ending at 63 and producing said one dimensional array of said one dimensional array frequency coefficients.

9. The method of claim 8, wherein said step of sequentially scanning said two dimensional array frequency coefficients in a vertically biased manner when said two dimensional array of said two dimensional array frequency coefficients comprises 8 columns of frequency coefficients and 8 rows of frequency coefficients comprises:

assigning a scanning order =0 for a two dimensional array frequency coefficient located at n=0 and m=0;

assigning a scanning order =1 for a two dimensional array frequency coefficient located at n=0 and m=1;

assigning a scanning order =2 for a two dimensional array frequency coefficient located at n=0 and m=2;

assigning a scanning order =3 for a two dimensional array frequency coefficient located at n=1 and m=0;

assigning a scanning order =4 for a two dimensional array frequency coefficient located at n=1 and m=1;

assigning a scanning order =5 for a two dimensional array frequency coefficient located at n=0 and m=3;

assigning a scanning order =6 for a two dimensional array frequency coefficient located at n=0 and m=4;

assigning a scanning order =7 for a two dimensional array frequency coefficient located at n=1 and m=2;

assigning a scanning order =8 for a two dimensional array frequency coefficient located at n=2 and m=0;

assigning a scanning order =9 for a two dimensional array frequency coefficient located at n=1 and m=3;

assigning a scanning order =10 for a two dimensional array frequency coefficient located at n=0 and m=5;

assigning a scanning order =11 for a two dimensional array frequency coefficient located at n=0 and m=6;

assigning a scanning order =12 for a two dimensional array frequency coefficient located at n=0 and m=7;

assigning a scanning order =13 for a two dimensional array frequency coefficient located at n=1 and m=4;

assigning a scanning order =14 for a two dimensional array frequency coefficient located at n=2 and m= assigning a scanning order =15 for a two dimensional array frequency coefficient located at n=3 and m=0;

assigning a scanning order =16 for a two dimensional array frequency coefficient located at n=2 and m=2;

assigning a scanning order =17 for a two dimensional array frequency coefficient located at n=1 and m=5;

assigning a scanning order =18 for a two dimensional array frequency coefficient located at n=1 and m=6;

assigning a scanning order =19 for a two dimensional array frequency coefficient located at n=1 and m=7;

assigning a scanning order =20 for a two dimensional array frequency coefficient located at n=2 and m=3;

assigning a scanning order =21 for a two dimensional array frequency coefficient located at n=3 and m=1;

assigning a scanning order =22 for a two dimensional array frequency coefficient located at n=4 and m=0;

assigning a scanning order =23 for a two dimensional array frequency coefficient located at n=3 and m=2;

assigning a scanning order =24 for a two dimensional array frequency coefficient located at n=2 and m=4;

assigning a scanning order =25 for a two dimensional array frequency coefficient located at n=2 and m=5;

assigning a scanning order =26 for a two dimensional array frequency coefficient located at n=2 and m=6;

assigning a scanning order =27 for a two dimensional array frequency coefficient located at n=2 and m=7;

assigning a scanning order =28 for a two dimensional array frequency coefficient located at n=3 and m=3;

assigning a scanning order =29 for a two dimensional array frequency coefficient located n=4 and m=1;

assigning a scanning order =30 for a two dimensional array frequency coefficient located at n=5 and m=0;

assigning a scanning order =31 for a two dimensional array frequency coefficient located at n=4 and m=2;

assigning a scanning order =32 for a two dimensional array frequency coefficient located at n=3 and m=4;

assigning a scanning order =33 for a two dimensional array frequency coefficient located at n=3 and m=5;

assigning a scanning order =34 for a two dimensional array frequency coefficient located at n=3 and m=6;

assigning a scanning order =35 for a two dimensional array frequency coefficient located at n=3 and m=7;

assigning a scanning order =36 for a two dimensional array frequency coefficient located at n=4 and m=3;

assigning a scanning order =37 for a two dimensional array frequency coefficient located at n=5 and m=1;
assigning a scanning order =38 for a two dimensional array frequency coefficient located at n=6 and m=0;
assigning a scanning order =39 for a two dimensional array frequency coefficient located n=5 and m=2;
assigning a scanning order =40 for a two dimensional array frequency coefficient located at n=4 and m=4;
assigning a scanning order =41 for a two dimensional array frequency coefficient located at n=4 and m=5;
assigning a scanning order =42 for a two dimensional array frequency coefficient located at n=4 and m=6;
assigning a scanning order =43 for a two dimensional array frequency coefficient located at n=4 and m=7;
assigning a scanning order =44 for a two dimensional array frequency coefficient located at n=5 and m=3;
assigning a scanning order =45 for a two dimensional array frequency coefficient located at n=6 and m=1;
assigning a scanning order =46 for a two dimensional array frequency coefficient located at n=6 and m=2;
assigning a scanning order =47 for a two dimensional array frequency coefficient located at n=5 and m=4;
assigning a scanning order =48 for a two dimensional array frequency coefficient located at n=5 and m=5;
assigning a scanning order =49 for a two dimensional array frequency coefficient located n=Sand m=6;
assigning a scanning order =50 for a two dimensional array frequency coefficient located at n=5 and m=7;
assigning a scanning order =51 for a two dimensional array frequency coefficient located at n=6 and m=3;
assigning a scanning order =52 for a two dimensional array frequency coefficient located at n=7 and m=0;
assigning a scanning order =53 for a two dimensional array frequency coefficient located at n=7 and m=1;
assigning a scanning order =54 for a two dimensional array frequency coefficient located at n=6 and m=4;
assigning a scanning order =55 for a two dimensional array frequency coefficient located at n=6 and m=5;
assigning a scanning order =56 for a two dimensional array frequency coefficient located at n=6 and m=6;
assigning a scanning order =57 for a two dimensional array frequency coefficient located at n=6 and m=7;
assigning a scanning order =58 for a two dimensional array frequency coefficient located at n=7 and m=2;
assigning a scanning order =59 for a two dimensional array frequency coefficient located n=7 and m=3;
assigning a scanning order =60 for a two dimensional array frequency coefficient located at n=7 and m=4;
assigning a scanning order =61 for a two dimensional array frequency coefficient located at n=7 and m=5;
assigning a scanning order =62 for a two dimensional array frequency coefficient located at n=7 and m=6;
assigning a scanning order =63 for a two dimensional array frequency coefficient located at n=7 and m=7.

10. The method of claim 9, wherein if said one dimensional array of said one dimensional array frequency coefficients comprises sixty-four one dimensional array frequency coefficients, wherein said sixty-four one dimensional array frequency coefficients are represented with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, in a numerical sequential order, wherein a first one dimensional array frequency coefficient is represented by p=0 and a sixty-fourth one dimensional array frequency coefficient is represented by p=63, said step of sequentially scanning said two dimensional array frequency coefficients in a vertically biased manner when said two dimensional array of said two dimensional array frequency coefficients comprises 8 columns of frequency coefficients and 8 rows of frequency coefficients further comprises:

assigning a one dimensional array frequency coefficient located at p=0 a value of said two dimensional array frequency coefficient located at n=0 and m=0;
assigning a one dimensional array frequency coefficient located at p=1 a value of said two dimensional array frequency coefficient located at n=0 and m=1;
assigning a one dimensional array frequency coefficient located at p=2 a value of said two dimensional array frequency coefficient located at n=0 and m=2;
assigning a one dimensional array frequency coefficient located at p=3 a value of said two dimensional array frequency coefficient located at n=1 and m=0;
assigning a one dimensional array frequency coefficient located at p=4 a value of said two dimensional array frequency coefficient located at n=1 and m=1;
assigning a one dimensional array frequency coefficient located at p=5 a value of said two dimensional array frequency coefficient located at n=0 and m=3;
assigning a one dimensional array frequency coefficient located at p=6 a value of said two dimensional array frequency coefficient located at n=0 and m=4;
assigning a one dimensional array frequency coefficient located at p=7 a value of said two dimensional array frequency coefficient located at n=1 and m=2;
assigning a one dimensional array frequency coefficient located at p=8 a value of said two dimensional array frequency coefficient located at n=2 and m=0;
assigning a one dimensional array frequency coefficient located at p=9 a value of said two dimensional array frequency coefficient located at n=1 and m=3;
assigning a one dimensional array frequency coefficient located at p=10 a value of said two dimensional array frequency coefficient located at n=0 and m=5;
assigning a one dimensional array frequency coefficient located at p=11 a value of said two dimensional array frequency coefficient located at n=0 and m=6;
assigning a one dimensional array frequency coefficient located at p=12 a value of said two dimensional array frequency coefficient located at n=0 and m=7;
assigning a one dimensional array frequency coefficient located at p=13 a value of said two dimensional array frequency coefficient located at n=1 and m=4;
assigning a one dimensional array frequency coefficient located at p=14 a value of said two dimensional array frequency coefficient located at n=2 and m=1;
assigning a one dimensional array frequency coefficient located at p=15 a value of said two dimensional array frequency coefficient located at n=3 and m=0;
assigning a one dimensional array frequency coefficient located at p=16 a value of said two dimensional array frequency coefficient located at n=2 and m=2;
assigning a one dimensional array frequency coefficient located at p=17 a value of said two dimensional array frequency coefficient located at n=1 and m=5;
assigning a one dimensional array frequency coefficient located at p=18 a value of said two dimensional array frequency coefficient located at n=1 and m=6;
assigning a one dimensional array frequency coefficient located at p=19 a value of said two dimensional array frequency coefficient located at n=1 and m=7;
assigning a one dimensional array frequency coefficient located at p=20 a value of said two dimensional array frequency coefficient located at n=2 and m=3;

assigning a one dimensional array frequency coefficient located at p=21 a value of said two dimensional array frequency coefficient located at n=3 and m=1;

assigning a one dimensional array frequency coefficient located at p=22 a value of said two dimensional array frequency coefficient located at n=4 and m=0;

assigning a one dimensional array frequency coefficient located at p=23 a value of said two dimensional array frequency coefficient located at n=3 and m=2;

assigning a one dimensional array frequency coefficient located at p=24 a value of said two dimensional array frequency coefficient located at n=2 and m=4;

assigning a one dimensional array frequency coefficient located at p=25 a value of said two dimensional array frequency coefficient located at n=2 and m=5;

assigning a one dimensional array frequency coefficient located at p=26 a value of said two dimensional array frequency coefficient located at n=2 and m=6;

assigning a one dimensional array frequency coefficient located at p=27 a value of said two dimensional array frequency coefficient located at n=2 and m=7;

assigning a one dimensional array frequency coefficient located at p=28 a value of said two dimensional array frequency coefficient located at n=3 and m=3;

assigning a one dimensional array frequency coefficient located at p=29 a value of said two dimensional array frequency coefficient located at n=4 and m=1;

assigning a one dimensional array frequency coefficient located at p=30 a value of said two dimensional array frequency coefficient located at n=5 and m=0;

assigning a one dimensional array frequency coefficient located at p=31 a value of said two dimensional array frequency coefficient located at n=4 and m=2;

assigning a one dimensional array frequency coefficient located at p=32 a value of said two dimensional array frequency coefficient located at n=3 and m=4;

assigning a one dimensional array frequency coefficient located at p=33 a value of said two dimensional array frequency coefficient located at n=3 and m=5;

assigning a one dimensional array frequency coefficient located at p=34 a value of said two dimensional array frequency coefficient located at n=3 and m=6;

assigning a one dimensional array frequency coefficient located at p=35 a value of said two dimensional array frequency coefficient located at n=3 and m=7;

assigning a one dimensional array frequency coefficient located at p=36 a value of said two dimensional array frequency coefficient located at n=4 and m=3;

assigning a one dimensional array frequency coefficient located at p=37 a value of said two dimensional array frequency coefficient located at n=5 and m=1;

assigning a one dimensional array frequency coefficient located at p=38 a value of said two dimensional array frequency coefficient located at n=6 and m=0;

assigning a one dimensional array frequency coefficient located at p=39 a value of said two dimensional array frequency coefficient located at n=5 and m=2;

assigning a one dimensional array frequency coefficient located at p=40 a value of said two dimensional array frequency coefficient located at n=4 and m=4;

assigning a one dimensional array frequency coefficient located at p=41 a value of said two dimensional array frequency coefficient located at n=4 and m=5;

assigning a one dimensional array frequency coefficient located at p=42 a value of said two dimensional array frequency coefficient located at n=4 and m=6;

assigning a one dimensional array frequency coefficient located at p=43 a value of said two dimensional array frequency coefficient located at n=4 and m=7;

assigning a one dimensional array frequency coefficient located at p=44 a value of said two dimensional array frequency coefficient located at n=5 and m=3;

assigning a one dimensional array frequency coefficient located at p=45 a value of said two dimensional array frequency coefficient located at n=6 and m=1;

assigning a one dimensional array frequency coefficient located at p=46 a value of said two dimensional array frequency coefficient located at n=6 and m=2;

assigning a one dimensional array frequency coefficient located at p=47 a value of said two dimensional array frequency coefficient located at n=5 and m=4;

assigning a one dimensional array frequency coefficient located at p=48 a value of said two dimensional array frequency coefficient located at n=5 and m=5;

assigning a one dimensional array frequency coefficient located at p=49 a value of said two dimensional array frequency coefficient located at n=5 and m=6;

assigning a one dimensional array frequency coefficient located at p=50 a value of said two dimensional array frequency coefficient located at n=5 and m=7;

assigning a one dimensional array frequency coefficient located at p=51 a value of said two dimensional array frequency coefficient located at n=6 and m=3;

assigning a one dimensional array frequency coefficient located at p=52 a value of said two dimensional array frequency coefficient located at n=7 and m=0;

assigning a one dimensional array frequency coefficient located at p=53 a value of said two dimensional array frequency coefficient located at n=7 and m=1;

assigning a one dimensional array frequency coefficient located at p=54 a value of said two dimensional array frequency coefficient located at n=6 and m=4;

assigning a one dimensional array frequency coefficient located at p=55 a value of said two dimensional array frequency coefficient located at n=6 and m=5;

assigning a one dimensional array frequency coefficient located at p=56 a value of said two dimensional array frequency coefficient located at n=6 and m=6;

assigning a one dimensional array frequency coefficient located at p=57 a value of said two dimensional array frequency coefficient located at n=6 and m=7;

assigning a one dimensional array frequency coefficient located at p=58 a value of said two dimensional array frequency coefficient located at n=7 and m=2;

assigning a one dimensional array frequency coefficient located at p=59 a value of said two dimensional array frequency coefficient located at n=7 and m=3;

assigning a one dimensional array frequency coefficient located at p=60 a value of said two dimensional array frequency coefficient located at n=7 and m=4;

assigning a one dimensional array frequency coefficient located at p=61 a value of said two dimensional array frequency coefficient located at n=7 and m=5;

assigning a one dimensional array frequency coefficient located at p=62 a value of said two dimensional array frequency coefficient located at n=7 and m=6; and assigning a one dimensional array frequency coefficient located at p=63 a value of said two dimensional array frequency coefficient located at n=7 and m=7.

11. The method of claim 1, wherein if said one dimensional array of said one dimensional array frequency coefficients comprises sixteen one dimensional array frequency coefficients, wherein said sixteen one dimensional array frequency coefficients are represented with a variable p=0, 1, 2, 3, 4, 5, 6, 7, 8, 9, 10, 11, 12, 13, 14, 15, in a numerical sequential order, wherein a first one dimensional array frequency coefficient is represented by p=0 and a sixteenth one dimensional array frequency coefficient is represented by p=15, said step of sequentially scanning said two dimensional array frequency coefficients in a vertically biased manner further comprises:

assigning a one dimensional array frequency coefficient located at p=0 a value of said two dimensional array frequency coefficient located at n=0 and m=0;

assigning a one dimensional array frequency coefficient located at p=1 a value of said two dimensional array frequency coefficient located at n=0 and m=1;

assigning a one dimensional array frequency coefficient located at p=2 a value of said two dimensional array frequency coefficient located at n=1 and m=0;

assigning a one dimensional array frequency coefficient located at p=3 a value of said two dimensional array frequency coefficient located at n=0 and m=2;

assigning a one dimensional array frequency coefficient located at p=4 a value of said two dimensional array frequency coefficient located at n=0 and m=3;

assigning a one dimensional array frequency coefficient located at p=5 a value of said two dimensional array frequency coefficient located at n=1 and m=1;

assigning a one dimensional array frequency coefficient located at p=6 a value of said two dimensional array frequency coefficient located at n=1 and m=2;

assigning a one dimensional array frequency coefficient located at p=7 a value of said two dimensional array frequency coefficient located at n=1 and m=3;

assigning a one dimensional array frequency coefficient located at p=8 a value of said two dimensional array frequency coefficient located at n=2 and m=0;

assigning a one dimensional array frequency coefficient located at p=9 a value of said two dimensional array frequency coefficient located at n=2 and m=1;

assigning a one dimensional array frequency coefficient located at p=10 a value of said two dimensional array frequency coefficient located at n=2 and m=2;

assigning a one dimensional array frequency coefficient located at p=11 a value of said two dimensional array frequency coefficient located at n=2 and m=3;

assigning a one dimensional array frequency coefficient located at p=12 a value of said two dimensional array frequency coefficient located at n=3 and m=0;

assigning a one dimensional array frequency coefficient located at p=13 a value of said two dimensional array frequency coefficient located at n=3 and m=1;

assigning a one dimensional array frequency coefficient located at p=14 a value of said two dimensional array frequency coefficient located at n=3 and m=2; and assigning a one dimensional array frequency coefficient located at p=15 a value of said two dimensional array frequency coefficient located at n=3 and m=3.

12. The method of claim 1, wherein if said one dimensional array of said one dimensional array frequency coefficients comprises sixteen one dimensional array frequency coefficients, said method further comprises:

representing said sixteen one dimensional array frequency coefficients with a variable p=0, 1, 2, 3, 4, 5, 6, 7, 8, 9, 10, 11, 12, 13, 14, 15, in a numerical sequential order, wherein a first one dimensional array frequency coefficient is represented by p=0 and a sixteenth one dimensional array frequency coefficient is represented by p=15; and sequentially scanning said one dimensional array of said one dimensional array frequency coefficients in said numerical sequential order, said sequential scanning starting at p=0 and ending at p=15 and producing said two dimensional array of said two dimensional array frequency coefficients.

13. The method of claim 12, wherein if said two dimensional array of said two dimensional array frequency coefficients comprises 4 columns of frequency coefficients and 4 rows of frequency coefficients, wherein said columns are represented with a variable n=0, 1, 2, or 3, wherein n=0 is at least one of a first or leftmost column, n=1 is a second column, n=2 is a third column, and n=3 is at least one of a fourth or rightmost column, and wherein said rows are represented with a variable m=0, 1, 2, or 3, wherein m=0 is at least one of a first or top row, m=1 is a second row, m=2 is a third row, and m=3 is at least one of a fourth or bottom row, said step of sequentially scanning said one dimensional array frequency coefficients further comprises:

assigning a two dimensional array frequency coefficient located at n=0 and m=0 a value of said one dimensional array frequency coefficient located at p=0;

assigning a two dimensional array frequency coefficient located at n=0 and m=1 a value of said one dimensional array frequency coefficient located at p=1;

assigning a two dimensional array frequency coefficient located at n=1 and m=0 a value of said one dimensional array frequency coefficient located at p=2;

assigning a two dimensional array frequency coefficient located at n=0 and m=2 a value of said one dimensional array frequency coefficient located at p=3;

assigning a two dimensional array frequency coefficient located at n=0 and m=3 a value of said one dimensional array frequency coefficient located at p=4;

assigning a two dimensional array frequency coefficient located at n=1 and m=1 a value of said one dimensional array frequency coefficient located at p=5;

assigning a two dimensional array frequency coefficient located at n=1 and m=2 a value of said one dimensional array frequency coefficient located at p=6;

assigning a two dimensional array frequency coefficient located at n=1 and m=3 a value of said one dimensional array frequency coefficient located at p=7;

assigning a two dimensional array frequency coefficient located at n=2 and m=0 a value of said one dimensional array frequency coefficient located at p=8;

assigning a two dimensional array frequency coefficient located at n=2 and m=1 a value of said one dimensional array frequency coefficient located at p=9;

assigning a two dimensional array frequency coefficient located at n=2 and m=2 a value of said one dimensional array frequency coefficient located at p=10;

assigning a two dimensional array frequency coefficient located at n=2 and m=3 a value of said one dimensional array frequency coefficient located at p=11;

assigning a two dimensional array frequency coefficient located at n=3 and m=0 a value of said one dimensional array frequency coefficient located at p=12;

assigning a two dimensional array frequency coefficient located at n=3 and m=1 a value of said one dimensional array frequency coefficient located at p=13;

assigning a two dimensional array frequency coefficient located at n=3 and m=2 a value of said one dimensional array frequency coefficient located at p=14; and assigning a two dimensional array frequency coefficient located at n=3 and m=3 a value of said one dimensional array frequency coefficient located at p=15.

14. The method of claim 1, wherein if said one dimensional array of said one dimensional array frequency coefficients comprises thirty-two one dimensional array frequency coefficients, said method further comprises:

representing said thirty-two one dimensional array frequency coefficients with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, in a numerical sequential order, wherein a first one dimensional array frequency coefficient is represented by p=0 and a thirty-second one dimensional array frequency coefficient is represented by p=31; and sequentially scanning said one dimensional array of said one dimensional array frequency coefficients in said numerical sequential order, said sequential scanning starting at p=0 and ending at p=31 and producing said two dimensional array of said two dimensional array frequency coefficients.

15. The method of claim 14 wherein if said two dimensional array of said two dimensional array frequency coefficients comprises 4 columns of frequency coefficients and 8 rows of frequency coefficients, wherein said columns are represented with a variable n=0, 1, 2, or 3, wherein n=0 is at least a first or leftmost column, n=1 is a second column, n=2 is a third column, and n=3 is a fourth or rightmost column, and wherein said rows are represented with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row, said step of sequentially scanning said one dimensional array frequency coefficients further comprises:

assigning a two dimensional array frequency coefficient located at n=0 and m=0 a value of said one dimensional array frequency coefficient located at p=0;

assigning a two dimensional array frequency coefficient located at n=0 and m=1 a value of said one dimensional array frequency coefficient located at p=1;

assigning a two dimensional array frequency coefficient located at n=0 and m=2 a value of said one dimensional array frequency coefficient located at p=2;

assigning a two dimensional array frequency coefficient located at n=0 and m=3 a value of said one dimensional array frequency coefficient located at p=3;

assigning a two dimensional array frequency coefficient located at n=1 and m=0 a value of said one dimensional array frequency coefficient located at p=4;

assigning a two dimensional array frequency coefficient located at n=1 and m=1 a value of said one dimensional array frequency coefficient located at p=5;

assigning a two dimensional array frequency coefficient located at n=1 and m=2 a value of said one dimensional array frequency coefficient located at p=6;

assigning a two dimensional array frequency coefficient located at n=0 and m=4 a value of said one dimensional array frequency coefficient located at p=7;

assigning a two dimensional array frequency coefficient located at n=0 and m=5 a value of said one dimensional array frequency coefficient located at p=8;

assigning a two dimensional array frequency coefficient located at n=0 and m=6 a value of said one dimensional array frequency coefficient located at p=9;

assigning a two dimensional array frequency coefficient located at n=0 and m=7 a value of said one dimensional array frequency coefficient located at p=10;

assigning a two dimensional array frequency coefficient located at n=1 and m=3 a value of said one dimensional array frequency coefficient located at p=11;

assigning a two dimensional array frequency coefficient located at n=2 and m=0 a value of said one dimensional array frequency coefficient located at p=12;

assigning a two dimensional array frequency coefficient located at n=2 and m=1 a value of said one dimensional array frequency coefficient located at p=13;

assigning a two dimensional array frequency coefficient located at n=2 and m=2 a value of said one dimensional array frequency coefficient located at p=14;

assigning a two dimensional array frequency coefficient located at n=1 and m=4 a value of said one dimensional array frequency coefficient located at p=15;

assigning a two dimensional array frequency coefficient located at n=1 and m=5 a value of said one dimensional array frequency coefficient located at p=16;

assigning a two dimensional array frequency coefficient located at n=1 and m=6 a value of said one dimensional array frequency coefficient located at p=17;

assigning a two dimensional array frequency coefficient located at n=1 and m=7 a value of said one dimensional array frequency coefficient located at p=18;

assigning a two dimensional array frequency coefficient located at n=2 and m=3 a value of said one dimensional array frequency coefficient located at p=19;

assigning a two dimensional array frequency coefficient located at n=3 and m=0 a value of said one dimensional array frequency coefficient located at p=20;

assigning a two dimensional array frequency coefficient located at n=3 and m=1 a value of said one dimensional array frequency coefficient located at p=21;

assigning a two dimensional array frequency coefficient located at n=3 and m=2 a value of said one dimensional array frequency coefficient located at p=22;

assigning a two dimensional array frequency coefficient located at n=2 and m=4 a value of said one dimensional array frequency coefficient located at p=23;

assigning a two dimensional array frequency coefficient located at n=2 and m=5 a value of said one dimensional array frequency coefficient located at p=24;

assigning a two dimensional array frequency coefficient located at n=2 and m=6 a value of said one dimensional array frequency coefficient located at p=25;

assigning a two dimensional array frequency coefficient located at n=2 and m=7 a value of said one dimensional array frequency coefficient located at p=26;

assigning a two dimensional array frequency coefficient located at n=3 and m=3 a value of said one dimensional array frequency coefficient located at p=27;

assigning a two dimensional array frequency coefficient located at n=3 and m=4 a value of said one dimensional array frequency coefficient located at p=28;

assigning a two dimensional array frequency coefficient located at n=3 and m=5 a value of said one dimensional array frequency coefficient located at p=29;

assigning a two dimensional array frequency coefficient located at n=3 and m=6 a value of said one dimensional array frequency coefficient located at p=30 and assigning a two dimensional array frequency coefficient located at n=3 and m=7 a value of said one dimensional array frequency coefficient located at p=31.

16. The method of claim 14, wherein if said two dimensional array of said two dimensional array frequency coefficients comprises 8 columns of frequency coefficients and 4 rows of frequency coefficients, wherein said columns are represented with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column, and wherein said rows are represented with a variable m=0, 1, 2, or 3, wherein m=0 is at least one of a first or top row, m=1 is a second row, m=2 is a third row, and m=3 is at least one of a fourth or bottom row, said step of sequentially scanning said one dimensional array frequency coefficients further comprises:

assigning a two dimensional array frequency coefficient located at n=0 and m=0 a value of said one dimensional array frequency coefficient located at p=0;

assigning a two dimensional array frequency coefficient located at n=0 and m=1 a value of said one dimensional array frequency coefficient located at p=1;

assigning a two dimensional array frequency coefficient located at n=1 and m=0 a value of said one dimensional array frequency coefficient located at p=2;

assigning a two dimensional array frequency coefficient located at n=0 and m=2 a value of said one dimensional array frequency coefficient located at p=3;

assigning a two dimensional array frequency coefficient located at n=0 and m=3 a value of said one dimensional array frequency coefficient located at p=4;

assigning a two dimensional array frequency coefficient located at n=1 and m=1 a value of said one dimensional array frequency coefficient located at p=5;

assigning a two dimensional array frequency coefficient located at n=2 and m=0 a value of said one dimensional array frequency coefficient located at p=6;

assigning a two dimensional array frequency coefficient located at n=1 and m=2 a value of said one dimensional array frequency coefficient located at p=7;

assigning a two dimensional array frequency coefficient located at n=1 and m=3 a value of said one dimensional array frequency coefficient located at p=8;

assigning a two dimensional array frequency coefficient located at n=2 and m=1 a value of said one dimensional array frequency coefficient located at p=9;

assigning a two dimensional array frequency coefficient located at n=3 and m=0 a value of said one dimensional array frequency coefficient located at p=10;

assigning a two dimensional array frequency coefficient located at n=2 and m=2 a value of said one dimensional array frequency coefficient located at p=11;

assigning a two dimensional array frequency coefficient located at n=2 and m=3 a value of said one dimensional array frequency coefficient located at p=12;

assigning a two dimensional array frequency coefficient located at n=3 and m=1 a value of said one dimensional array frequency coefficient located at p=13;

assigning a two dimensional array frequency coefficient located at n=4 and m=0 a value of said one dimensional array frequency coefficient located at p=14;

assigning a two dimensional array frequency coefficient located at n=3 and m=2 a value of said one dimensional array frequency coefficient located at p=15;

assigning a two dimensional array frequency coefficient located at n=3 and m=3 a value of said one dimensional array frequency coefficient located at p=16;

assigning a two dimensional array frequency coefficient located at n=4 and m=1 a value of said one dimensional array frequency coefficient located at p=17;

assigning a two dimensional array frequency coefficient located at n=5 and m=0 a value of said one dimensional array frequency coefficient located at p=18;

assigning a two dimensional array frequency coefficient located at n=4 and m=2 a value of said one dimensional array frequency coefficient located at p=19;

assigning a two dimensional array frequency coefficient located at n=4 and m=3 a value of said one dimensional array frequency coefficient located at p=20;

assigning a two dimensional array frequency coefficient located at n=5 and m=1 a value of said one dimensional array frequency coefficient located at p=21;

assigning a two dimensional array frequency coefficient located at n=6 and m=0 a value of said one dimensional array frequency coefficient located at p=22;

assigning a two dimensional array frequency coefficient located at n=5 and m=2 a value of said one dimensional array frequency coefficient located at p=23;

assigning a two dimensional array frequency coefficient located at n=5 and m=3 a value of said one dimensional array frequency coefficient located at p=24;

assigning a two dimensional array frequency coefficient located at n=6 and m=1 a value of said one dimensional array frequency coefficient located at p=25;

assigning a two dimensional array frequency coefficient located at n=7 and m=0 a value of said one dimensional array frequency coefficient located at p=26;

assigning a two dimensional array frequency coefficient located at n=6 and m=2 a value of said one dimensional array frequency coefficient located at p=27;

assigning a two dimensional array frequency coefficient located at n=6 and m=3 a value of said one dimensional array frequency coefficient located at p=28;

assigning a two dimensional array frequency coefficient located at n=7 and m=1 a value of said one dimensional array frequency coefficient located at p=29;

assigning a two dimensional array frequency coefficient located at n=7 and m=2 a value of said one dimensional array frequency coefficient located at p=30 and assigning a two dimensional array frequency coefficient located at n=7 and m=3 a value of said one dimensional array frequency coefficient located at p=31.

17. The method of claim 1, wherein if said one dimensional array of said one dimensional array frequency coefficients comprises sixty-four one dimensional array frequency coefficients, said method further comprises:

representing said sixty-four one dimensional array frequency coefficients with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, in a numerical sequential order, wherein a first one dimensional array frequency coefficient is represented by p=0 and a sixty-fourth one dimensional array frequency coefficient is represented by p=63; and sequentially scanning said one dimensional array of said one dimensional array frequency coefficients in said numerical sequential order, said sequential scanning starting at p=0 and ending at p=63 and producing said two dimensional array of said two dimensional array frequency coefficients.

18. The method of claim 17, wherein if said two dimensional array of said two dimensional array frequency coefficients comprises 8 columns of frequency coefficients and 8 rows of frequency coefficients, wherein said columns are represented with a variable n=0, 1, 2, 3, 4, 5, 6, or 7, wherein $n=0$ is at least one of a first or leftmost column, $n1$ is a second column, $n=2$ is a third column, $n=3$ is a fourth column, $n=4$ is a fifth column, $n=5$ is a sixth column, $n=6$ is a seventh column, and $n=7$ is at least one of an eighth or rightmost column, and wherein said rows are represented with a variable $m=0$, 1, 2, 3, 4, 5, 6, or 7, wherein $m=0$ is at least one of a first or top row, $m=1$ is a second row, $m=2$ is a third row, $m=3$ is a fourth row, $m=4$ is a fifth row, $m=5$ is a sixth row, $m=6$ is a seventh row, and $m=7$ is at least one of an eighth or bottom row, said step of sequentially scanning said one dimensional array frequency coefficients further comprises:

assigning a two dimensional array frequency coefficient located at $n=0$ and $m=0$ a value of said one dimensional array frequency coefficient located at $p=0$;

assigning a two dimensional array frequency coefficient located at $n=0$ and $m=1$ a value of said one dimensional array frequency coefficient located at $p=1$;

assigning a two dimensional array frequency coefficient located at $n=0$ and $m=2$ a value of said one dimensional array frequency coefficient located at $p=2$;

assigning a two dimensional array frequency coefficient located at $n=1$ and $m=0$ a value of said one dimensional array frequency coefficient located at $p=3$;

assigning a two dimensional array frequency coefficient located at $n=1$ and $m=1$ a value of said one dimensional array frequency coefficient located at $p=4$;

assigning a two dimensional array frequency coefficient located at $n=0$ and $m=3$ a value of said one dimensional array frequency coefficient located at $p=5$;

assigning a two dimensional array frequency coefficient located at $n=0$ and $m=4$ a value of said one dimensional array frequency coefficient located at $p=6$;

assigning a two dimensional array frequency coefficient located at $n=1$ and $m=2$ a value of said one dimensional array frequency coefficient located at $p=7$;

assigning a two dimensional array frequency coefficient located at $n=2$ and $m=0$ a value of said one dimensional array frequency coefficient located at $p=8$;

assigning a two dimensional array frequency coefficient located at $n=1$ and $m=3$ a value of said one dimensional array frequency coefficient located at $p=9$;

assigning a two dimensional array frequency coefficient located at $n=0$ and $m=5$ a value of said one dimensional array frequency coefficient located at $p=10$;

assigning a two dimensional array frequency coefficient located at $n=0$ and $m=6$ a value of said one dimensional array frequency coefficient located at $p=11$;

assigning a two dimensional array frequency coefficient located at $n=0$ and $m=7$ a value of said one dimensional array frequency coefficient located at $p=12$;

assigning a two dimensional array frequency coefficient located at $n=1$ and $m=4$ a value of said one dimensional array frequency coefficient located at $p=13$;

assigning a two dimensional array frequency coefficient located at $n=2$ and $m=1$ a value of said one dimensional array frequency coefficient located at $p=14$;

assigning a two dimensional array frequency coefficient located at $n=3$ and $m=0$ a value of said one dimensional array frequency coefficient located at $p=15$;

assigning a two dimensional array frequency coefficient located at $n=2$ and $m=2$ a value of said one dimensional array frequency coefficient located at $p=16$;

assigning a two dimensional array frequency coefficient located at $n=1$ and $m=5$ a value of said one dimensional array frequency coefficient located at $p=17$;

assigning a two dimensional array frequency coefficient located at $n=1$ and $m=6$ a value of said one dimensional array frequency coefficient located at $p=18$;

assigning a two dimensional array frequency coefficient located at $n=1$ and $m=7$ a value of said one dimensional array frequency coefficient located at $p=19$;

assigning a two dimensional array frequency coefficient located at $n=2$ and $m=3$ a value of said one dimensional array frequency coefficient located at $p=20$;

assigning a two dimensional array frequency coefficient located at $n=3$ and $m=1$ a value of said one dimensional array frequency coefficient located at $p=21$;

assigning a two dimensional array frequency coefficient located at $n=4$ and $m=0$ a value of said one dimensional array frequency coefficient located at $p=22$;

assigning a two dimensional array frequency coefficient located at $n=3$ and $m=2$ a value of said one dimensional array frequency coefficient located at $p=23$;

assigning a two dimensional array frequency coefficient located at $n=2$ and $m=4$ a value of said one dimensional array frequency coefficient located at $p=24$;

assigning a two dimensional array frequency coefficient located at $n=2$ and $m=5$ a value of said one dimensional array frequency coefficient located at $p=25$;

assigning a two dimensional array frequency coefficient located at $n=2$ and $m=6$ a value of said one dimensional array frequency coefficient located at $p=26$;

assigning a two dimensional array frequency coefficient located at $n=2$ and $m=7$ a value of said one dimensional array frequency coefficient located at $p=27$;

assigning a two dimensional array frequency coefficient located at $n=3$ and $m=3$ a value of said one dimensional array frequency coefficient located at $p=28$;

assigning a two dimensional array frequency coefficient located at $n=4$ and $m=1$ a value of said one dimensional array frequency coefficient located at $p=29$;

assigning a two dimensional array frequency coefficient located at $n=5$ and $m=0$ a value of said one dimensional array frequency coefficient located at $p=30$;

assigning a two dimensional array frequency coefficient located at $n=4$ and $m=2$ a value of said one dimensional array frequency coefficient located at $p=31$;

assigning a two dimensional array frequency coefficient located at $n=3$ and $m=4$ a value of said one dimensional array frequency coefficient located at $p=32$;

assigning a two dimensional array frequency coefficient located at $n=3$ and $m=5$ a value of said one dimensional array frequency coefficient located at $p=33$;

assigning a two dimensional array frequency coefficient located at $n=3$ and $m=6$ a value of said one dimensional array frequency coefficient located at $p=34$;

assigning a two dimensional array frequency coefficient located at $n=3$ and $m=7$ a value of said one dimensional array frequency coefficient located at $p=35$;

assigning a two dimensional array frequency coefficient located at $n=4$ and $m=3$ a value of said one dimensional array frequency coefficient located at $p=36$;

assigning a two dimensional array frequency coefficient located at $n=5$ and $m=1$ a value of said one dimensional array frequency coefficient located at $p=37$;

assigning a two dimensional array frequency coefficient located at $n=6$ and $m=0$ a value of said one dimensional array frequency coefficient located at $p=38$;

assigning a two dimensional array frequency coefficient located at $n=5$ and $m=2$ a value of said one dimensional array frequency coefficient located at $p=39$;

assigning a two dimensional array frequency coefficient located at n=4 and m=4 a value of said one dimensional array frequency coefficient located at p=40;

assigning a two dimensional array frequency coefficient located at n=4 and m=5 a value of said one dimensional array frequency coefficient located at p=41;

assigning a two dimensional array frequency coefficient located at n=4 and m=6 a value of said one dimensional array frequency coefficient located at p=42;

assigning a two dimensional array frequency coefficient located at n=4 and m=7 a value of said one dimensional array frequency coefficient located at p=43;

assigning a two dimensional array frequency coefficient located at n=5 and m=3 a value of said one dimensional array frequency coefficient located at p=44;

assigning a two dimensional array frequency coefficient located at n=6 and m=1 a value of said one dimensional array frequency coefficient located at p=45;

assigning a two dimensional array frequency coefficient located at n=6 and m=2 a value of said one dimensional array frequency coefficient located at p=46;

assigning a two dimensional array frequency coefficient located at n=5 and m=4 a value of said one dimensional array frequency coefficient located at p=47;

assigning a two dimensional array frequency coefficient located at n=5 and m=5 a value of said one dimensional array frequency coefficient located at p=48;

assigning a two dimensional array frequency coefficient located at n=5 and m=6 a value of said one dimensional array frequency coefficient located at p=49;

assigning a two dimensional array frequency coefficient located at n=5 and m=7 a value of said one dimensional array frequency coefficient located at p=50;

assigning a two dimensional array frequency coefficient located at n=6 and m=3 a value of said one dimensional array frequency coefficient located at p=51;

assigning a two dimensional array frequency coefficient located at n=7 and m=0 a value of said one dimensional array frequency coefficient located at p=52;

assigning a two dimensional array frequency coefficient located at n=7 and m=1 a value of said one dimensional array frequency coefficient located at p=53;

assigning a two dimensional array frequency coefficient located at n=6 and m=4 a value of said one dimensional array frequency coefficient located at p=54;

assigning a two dimensional array frequency coefficient located at n=6 and m=5 a value of said one dimensional array frequency coefficient located at p=55;

assigning a two dimensional array frequency coefficient located at n=6 and m=6 a value of said one dimensional array frequency coefficient located at p=56;

assigning a two dimensional array frequency coefficient located at n=6 and m=7 a value of said one dimensional array frequency coefficient located at p=57;

assigning a two dimensional array frequency coefficient located at n=7 and m=2 a value of said one dimensional array frequency coefficient located at p=58;

assigning a two dimensional array frequency coefficient located at n=7 and m=3 a value of said one dimensional array frequency coefficient located at p=59;

assigning a two dimensional array frequency coefficient located at n=7 and m=4 a value of said one dimensional array frequency coefficient located at p=60;

assigning a two dimensional array frequency coefficient located at n=7 and m=5 a value of said one dimensional array frequency coefficient located at p=61;

assigning a two dimensional array frequency coefficient located at n=7 and m=6 a value of said one dimensional array frequency coefficient located at p=62; and assigning a two dimensional array frequency coefficient located at n=7 and m=7 a value of said one dimensional array frequency coefficient located at p=63.

19. A device comprising;

an encoder configured to perform transform-based encoding of digital video content, said digital video content comprising a stream of pictures, slices, or macroblocks which are at least one of intra, predicted or hi-predicted pictures, slices, or macroblocks, in the form of blocks of pixels forming a two dimensional array of two dimensional array frequency coefficients including high-energy low frequency coefficients and low-energy high frequency coefficients, wherein said encoder scans said two dimensional array frequency coefficients, from each of said blocks, in a manner that is vertically biased and producing a one dimensional array of one dimensional array frequency coefficients and, wherein the high-energy low frequency coefficients are scanned before the low-energy high frequency coefficients, wherein when said two dimensional array of said two dimensional array frequency coefficients comprises four columns of frequency coefficients and four rows of frequency coefficients, said encoder:

represents said columns with a variable n=0, 1, 2, or 3, wherein n=0 is at least one of a first or leftmost column, n=1 is a second column, n=2 is a third column, and n=3 is at least one of a fourth or rightmost column; and represents said rows with a variable m=0, 1, 2, or 3, wherein m=0 is at least one of a first or top row, m=1 is a second row, m=2 is a third row, and m=3 is at least one of a fourth or bottom row;

wherein said encoder sequentially scans said two dimensional array of said two dimensional array frequency coefficients in a sequential scanning order that is vertically biased, said sequential scanning order starting at 0 and ending at 15 and producing said one dimensional array of said one dimensional array frequency coefficients, wherein in sequentially scanning said two dimensional array frequency coefficients in a vertically biased manner, said encoder:

assigns a scanning order =0 for a two dimensional array frequency coefficient located at n=0 and m=0;

assigns a scanning order =1 for a two dimensional array frequency coefficient located at n=0 and m=1;

assigns a scanning order =2 for a two dimensional array frequency coefficient located at n=1 and m=0;

assigns a scanning order =3 for a two dimensional array frequency coefficient located at n=0 and m=2;

assigns a scanning order =4 for a two dimensional array frequency coefficient located at n=0 and m=3;

assigns a scanning order =5 for a two dimensional array frequency coefficient located at n=1 and m=1;

assigns a scanning order =6 for a two dimensional array frequency coefficient located at n=1 and m=2;

assigns a scanning order =7 for a two dimensional array frequency coefficient located at n=1 and m=3;

assigns a scanning order =8 for a two dimensional array frequency coefficient located at n=2 and m=0;

assigns a scanning order =9 for a two dimensional array frequency coefficient located at n=2 and m=1;

assigns a scanning order =10 for a two dimensional array frequency coefficient located at n=2 and m=2;

assigns a scanning order =11 for a two dimensional array frequency coefficient located at n=2 and m=3;

assigns a scanning order =12 for a two dimensional array frequency coefficient located at n=3 and m=0;

assigns a scanning order =13 for a two dimensional array frequency coefficient located at n=3 and m=1;

assigns a scanning order =14 for a two dimensional array frequency coefficient located at n=3 and m=2; and assigns a scanning order =15 for a two dimensional array frequency coefficient located at n=3 and m=3.

20. The device of claim 19 wherein if said two dimensional array of said two dimensional array frequency coefficients comprises four columns of frequency coefficients and eight rows of frequency coefficients, said encoder:

represents said columns with a variable n=0, 1, 2, or 3, wherein n=0 is at least one of a first or leftmost column, n=1 is a second column, n=2 is a third column, and n=3 is at least one of a fourth or rightmost column; and represents said rows with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row;

wherein said encoder sequentially scans said two dimensional array of said two dimensional array frequency coefficients in a sequential scanning order that is vertically biased, said sequential scanning order starting at 0 and ending at 31 and producing said one dimensional array of said one dimensional array frequency coefficients.

21. The device of claim 20 wherein in sequentially scanning said two dimensional array frequency coefficients in a vertically biased manner when said two dimensional array of said two dimensional array frequency coefficients comprises four columns of frequency coefficients and eight rows of frequency coefficients, said encoder:

assigns a scanning order =0 for a two dimensional array frequency coefficient located at n=0 and m=0;

assigns a scanning order =1 for a two dimensional array frequency coefficient located at n=0 and m=1;

assigns a scanning order =2 for a two dimensional array frequency coefficient located at n=0 and m=2;

assigns a scanning order =3 for a two dimensional array frequency coefficient located at n=0 and m=3;

assigns a scanning order =4 for a two dimensional array frequency coefficient located at n=1 and m=0;

assigns a scanning order =5 for a two dimensional array frequency coefficient located at n=1 and m=1;

assigns a scanning order =6 for a two dimensional array frequency coefficient located at n=1 and m=2;

assigns a scanning order =7 for a two dimensional array frequency coefficient located at n=0 and m=4;

assigns a scanning order =8 for a two dimensional array frequency coefficient located at n=0 and m=5;

assigns a scanning order =9 for a two dimensional array frequency coefficient located at n=0 and m=6;

assigns a scanning order =10 for a two dimensional array frequency coefficient located at n=0 and m=7;

assigns a scanning order =11 for a two dimensional array frequency coefficient located at n=1 and m=3;

assigns a scanning order =12 for a two dimensional array frequency coefficient located at n=2 and m=0;

assigns a scanning order =13 for a two dimensional array frequency coefficient located at n=2 and m=1;

assigns a scanning order =14 for a two dimensional array frequency coefficient located at n=2 and m=2;

assigns a scanning order =15 for a two dimensional array frequency coefficient located at n=1 and m=4;

assigns a scanning order =16 for a two dimensional array frequency coefficient located at n=1 and m=5;

assigns a scanning order =17 for a two dimensional array frequency coefficient located at n=1 and m=6;

assigns a scanning order =18 for a two dimensional array frequency coefficient located at n=1 and m=7;

assigns a scanning order =19 for a two dimensional array frequency coefficient located at n=2 and m=3;

assigns a scanning order =20 for a two dimensional array frequency coefficient located at n=3 and m=0;

assigns a scanning order =21 for a two dimensional array frequency coefficient located at n=3 and m=1;

assigns a scanning order =22 for a two dimensional array frequency coefficient located at n=3 and m=2;

assigns a scanning order =23 for a two dimensional array frequency coefficient located at n=2 and m=4;

assigns a scanning order =24 for a two dimensional array frequency coefficient located at n=2 and m=5;

assigns a scanning order =25 for a two dimensional array frequency coefficient located at n=2 and m=6;

assigns a scanning order =26 for a two dimensional array frequency coefficient located at n=2 and m=7;

assigns a scanning order =27 for a two dimensional array frequency coefficient located at n=3 and m=3;

assigns a scanning order =28 for a two dimensional array frequency coefficient located at n=3 and m=4;

assigns a scanning order =29 for a two dimensional array frequency coefficient located at n=3 and m=5;

assigns a scanning order =30 for a two dimensional array frequency coefficient located at n=3 and m=6; and assigns a scanning order =31 for a two dimensional array frequency coefficient located at n=3 and m=7.

22. The device of claim 21, wherein if said one dimensional array of said one dimensional array frequency coefficients comprises thirty-two one dimensional array frequency coefficients, wherein said thirty-two one dimensional array frequency coefficients are represented with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, in a numerical sequential order, wherein a first one dimensional array frequency coefficient is represented by p=0 and a thirty-second one dimensional array frequency coefficient is represented by p=31, wherein in sequentially scanning said two dimensional array frequency coefficients in a vertically biased manner when said two dimensional array of said two dimensional array frequency coefficients comprises four columns of frequency coefficients and eight rows of frequency coefficients, said encoder further:

assigns a one dimensional array frequency coefficient located at p=0 a value of said two dimensional array frequency coefficient located at n=0 and m=0;

assigns a one dimensional array frequency coefficient located at p=1 a value of said two dimensional array frequency coefficient located at n=0 and m=1;

assigns a one dimensional array frequency coefficient located at p=2 a value of said two dimensional array frequency coefficient located at n=0 and m=2;

assigns a one dimensional array frequency coefficient located at p=3 a value of said two dimensional array frequency coefficient located at n=0 and m=3;

assigns a one dimensional array frequency coefficient located at p=4 a value of said two dimensional array frequency coefficient located at n=1 and m=0;

assigns a one dimensional array frequency coefficient located at p=5 a value of said two dimensional array frequency coefficient located at n=1 and m=1;

assigns a one dimensional array frequency coefficient located at p=6 a value of said two dimensional array frequency coefficient located at n=1 and m=2;

assigns a one dimensional array frequency coefficient located at p=7 a value of said two dimensional array frequency coefficient located at n=0 and m=4;

assigns a one dimensional array frequency coefficient located at p=8 a value of said two dimensional array frequency coefficient located at n=0 and m=5;

assigns a one dimensional array frequency coefficient located at p=9 a value of said two dimensional array frequency coefficient located at n=0 and m=6;

assigns a one dimensional array frequency coefficient located at p=10 a value of said two dimensional array frequency coefficient located at n=0 and m=7;

assigns a one dimensional array frequency coefficient located at p=11 a value of said two dimensional array frequency coefficient located at n=1 and m=3;

assigns a one dimensional array frequency coefficient located at p=12 a value of said two dimensional array frequency coefficient located at n=2 and m=0;

assigns a one dimensional array frequency coefficient located at p=13 a value of said two dimensional array frequency coefficient located at n=2 and m=1;

assigns a one dimensional array frequency coefficient located at p=14 a value of said two dimensional array frequency coefficient located at n=2 and m=2;

assigns a one dimensional array frequency coefficient located at p=15 a value of said two dimensional array frequency coefficient located at n=1 and m=4;

assigns a one dimensional array frequency coefficient located at p=16 a value of said two dimensional array frequency coefficient located at n=1 and m=5;

assigns a one dimensional array frequency coefficient located at p=17 a value of said two dimensional array frequency coefficient located at n=1 and m=6;

assigns a one dimensional array frequency coefficient located at p=18 a value of said two dimensional array frequency coefficient located at n=1 and m=7;

assigns a one dimensional array frequency coefficient located at p=19 a value of said two dimensional array frequency coefficient located at n=2 and m=3;

assigns a one dimensional array frequency coefficient located at p=20 a value of said two dimensional array frequency coefficient located at n=3 and m=0;

assigns a one dimensional array frequency coefficient located at p=21 a value of said two dimensional array frequency coefficient located at n=3 and m=1;

assigns a one dimensional array frequency coefficient located at p=22 a value of said two dimensional array frequency coefficient located at n=3 and m=2;

assigns a one dimensional array frequency coefficient located at p=23 a value of said two dimensional array frequency coefficient located at n=2 and m=4;

assigns a one dimensional array frequency coefficient located at p=24 a value of said two dimensional array frequency coefficient located at n=2 and m=5;

assigns a one dimensional array frequency coefficient located at p=25 a value of said two dimensional array frequency coefficient located at n=2 and m=6;

assigns a one dimensional array frequency coefficient located at p=26 a value of said two dimensional array frequency coefficient located at n=2 and m=7;

assigns a one dimensional array frequency coefficient located at p=27 a value of said two dimensional array frequency coefficient located at n=3 and m=3;

assigns a one dimensional array frequency coefficient located at p=28 a value of said two dimensional array frequency coefficient located at n=3 and m=4;

assigns a one dimensional array frequency coefficient located at p=29 a value of said two dimensional array frequency coefficient located at n=3 and m=5;

assigns a one dimensional array frequency coefficient located at p=30 a value of said two dimensional array frequency coefficient located at n=3 and m=6; and assigns a one dimensional array frequency coefficient located at p=31 a value of said two dimensional array frequency coefficient located at n=3 and m=7.

23. The device of claim 19, wherein if said two dimensional array of said two dimensional array frequency coefficients comprises eight columns of frequency coefficients and four rows of frequency coefficients, said encoder:

represents said columns with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column; and represents said rows with a variable m=0, 1, 2, or 3, wherein m=0 is at least one of a first or top row, m=1 is a second row, m=2 is a third row, and m=3 is at least one of a fourth or bottom row;

wherein said encoder sequentially scans said two dimensional array of said two dimensional array frequency coefficients in a sequential scanning order that is vertically biased, said sequential scanning order starting at 0 and ending at 31 and producing said one dimensional array of said one dimensional array frequency coefficients.

24. The device of claim 23, wherein in sequentially scanning said two dimensional array frequency coefficients in a vertically biased manner when said two dimensional array of said two dimensional array frequency coefficients comprises eight columns of frequency coefficients and four rows of frequency coefficients, said encoder:

assigns a scanning order =0 for a two dimensional array frequency coefficient located at n=0 and m=0;

assigns a scanning order =1 for a two dimensional array frequency coefficient located at n=0 and m=1;

assigns a scanning order =2 for a two dimensional array frequency coefficient located at n=1 and m=0;

assigns a scanning order =3 for a two dimensional array frequency coefficient located at n=0 and m=2;

assigns a scanning order =4 for a two dimensional array frequency coefficient located at n=0 and m=3;

assigns a scanning order =5 for a two dimensional array frequency coefficient located at n=1 and m=1;
assigns a scanning order =6 for a two dimensional array frequency coefficient located at n=2 and m=0;
assigns a scanning order =7 for a two dimensional array frequency coefficient located at n=1 and m=2;
assigns a scanning order =8 for a two dimensional array frequency coefficient located at n=1 and m=3;
assigns a scanning order =9 for a two dimensional array frequency coefficient located at n=2 and m=1;
assigns a scanning order =10 for a two dimensional array frequency coefficient located at n=3 and m=0;
assigns a scanning order =11 for a two dimensional array frequency coefficient located at n=2 and m=2;
assigns a scanning order =12 for a two dimensional array frequency coefficient located at n=2 and m=3;
assigns a scanning order =13 for a two dimensional array frequency coefficient located at n=3 and m=1;
assigns a scanning order =14 for a two dimensional array frequency coefficient located at n=4 and m=0;
assigns a scanning order =15 for a two dimensional array frequency coefficient located at n=3 and m=2;
assigns a scanning order =16 for a two dimensional array frequency coefficient located at n=3 and m=3;
assigns a scanning order =17 for a two dimensional array frequency coefficient located at n=4 and m=1;
assigns a scanning order =18 for a two dimensional array frequency coefficient located at n=5 and m=0;
assigns a scanning order =19 for a two dimensional array frequency coefficient located at n=4 and m=2;
assigns a scanning order =20 for a two dimensional array frequency coefficient located at n=4 and m=3;
assigns a scanning order =21 for a two dimensional array frequency coefficient located at n=5 and m=1;
assigns a scanning order =22 for a two dimensional array frequency coefficient located at n=6 and m=0;
assigns a scanning order =23 for a two dimensional array frequency coefficient located at n=5 and m=2;
assigns a scanning order =24 for a two dimensional array frequency coefficient located at n=5 and m=3;
assigns a scanning order =25 for a two dimensional array frequency coefficient located at n=6 and m=1;
assigns a scanning order =26 for a two dimensional array frequency coefficient located at n=7 and m=0;
assigns a scanning order =27 for a two dimensional array frequency coefficient located at n=6 and m=2;
assigns a scanning order =28 for a two dimensional array frequency coefficient located at n=6 and m=3;
assigns a scanning order =29 for a two dimensional array frequency coefficient located at n=7 and m=1;
assigns a scanning order =30 for a two dimensional array frequency coefficient located at n=7 and m=2; and
assigns a scanning order =31 for a two dimensional array frequency coefficient located at n=7 and m=3.

25. The device of claim 24, wherein if said one dimensional array of said one dimensional array frequency coefficients comprises thirty-two one dimensional array frequency coefficients, wherein said thirty-two one dimensional array frequency coefficients are represented with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, in a numerical sequential order, wherein a first one dimensional array frequency coefficient is represented by p=0 and a thirty-second one dimensional array frequency coefficient is represented by p=31, wherein in sequentially scanning said two dimensional array frequency coefficients in a vertically biased manner when said two dimensional array of said two dimensional array frequency coefficients comprises eight columns of frequency coefficients and four rows of frequency coefficients, said encoder further:
assigns a one dimensional array frequency coefficient located at p=0 a value of said two dimensional array frequency coefficient located at n=0 and m=0;
assigns a one dimensional array frequency coefficient located at p=1 a value of said two dimensional array frequency coefficient located at n=0 and m=1;
assigns a one dimensional array frequency coefficient located at p=2 a value of said two dimensional array frequency coefficient located at n=1 and m=0;
assigns a one dimensional array frequency coefficient located at p=3 a value of said two dimensional array frequency coefficient located at n=0 and m=2;
assigns a one dimensional array frequency coefficient located at p=4 a value of said two dimensional array frequency coefficient located at n=0 and m=3;
assigns a one dimensional array frequency coefficient located at p=5 a value of said two dimensional array frequency coefficient located at n=1 and m=1;
assigns a one dimensional array frequency coefficient located at p=6 a value of said two dimensional array frequency coefficient located at n=2 and m=0;
assigns a one dimensional array frequency coefficient located at p=7 a value of said two dimensional array frequency coefficient located at n=1 and m=2;
assigns a one dimensional array frequency coefficient located at p=8 a value of said two dimensional array frequency coefficient located at n=1 and m=3;
assigns a one dimensional array frequency coefficient located at p=9 a value of said two dimensional array frequency coefficient located at n=2 and m=1;
assigns a one dimensional array frequency coefficient located at p=10 a value of said two dimensional array frequency coefficient located at n=3 and m=0;
assigns a one dimensional array frequency coefficient located at p=11 a value of said two dimensional array frequency coefficient located at n=2 and m=2;
assigns a one dimensional array frequency coefficient located at p=12 a value of said two dimensional array frequency coefficient located at n=2 and m=3;
assigns a one dimensional array frequency coefficient located at p=13 a value of said two dimensional array frequency coefficient located at n=3 and m=1;
assigns a one dimensional array frequency coefficient located at p=14 a value of said two dimensional array frequency coefficient located at n=4 and m=0;
assigns a one dimensional array frequency coefficient located at p=15 a value of said two dimensional array frequency coefficient located at n=3 and m=2;
assigns a one dimensional array frequency coefficient located at p=16 a value of said two dimensional array frequency coefficient located at n=3 and m=3;
assigns a one dimensional array frequency coefficient located at p=17 a value of said two dimensional array frequency coefficient located at n=4 and m=1;
assigns a one dimensional array frequency coefficient located at p=18 a value of said two dimensional array frequency coefficient located at n=5 and m=0;
assigns a one dimensional array frequency coefficient located at p=19 a value of said two dimensional array frequency coefficient located at n=4 and m=2;
assigns a one dimensional array frequency coefficient located at p=20 a value of said two dimensional array frequency coefficient located at n=4 and m=3;

assigns a one dimensional array frequency coefficient located at p=21 a value of said two dimensional array frequency coefficient located at n=5 and m=1;
assigns a one dimensional array frequency coefficient located at p=22 a value of said two dimensional array frequency coefficient located at n=6 and m=0;
assigns a one dimensional array frequency coefficient located at p=23 a value of said two dimensional array frequency coefficient located at n=5 and m=2;
assigns a one dimensional array frequency coefficient located at p=24 a value of said two dimensional array frequency coefficient located at n=5 and m=3;
assigns a one dimensional array frequency coefficient located at p=25 a value of said two dimensional array frequency coefficient located at n=6 and m=1;
assigns a one dimensional array frequency coefficient located at p=26 a value of said two dimensional array frequency coefficient located at n=7 and m=0;
assigns a one dimensional array frequency coefficient located at p=27 a value of said two dimensional array frequency coefficient located at n=6 and m=2;
assigns a one dimensional array frequency coefficient located at p=28 a value of said two dimensional array frequency coefficient located at n=6 and m=3;
assigns a one dimensional array frequency coefficient located at p=29 a value of said two dimensional array frequency coefficient located at n=7 and m=1;
assigns a one dimensional array frequency coefficient located at p=30 a value of said two dimensional array frequency coefficient located at n=7 and m=2; and
assigns a one dimensional array frequency coefficient located at p=31 a value of said two dimensional array frequency coefficient located at n=7 and m=3.

26. The device of claim 19, wherein if said two dimensional array of said two dimensional array frequency coefficients comprises eight columns of frequency coefficients and eight rows of frequency coefficients, said encoder:
represents said columns with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column; and
represents said rows with a variable m=0, 1, 2, 3, 4, 5, 6, 7, or 8, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row;
wherein said encoder sequentially scans said two dimensional array of said two dimensional array frequency coefficients in a sequential scanning order that is vertically biased, said sequential scanning order starting at 0 and ending at 63 and producing said one dimensional array of said one dimensional array frequency coefficients.

27. The device of claim 26, wherein in sequentially scanning said two dimensional array frequency coefficients in a vertically biased manner when said two dimensional array of said two dimensional array frequency coefficients comprises eight columns of frequency coefficients and eight rows of frequency coefficients, said encoder:
assigns a scanning order =0 for a two dimensional array frequency coefficient located at n=0 and m=0;
assigns a scanning order =1 for a two dimensional array frequency coefficient located at n=0 and m=1;
assigns a scanning order =2 for a two dimensional array frequency coefficient located at n=0 and m=2;
assigns a scanning order =3 for a two dimensional array frequency coefficient located at n=1 and m=0;
assigns a scanning order =4 for a two dimensional array frequency coefficient located at n=1 and m=1;
assigns a scanning order =5 for a two dimensional array frequency coefficient located at n=0 and m=3;
assigns a scanning order =6 for a two dimensional array frequency coefficient located at n=0 and m=4;
assigns a scanning order =7 for a two dimensional array frequency coefficient located and n=1 and m=2;
assigns a scanning order =8 for a two dimensional array frequency coefficient located and n=2 and m=0;
assigns a scanning order =9 for a two dimensional array frequency coefficient located at n=1 and m=3;
assigns a scanning order =10 for a two dimensional array frequency coefficient located at n=0 and m=5;
assigns a scanning order =11 for a two dimensional array frequency coefficient located at n=0 and m=6;
assigns a scanning order =12 for a two dimensional array frequency coefficient located at n=0 and m=7;
assigns a scanning order =13 for a two dimensional array frequency coefficient located at n=1 and m=4;
assigns a scanning order =14 for a two dimensional array frequency coefficient located at n=2 and m=1;
assigns a scanning order =15 for a two dimensional array frequency coefficient located at n=3 and m=0;
assigns a scanning order =16 for a two dimensional array frequency coefficient located at n=2 and m=2;
assigns a scanning order =17 for a two dimensional array frequency coefficient located at n=1 and m=5;
assigns a scanning order =18 for a two dimensional array frequency coefficient located at n=1 and m=6;
assigns a scanning order =19 for a two dimensional array frequency coefficient located at n=1 and m=7;
assigns a scanning order =20 for a two dimensional array frequency coefficient located at n=2 and m=3;
assigns a scanning order =21 for a two dimensional array frequency coefficient located at n=3 and m=1;
assigns a scanning order =22 for a two dimensional array frequency coefficient located at n=4 and m=0;
assigns a scanning order =23 for a two dimensional array frequency coefficient located at n=3 and m=2;
assigns a scanning order =24 for a two dimensional array frequency coefficient located at n=2 and m=4;
assigns a scanning order =25 for a two dimensional array frequency coefficient located at n=2 and m=5;
assigns a scanning order =26 for a two dimensional array frequency coefficient located at n=2 and m=6;
assigns a scanning order =27 for a two dimensional array frequency coefficient located at n=2 and m=7;
assigns a scanning order =28 for a two dimensional array frequency coefficient located at n=3 and m=3;
assigns a scanning order =29 for a two dimensional array frequency coefficient located at n=4 and m=1;
assigns a scanning order =30 for a two dimensional array frequency coefficient located at n=5 and m=0;
assigns a scanning order =31 for a two dimensional array frequency coefficient located at n=4 and m=2;
assigns a scanning order =32 for a two dimensional array frequency coefficient located at n=3 and m=4;
assigns a scanning order =33 for a two dimensional array frequency coefficient located at n=3 and m=5
assigns a scanning order =34 for a two dimensional array frequency coefficient located at n=3 and m=6;
assigns a scanning order =35 for a two dimensional array frequency coefficient located at n=3 and m=7;

assigns a scanning order =36 for a two dimensional array frequency coefficient located at n=4 and m=3;
assigns a scanning order =37 for a two dimensional array frequency coefficient located at n=5 and m=1;
assigns a scanning order =38 for a two dimensional array frequency coefficient located at n=6 and m=0;
assigns a scanning order =39 for a two dimensional array frequency coefficient located n=5 and m=2;
assigns a scanning order =40 for a two dimensional array frequency coefficient located at n=4 and m=4;
assigns a scanning order =41 for a two dimensional array frequency coefficient located at n=4 and m=5;
assigns a scanning order =42 for a two dimensional array frequency coefficient located at n=4 and m=6;
assigns a scanning order =43 for a two dimensional array frequency coefficient located at n=4 and m=7;
assigns a scanning order =44 for a two dimensional array frequency coefficient located at n=5 and m=3;
assigns a scanning order =45 for a two dimensional array frequency coefficient located at n=6 and m=1;
assigns a scanning order =46 for a two dimensional array frequency coefficient located at n=6 and m=2;
assigns a scanning order =47 for a two dimensional array frequency coefficient located at n=5 and m=4;
assigns a scanning order =48 for a two dimensional array frequency coefficient located at n=5 and m=5;
assigns a scanning order =49 for a two dimensional array frequency coefficient located at n=5 and m=6;
assigns a scanning order =50 for a two dimensional array frequency coefficient located at n=5 and m=7;
assigns a scanning order =51 for a two dimensional array frequency coefficient located at n=6 and m=3;
assigns a scanning order =52 for a two dimensional array frequency coefficient located at n=7 and m=0;
assigns a scanning order =53 for a two dimensional array frequency coefficient located at n=7 and m=1;
assigns a scanning order =54 for a two dimensional array frequency coefficient located at n=6 and m=4;
assigns a scanning order =55 for a two dimensional array frequency coefficient located at n=6 and m=5;
assigns a scanning order =56 for a two dimensional array frequency coefficient located at n=6 and m=6;
assigns a scanning order =57 for a two dimensional array frequency coefficient located at n=6 and m=7;
assigns a scanning order =58 for a two dimensional array frequency coefficient located at n=7 and m=2;
assigns a scanning order =59 for a two dimensional array frequency coefficient located at n=7 and m=3;
assigns a scanning order =60 for a two dimensional array frequency coefficient located at n=7 and m=4;
assigns a scanning order =61 for a two dimensional array frequency coefficient located at n=7 and m=5;
assigns a scanning order =62 for a two dimensional array frequency coefficient located at n=7 and m=6; and
assigns a scanning order =63 for a two dimensional array frequency coefficient located at n=7 and m=7.

28. The device of claim 27, wherein if said one dimensional array of said one dimensional array frequency coefficients comprises sixty-four one dimensional array frequency coefficients, wherein said sixty-four one dimensional array frequency coefficients are represented with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, in a numerical sequential order, wherein a first one dimensional array frequency coefficient is represented by p=0 and a sixty-fourth one dimensional array frequency coefficient is represented by p=63, wherein in scanning said two dimensional array frequency coefficients in a vertically biased manner when said two dimensional array of said two dimensional array frequency coefficients comprises eight columns of frequency coefficients and eight rows of frequency coefficients, said encoder further:

assigns a one dimensional array frequency coefficient located at p=0 a value of said two dimensional array frequency coefficient located at n=0 and m=0;
assigns a one dimensional array frequency coefficient located at p=1 a value of said two dimensional array frequency coefficient located at n=0 and m=1
assigns a one dimensional array frequency coefficient located at p=2 a value of said two dimensional array frequency coefficient located at n=0 and m=2;
assigns a one dimensional array frequency coefficient located at p=3 a value of said two dimensional array frequency coefficient located at n=1 and m=0;
assigns a one dimensional array frequency coefficient located at p=4 a value of said two dimensional array frequency coefficient located at n=1 and m=1;
assigns a one dimensional array frequency coefficient located at p=5 a value of said two dimensional array frequency coefficient located at n=0 and m=3;
assigns a one dimensional array frequency coefficient located at p=6 a value of said two dimensional array frequency coefficient located at n=0 and m=4;
assigns a one dimensional array frequency coefficient located at p=7 a value of said two dimensional array frequency coefficient located at n=1 and m=2;
assigns a one dimensional array frequency coefficient located at p=8 a value of said two dimensional array frequency coefficient located at n=2 and m=0;
assigns a one dimensional array frequency coefficient located at p=9 a value of said two dimensional array frequency coefficient located at n=1 and m=3;
assigns a one dimensional array frequency coefficient located at p=10 a value of said two dimensional array frequency coefficient located at n=0 and m=5;
assigns a one dimensional array frequency coefficient located at p=11 a value of said two dimensional array frequency coefficient located at n=0 and m=6;
assigns a one dimensional array frequency coefficient located at p=12 a value of said two dimensional array frequency coefficient located at n=0 and m=7;
assigns a one dimensional array frequency coefficient located at p=13 a value of said two dimensional array frequency coefficient located at n=1 and m=4;
assigns a one dimensional array frequency coefficient located at p=14 a value of said two dimensional array frequency coefficient located at n=2 and m=1;
assigns a one dimensional array frequency coefficient located at p=15 a value of said two dimensional array frequency coefficient located at n=3 and m=0;
assigns a one dimensional array frequency coefficient located at p=16 a value of said two dimensional array frequency coefficient located at n=2 and m=2;
assigns a one dimensional array frequency coefficient located at p=17 a value of said two dimensional array frequency coefficient located at n=1 and m=5;
assigns a one dimensional array frequency coefficient located at p=18 a value of said two dimensional array frequency coefficient located at n=1 and m=6;
assigns a one dimensional array frequency coefficient located at p=19 a value of said two dimensional array frequency coefficient located at n=1 and m=7;

assigns a one dimensional array frequency coefficient located at p=20 a value of said two dimensional array frequency coefficient located at n=2 and m=3;

assigns a one dimensional array frequency coefficient located at p=21 a value of said two dimensional array frequency coefficient located at n=3 and m=1;

assigns a one dimensional array frequency coefficient located at p=22 a value of said two dimensional array frequency coefficient located at n=4 and m=0;

assigns a one dimensional array frequency coefficient located at p=23 a value of said two dimensional array frequency coefficient located at n=3 and m=2;

assigns a one dimensional array frequency coefficient located at p=24 a value of said two dimensional array frequency coefficient located at n=2 and m=4;

assigns a one dimensional array frequency coefficient located at p=25 a value of said two dimensional array frequency coefficient located at n=2 and m=5;

assigns a one dimensional array frequency coefficient located at p=26 a value of said two dimensional array frequency coefficient located at n=2 and m=6;

assigns a one dimensional array frequency coefficient located at p=27 a value of said two dimensional array frequency coefficient located at n=2 and m=7;

assigns a one dimensional array frequency coefficient located at p=28 a value of said two dimensional array frequency coefficient located at n=3 and m=3;

assigns a one dimensional array frequency coefficient located at p=29 a value of said two dimensional array frequency coefficient located at n=4 and m=1;

assigns a one dimensional array frequency coefficient located at p=30 a value of said two dimensional array frequency coefficient located at n=5 and m=0;

assigns a one dimensional array frequency coefficient located at p=31 a value of said two dimensional array frequency coefficient located at n=4 and m=2;

assigns a one dimensional array frequency coefficient located at p=32 a value of said two dimensional array frequency coefficient located at n=3 and m=4;

assigns a one dimensional array frequency coefficient located at p=33 a value of said two dimensional array frequency coefficient located at n=3 and m=5;

assigns a one dimensional array frequency coefficient located at p=34 a value of said two dimensional array frequency coefficient located at n=3 and m=6;

assigns a one dimensional array frequency coefficient located at p=35 a value of said two dimensional array frequency coefficient located at n=3 and m=7;

assigns a one dimensional array frequency coefficient located at p=36 a value of said two dimensional array frequency coefficient located at n=4 and m=3;

assigns a one dimensional array frequency coefficient located at p=37 a value of said two dimensional array frequency coefficient located at n=5 and m=1;

assigns a one dimensional array frequency coefficient located at p=38 a value of said two dimensional array frequency coefficient located at n=6 and m=0;

assigns a one dimensional array frequency coefficient located at p=39 a value of said two dimensional array frequency coefficient located at n=5 and m=2;

assigns a one dimensional array frequency coefficient located at p=40 a value of said two dimensional array frequency coefficient located at n=4 and m=4;

assigns a one dimensional array frequency coefficient located at p=41 a value of said two dimensional array frequency coefficient located at n=4 and m=5;

assigns a one dimensional array frequency coefficient located at p=42 a value of said two dimensional array frequency coefficient located at n=4 and m=6;

assigns a one dimensional array frequency coefficient located at p=43 a value of said two dimensional array frequency coefficient located at n=4 and m=7;

assigns a one dimensional array frequency coefficient located at p=44 a value of said two dimensional array frequency coefficient located at n=5 and m=3;

assigns a one dimensional array frequency coefficient located at p=45 a value of said two dimensional array frequency coefficient located at n=6 and m=1;

assigns a one dimensional array frequency coefficient located at p=46 a value of said two dimensional array frequency coefficient located at n=6 and m=2;

assigns a one dimensional array frequency coefficient located at p=47 a value of said two dimensional array frequency coefficient located at n=5 and m=4;

assigns a one dimensional array frequency coefficient located at p=48 a value of said two dimensional array frequency coefficient located at n=5 and m=5;

assigns a one dimensional array frequency coefficient located at p=49 a value of said two dimensional array frequency coefficient located at n=5 and m=6;

assigns a one dimensional array frequency coefficient located at p=50 a value of said two dimensional array frequency coefficient located at n=5 and m=7;

assigns a one dimensional array frequency coefficient located at p=51 a value of said two dimensional array frequency coefficient located at n=6 and m=3;

assigns a one dimensional array frequency coefficient located at p=52 a value of said two dimensional array frequency coefficient located at n=7 and m=0;

assigns a one dimensional array frequency coefficient located at p=53 a value of said two dimensional array frequency coefficient located at n=7 and m=1;

assigns a one dimensional array frequency coefficient located at p=54 a value of said two dimensional array frequency coefficient located at n=6 and m=4;

assigns a one dimensional array frequency coefficient located at p=55 a value of said two dimensional array frequency coefficient located at n=6 and m=5;

assigns a one dimensional array frequency coefficient located at p=56 a value of said two dimensional array frequency coefficient located at n=6 and m=6;

assigns a one dimensional array frequency coefficient located at p=57 a value of said two dimensional array frequency coefficient located at n=6 and m=7;

assigns a one dimensional array frequency coefficient located at p=58 a value of said two dimensional array frequency coefficient located at n=7 and m=2;

assigns a one dimensional array frequency coefficient located at p=59 a value of said two dimensional array frequency coefficient located at n=7 and m3;

assigns a one dimensional array frequency coefficient located at p=60a value of said two dimensional array frequency coefficient located at n=7 and m=4;

assigns a one dimensional array frequency coefficient located at p=61a value of said two dimensional array frequency coefficient located at n=7 and m=5;

assigns a one dimensional array frequency coefficient located at p=62 a value of said two dimensional array frequency coefficient located at n=7 and m=6; and assigns a one dimensional array frequency coefficient located at p=63 a value of said two dimensional array frequency coefficient located at n=7 and m=7.

29. The system of claim 28, wherein if said one dimensional array of said one dimensional array frequency coefficients comprises sixteen one dimensional array frequency coefficients, wherein said sixteen one dimensional array frequency coefficients are represented with a variable p=0, 1, 2, 3, 4, 5, 6, 7, 8, 9, 10, 11, 12, 13, 14, 15, in a numerical sequential order, wherein a first one dimensional array frequency coefficient is represented by p=0 and a sixteenth one dimensional array frequency coefficient is represented by p=15, wherein in sequentially scanning said two dimensional array frequency coefficients in a vertically biased manner said encoder further:

assigns a one dimensional array frequency coefficient located at p=0 a value of said two dimensional array frequency coefficient located at n=0 and m=0;

assigns a one dimensional array frequency coefficient located at p=1 a value of said two dimensional array frequency coefficient located at n=0 and m=1;

assigns a one dimensional array frequency coefficient located at p=2 a value of said two dimensional array frequency coefficient located at n=1 and m=0;

assigns a one dimensional array frequency coefficient located at p=3 a value of said two dimensional array frequency coefficient located at n=0 and m=2;

assigns a one dimensional array frequency coefficient located at p=4 a value of said two dimensional array frequency coefficient located at n=0 and m=3;

assigns a one dimensional array frequency coefficient located at p=5 a value of said two dimensional array frequency coefficient located at n=1 and m=1;

assigns a one dimensional array frequency coefficient located at p=6 a value of said two dimensional array frequency coefficient located at n=1 and m=2;

assigns a one dimensional array frequency coefficient located at p=7 a value of said two dimensional array frequency coefficient located at n=1 and m=3;

assigns a one dimensional array frequency coefficient located at p=8 a value of said two dimensional array frequency coefficient located at n=2 and m=0;

assigns a one dimensional array frequency coefficient located at p=9 a value of said two dimensional array frequency coefficient located at n=2 and m=1;

assigns a one dimensional array frequency coefficient located at p=10 a value of said two dimensional array frequency coefficient located at n=2 and m2;

assigns a one dimensional array frequency coefficient located at p=11 a value of said two dimensional array frequency coefficient located at n=2 and m=3;

assigns a one dimensional array frequency coefficient located at p=12 a value of said two dimensional array frequency coefficient located at n=3 and m=0;

assigns a one dimensional array frequency coefficient located at p=13 a value of said two dimensional array frequency coefficient located at n=3 and m=1;

assigns a one dimensional array frequency coefficient located at p=14 a value of said two dimensional array frequency coefficient located at n=3 and m=2; and assigns a one dimensional array frequency coefficient located at p=15 a value of said two dimensional array frequency coefficient located at n=3 and m=3.

30. The device of claim 19, wherein if said one dimensional array of said one dimensional array frequency coefficients comprises sixteen one dimensional array frequency coefficients, wherein said sixteen one dimensional array frequency coefficients are represented with a variable p=0, 1, 2, 3, 4, 5, 6, 7, 8, 9, 10, 11, 12, 13, 14, 15, in a numerical sequential order, wherein a first one dimensional array frequency coefficient is represented by p=0 and a sixteenth one dimensional array frequency coefficient is represented by p=15, wherein in sequentially scanning said two dimensional array frequency coefficients in a vertically biased manner, said encoder further:

assigns a one dimensional array frequency coefficient located at p=0 a value of said two dimensional array frequency coefficient located at n=0 and m=0;

assigns a one dimensional array frequency coefficient located at p=1 a value of said two dimensional array frequency coefficient located at n=0 and m=1;

assigns a one dimensional array frequency coefficient located at p=2 a value of said two dimensional array frequency coefficient located at n=1 and m=0;

assigns a one dimensional array frequency coefficient located at p=3 a value of said two dimensional array frequency coefficient located at n=0 and m=2;

assigns a one dimensional array frequency coefficient located at p=4 a value of said two dimensional array frequency coefficient located at n=0 and m=3;

assigns a one dimensional array frequency coefficient located at p=5 a value of said two dimensional array frequency coefficient located at n=1 and m=1;

assigns a one dimensional array frequency coefficient located at p=6 a value of said two dimensional array frequency coefficient located at n=1 and m=2;

assigns a one dimensional array frequency coefficient located at p=7 a value of said two dimensional array frequency coefficient located at n=1 and m=3;

assigns a one dimensional array frequency coefficient located at p=8 a value of said two dimensional array frequency coefficient located at n=2 and m=0;

assigns a one dimensional array frequency coefficient located at p=9 a value of said two dimensional array frequency coefficient located at n=2 and m=1;

assigns a one dimensional array frequency coefficient located at p=10 a value of said two dimensional array frequency coefficient located at n=2 and m=2;

assigns a one dimensional array frequency coefficient located at p=11 a value of said two dimensional array frequency coefficient located at n=2 and m=3;

assigns a one dimensional array frequency coefficient located at p=12 a value of said two dimensional array frequency coefficient located at n=3 and m=0;

assigns a one dimensional array frequency coefficient located at p=13 a value of said two dimensional array frequency coefficient located at n=3 and m=1;

assigns a one dimensional array frequency coefficient located at p=14 a value of said two dimensional array frequency coefficient located at n=3 and m=2; and assigns a one dimensional array frequency coefficient located at p=15 a value of said two dimensional array frequency coefficient located at n3 and m=3.

31. A device comprising:

a decoder configured to perform transform-based decoding of encoded digital video content, said digital video content comprising a stream of pictures, slices, or macroblocks which are at least one of intra, predicted or bi-predicted pictures, slices, or macroblocks, in the form of blocks of pixels forming a one dimensional array of one dimensional array frequency coefficients including high-energy low frequency coefficients and low-energy high frequency coefficients, wherein said decoder scans said one dimensional array frequency coefficients in a numerical sequential order, producing a two dimensional array of two dimensional array frequency coefficients and, wherein the high-energy low frequency coefficients are scanned before the low-energy high frequency coefficients, wherein when said one dimensional array of said one dimensional array frequency coefficients comprises sixteen one dimensional array frequency coefficients, said decoder:

represents said sixteen one dimensional array frequency coefficients with a variable p=0, 1, 2, 3, 4, 5, 6, 7, 8, 9, 10, 11, 12, 13, 14, 15, in a numerical sequential order, wherein a first one dimensional array frequency coefficient is represented by p=0 and a sixteenth one dimensional array frequency coefficient is represented by p=15; and sequentially scans said one dimensional array of said one dimensional array frequency coefficients in said numerical sequential order, said sequential scanning order starting at p=0 and ending at p=15 and producing said two dimensional array of said two dimensional array frequency coefficients, wherein if said two dimensional array of said two dimensional array frequency coefficients comprises 4 columns of frequency coefficients and 4 rows of frequency coefficients, wherein said columns are represented with a variable n=0, 1, 2, or 3, wherein n=0 is at least one of a first or leftmost column, n=is a second column, n=2 is a third column, and n=3 is at least one of a fourth or rightmost column, and wherein said rows are represented with a variable m=0, 1, 2, or 3, wherein m=0 is at least one of a first or top row, m=1 is a second row, m=2 is a third row, and m=3 is at least one of a fourth or bottom row, wherein in sequentially scanning said one dimensional array frequency coefficients, said decoder:

assigns a two dimensional array frequency coefficient located at n=0 and m=0 a value of said one dimensional array frequency coefficient located at p=0;

assigns a two dimensional array frequency coefficient located at n=0 and m=1 a value of said one dimensional array frequency coefficient located at p=1 assigns a two dimensional array frequency coefficient located at n=1 and m=0 a value of said one dimensional array frequency coefficient located at p=2 assigns a two dimensional array frequency coefficient located at n=0 and m=2 a value of said one dimensional array frequency coefficient located at p=3;

assigns a two dimensional array frequency coefficient located at n=0 and m=3 a value of said one dimensional array frequency coefficient located at p=4 assigns a two dimensional array frequency coefficient located at n=1 and m=1 a value of said one dimensional array frequency coefficient located at p=5;

assigns a two dimensional array frequency coefficient located at n=1 and m=2 a value of said one dimensional array frequency coefficient located at p=6;

assigns a two dimensional array frequency coefficient located at n=1 and m=3 a value of said one dimensional array frequency coefficient located at p=7;

assigns a two dimensional array frequency coefficient located at n=2 and m=0 a value of said one dimensional array frequency coefficient located at p=8;

assigns a two dimensional array frequency coefficient located at n=2 and m=1 a value of said one dimensional array frequency coefficient located at p=9;

assigns a two dimensional array frequency coefficient located at n=2 and m=2 a value of said one dimensional array frequency coefficient located at p =10;

assigns a two dimensional array frequency coefficient located at n=2 and m=3 a value of said one dimensional array frequency coefficient located at p=11;

assigns a two dimensional array frequency coefficient located at n=3 and m=0 a value of said one dimensional array frequency coefficient located at p =12;

assigns a two dimensional array frequency coefficient located at n=3 and m=1 a value of said one dimensional array frequency coefficient located at p =13;

assigns a two dimensional array frequency coefficient located at n=3 and m=2 a value of said one dimensional array frequency coefficient located at p =14; and assigns a two dimensional array frequency coefficient located at n=3 and m=3 a value of said one dimensional array frequency coefficient located at p =15.

32. The device of claim 31, wherein if said one dimensional array of said one dimensional array frequency coefficients comprises thirty-two one dimensional array frequency coefficients, said decoder:

represents said thirty-two one dimensional array frequency coefficients with a variable p=0, 1,2,3,4,5,6,7,8,9, 10, 11, 12, 13, 14, 15, 16, 17, 18, 19,20,21,22,23,24,25, 26, 27, 28, 29, 30, 31, in a numerical sequential order, wherein a first one dimensional array frequency coefficient is represented by p=0 and a thirty-second one dimensional array frequency coefficient is represented by p=31;

wherein said decoder sequentially scans said one dimensional array of said one dimensional array frequency coefficients in said numerical sequential order, said sequential scanning order starting at p=0 and ending at p=31 and producing said two dimensional array of said two dimensional array frequency coefficients.

33. The device of claim 32, wherein if said two dimensional array of said two dimensional array frequency coefficients comprises 4 columns of frequency coefficients and 8 rows of frequency coefficients, wherein said columns are represented with a variable n=0, 1, 2, or 3, wherein n=0 is at least one of a first or leftmost column, n=1 is a second column, n=2 is a third column, and n=3 is at least one of a fourth or rightmost column, and wherein said rows are represented with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row, wherein in sequentially scanning said one dimensional array frequency coefficients, said decoder:

assigns a two dimensional array frequency coefficient located at n=0 and m=0 a value of said one dimensional array frequency coefficient located at p =0;

assigns a two dimensional array frequency coefficient located at n=0 and m=1 a value of said one dimensional array frequency coefficient located at p =1;

assigns a two dimensional array frequency coefficient located at n=0 and m=2 a value of said one dimensional array frequency coefficient located at p =2;

assigns a two dimensional array frequency coefficient located at n=0 and m=3 a value of said one dimensional array frequency coefficient located at p =3;

assigns a two dimensional array frequency coefficient located at n=1 and m=0 a value of said one dimensional array frequency coefficient located at p =4;

assigns a two dimensional array frequency coefficient located at n=1 and m=1 a value of said one dimensional array frequency coefficient located at p =5;

assigns a two dimensional array frequency coefficient located at n=1 and m=2 a value of said one dimensional array frequency coefficient located at p =6;

assigns a two dimensional array frequency coefficient located at n=0 and m=4 a value of said one dimensional array frequency coefficient located at p =7;

assigns a two dimensional array frequency coefficient located at n=0 and m=5 a value of said one dimensional array frequency coefficient located at p =8;

assigns a two dimensional array frequency coefficient located at n=0 and m=6 a value of said one dimensional array frequency coefficient located at p 9;

assigns a two dimensional array frequency coefficient located at n=0 and m=7 a value of said one dimensional array frequency coefficient located at p =10;

assigns a two dimensional array frequency coefficient located at n=1 and m=3 a value of said one dimensional array frequency coefficient located at p =11;

assigns a two dimensional array frequency coefficient located at n=2 and m=0 a value of said one dimensional array frequency coefficient located at p =12;

assigns a two dimensional array frequency coefficient located at n=2 and m=1 a value of said one dimensional array frequency coefficient located at p =13;

assigns a two dimensional array frequency coefficient located at n=2 and m=2 a value of said one dimensional array frequency coefficient located at p =14;

assigns a two dimensional array frequency coefficient located at n=1 and m=4 a value of said one dimensional array frequency coefficient located at p =15;

assigns a two dimensional array frequency coefficient located at n=1 and m=5 a value of said one dimensional array frequency coefficient located at p =16;

assigns a two dimensional array frequency coefficient located at n=1 and m=6 a value of said one dimensional array frequency coefficient located at p =17;

assigns a two dimensional array frequency coefficient located at n=1 and m=7 a value of said one dimensional array frequency coefficient located at p =18;

assigns a two dimensional array frequency coefficient located at n=2 and m=3 a value of said one dimensional array frequency coefficient located at p =19;

assigns a two dimensional array frequency coefficient located at n=3 and m=0 a value of said one dimensional array frequency coefficient located at p =20;

assigns a two dimensional array frequency coefficient located at n=3 and m=1 a value of said one dimensional array frequency coefficient located at p =21;

assigns a two dimensional array frequency coefficient located at n=3 and m=2 a value of said one dimensional array frequency coefficient located at p =22;

assigns a two dimensional array frequency coefficient located at n=2 and m=4 a value of said one dimensional array frequency coefficient located at p =23;

assigns a two dimensional array frequency coefficient located at n=2 and m=5 a value of said one dimensional array frequency coefficient located at p =24;

assigns a two dimensional array frequency coefficient located at n=2 and m=6 a value of said one dimensional array frequency coefficient located at p =25;

assigns a two dimensional array frequency coefficient located at n=2 and m=7 a value of said one dimensional array frequency coefficient located at p =26;

assigns a two dimensional array frequency coefficient located at n=3 and m=3 a value of said one dimensional array frequency coefficient located at p =27;

assigns a two dimensional array frequency coefficient located at n=3 and m=4 a value of said one dimensional array frequency coefficient located at p =28;

assigns a two dimensional array frequency coefficient located at n=3 and m=5 a value of said one dimensional array frequency coefficient located at p =29;

assigns a two dimensional array frequency coefficient located at n=3 and m=6 a value of said one dimensional array frequency coefficient located at p =30; and assigns a two dimensional array frequency coefficient located at n=3 and m=7 a value of said one dimensional array frequency coefficient located at p =31.

34. The device of claim 32, wherein if said two dimensional array of said two dimensional array frequency coefficients comprises 8 columns of frequency coefficients and 4 rows of frequency coefficients, wherein said columns are represented with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column, and wherein said rows are represented with a variable m=0, 1, 2, or 3, wherein m=0 is at least one of a first or top row, m=1 is a second row, m=2 is a third row, and m=3 is at least one of a fourth or bottom row, wherein in sequentially scanning said one dimensional array frequency coefficients, said decoder:

assigns a two dimensional array frequency coefficient located at n=0 and m=0 a value of said one dimensional array frequency coefficient located at p =0;

assigns a two dimensional array frequency coefficient located at n=0 and m=1 a value of said one dimensional array frequency coefficient located at p =1;

assigns a two dimensional array frequency coefficient located at n=1 and m=0 a value of said one dimensional array frequency coefficient located at p =2;

assigns a two dimensional array frequency coefficient located at n=0 and m=2 a value of said one dimensional array frequency coefficient located at p =3;

assigns a two dimensional array frequency coefficient located at n=0 and m=3 a value of said one dimensional array frequency coefficient located at p =4;

assigns a two dimensional array frequency coefficient located at n=1 and m=1 a value of said one dimensional array frequency coefficient located at p =5;

assigns a two dimensional array frequency coefficient located at n=2 and m=0 a value of said one dimensional array frequency coefficient located at p =6;

assigns a two dimensional array frequency coefficient located at n=1 and m=2 a value of said one dimensional array frequency coefficient located at p =7;

assigns a two dimensional array frequency coefficient located at n=1 and m=3 a value of said one dimensional array frequency coefficient located at p =8;

assigns a two dimensional array frequency coefficient located at n=2 and m=1 a value of said one dimensional array frequency coefficient located at p =9;

assigns a two dimensional array frequency coefficient located at n=3 and m=0 a value of said one dimensional array frequency coefficient located at p =10;

assigns a two dimensional array frequency coefficient located at n=2 and m=2 a value of said one dimensional array frequency coefficient located at p =11;

assigns a two dimensional array frequency coefficient located at n=2 and m=3 a value of said one dimensional array frequency coefficient located at p =12;

assigns a two dimensional array frequency coefficient located at n=3 and m=1 a value of said one dimensional array frequency coefficient located at p =13;

assigns a two dimensional array frequency coefficient located at n=4 and m=0 a value of said one dimensional array frequency coefficient located at p =14;

assigns a two dimensional array frequency coefficient located at n=3 and m=2 a value of said one dimensional array frequency coefficient located at p =15;

assigns a two dimensional array frequency coefficient located at n=3 and m=3 a value of said one dimensional array frequency coefficient located at p =16;

assigns a two dimensional array frequency coefficient located at n=4 and m=1 a value of said one dimensional array frequency coefficient located at p =17;

assigns a two dimensional array frequency coefficient located at n=5 and m=0 a value of said one dimensional array frequency coefficient located at p =18;

assigns a two dimensional array frequency coefficient located at n=4 and m=2 a value of said one dimensional array frequency coefficient located at p =19;

assigns a two dimensional array frequency coefficient located at n=4 and m=3 a value of said one dimensional array frequency coefficient located at p =20;

assigns a two dimensional array frequency coefficient located at n=5 and m=1 a value of said one dimensional array frequency coefficient located at p =21;

assigns a two dimensional array frequency coefficient located at n=6 and m=0 a value of said one dimensional array frequency coefficient located at p =22;

assigns a two dimensional array frequency coefficient located at n=5 and m=2 a value of said one dimensional array frequency coefficient located at p =23;

assigns a two dimensional array frequency coefficient located at n=5 and m=3 a value of said one dimensional array frequency coefficient located at p =24;

assigns a two dimensional array frequency coefficient located at n=6 and m=1 a value of said one dimensional array frequency coefficient located at p =25;

assigns a two dimensional array frequency coefficient located at n=7 and m=0 a value of said one dimensional array frequency coefficient located at p =26;

assigns a two dimensional array frequency coefficient located at n=6 and m=2 a value of said one dimensional array frequency coefficient located at p =27;

assigns a two dimensional array frequency coefficient located at n=6 and m=3 a value of said one dimensional array frequency coefficient located at p =28;

assigns a two dimensional array frequency coefficient located at n=7 and m=1 a value of said one dimensional array frequency coefficient located at p =29;

assigns a two dimensional array frequency coefficient located at n=7 and m=2 a value of said one dimensional array frequency coefficient located at p =30; and assigns a two dimensional array frequency coefficient located at n=7 and m=3 a value of said one dimensional array frequency coefficient located at p =31.

35. The device of claim 31, wherein if said one dimensional array of said one dimensional array frequency coefficients comprises sixty-four one dimensional array frequency coefficients, said decoder:

represents said sixty-four one dimensional array frequency coefficients with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, in a numerical sequential order, wherein a first one dimensional array frequency coefficient is represented by p=0 and a sixty-fourth one dimensional array frequency coefficient is represented by p=63;

wherein said decoder sequentially scans said one dimensional array of said one dimensional array frequency coefficients in said numerical sequential order, said sequential scanning order starting at p=0 and ending at p=63 and producing said two dimensional array of said two dimensional array frequency coefficients.

36. The device of claim 35, wherein if said two dimensional array of said two dimensional array frequency coefficients comprises 8 columns of frequency coefficients and 8 rows of frequency coefficients, wherein said columns are represented with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column, and wherein said rows are represented with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row, wherein in sequentially scanning said one dimensional array frequency coefficients, said decoder:

assigns a two dimensional array frequency coefficient located at n=0 and m=0 a value of said one dimensional array frequency coefficient located at p =0;

assigns a two dimensional array frequency coefficient located at n=0 and m=1 a value of said one dimensional array frequency coefficient located at p =1;

assigns a two dimensional array frequency coefficient located at n=0 and m=2 a value of said one dimensional array frequency coefficient located at p =2;

assigns a two dimensional array frequency coefficient located at n=1 and m=0 a value of said one dimensional array frequency coefficient located at p =3;

assigns a two dimensional array frequency coefficient located at n=1 and m=1 a value of said one dimensional array frequency coefficient located at p =4;

assigns a two dimensional array frequency coefficient located at n=0 and m=3 a value of said one dimensional array frequency coefficient located at p =5;

assigns a two dimensional array frequency coefficient located at n=0 and m=4 a value of said one dimensional array frequency coefficient located at p =6;

assigns a two dimensional array frequency coefficient located at n=1 and m=2 a value of said one dimensional array frequency coefficient located at p =7;

assigns a two dimensional array frequency coefficient located at n=2 and m=0 a value of said one dimensional array frequency coefficient located at p =8;

assigns a two dimensional array frequency coefficient located at n=1 and m=3 a value of said one dimensional array frequency coefficient located at p =9;

assigns a two dimensional array frequency coefficient located at n=0 and m=5 a value of said one dimensional array frequency coefficient located at p =10;

assigns a two dimensional array frequency coefficient located at n=0 and m=6 a value of said one dimensional array frequency coefficient located at p =11;

assigns a two dimensional array frequency coefficient located at n=0 and m=7 a value of said one dimensional array frequency coefficient located at p =12;

assigns a two dimensional array frequency coefficient located at n=1 and m=4 a value of said one dimensional array frequency coefficient located at p =13;

assigns a two dimensional array frequency coefficient located at n=2 and m=1 a value of said one dimensional array frequency coefficient located at p =14;
assigns a two dimensional array frequency coefficient located at n=3 and m=0 a value of said one dimensional array frequency coefficient located at p =15;
assigns a two dimensional array frequency coefficient located at n=2 and m=2 a value of said one dimensional array frequency coefficient located at p =16;
assigns a two dimensional array frequency coefficient located at n=1 and m=5 a value of said one dimensional array frequency coefficient located at p =17;
assigns a two dimensional array frequency coefficient located at n=1 and m=6 a value of said one dimensional array frequency coefficient located at p =18;
assigns a two dimensional array frequency coefficient located at n=1 and m7 a value of said one dimensional array frequency coefficient located at p =19;
assigns a two dimensional array frequency coefficient located at n=2 and m=3 a value of said one dimensional array frequency coefficient located at p =20;
assigns a two dimensional array frequency coefficient located at n=3 and m=1 a value of said one dimensional array frequency coefficient located at p =21;
assigns a two dimensional array frequency coefficient located at n=4 and m=0 a value of said one dimensional array frequency coefficient located at p =22;
assigns a two dimensional array frequency coefficient located at n=3 and m=2 a value of said one dimensional array frequency coefficient located at p =23;
assigns a two dimensional array frequency coefficient located at n=2 and m=4 a value of said one dimensional array frequency coefficient located at p =24;
assigns a two dimensional array frequency coefficient located at n=2 and m=5 a value of said one dimensional array frequency coefficient located at p =25;
assigns a two dimensional array frequency coefficient located at n=2 and m=6 a value of said one dimensional array frequency coefficient located at p =26;
assigns a two dimensional array frequency coefficient located at n=2 and m=7 a value of said one dimensional array frequency coefficient located at p =27;
assigns a two dimensional array frequency coefficient located at n=3 and m=3 a value of said one dimensional array frequency coefficient located at p =28;
assigns a two dimensional array frequency coefficient located at n=4 and m=1 a value of said one dimensional array frequency coefficient located at p =29;
assigns a two dimensional array frequency coefficient located at n=5 and m=0 a value of said one dimensional array frequency coefficient located at p =30;
assigns a two dimensional array frequency coefficient located at n=4 and m=2 a value of said one dimensional array frequency coefficient located at p =31;
assigns a two dimensional array frequency coefficient located at n=3 and m=4 a value of said one dimensional array frequency coefficient located at p =32;
assigns a two dimensional array frequency coefficient located at n=3 and m=5 a value of said one dimensional array frequency coefficient located at p =33;
assigns a two dimensional array frequency coefficient located at n=3 and m=6 a value of said one dimensional array frequency coefficient located at p =34;
assigns a two dimensional array frequency coefficient located at n=3 and m=7 a value of said one dimensional array frequency coefficient located at p =35;
assigns a two dimensional array frequency coefficient located at n=4 and m=3 a value of said one dimensional array frequency coefficient located at p =36;
assigns a two dimensional array frequency coefficient located at n=5 and m=1 a value of said one dimensional array frequency coefficient located at p =37;
assigns a two dimensional array frequency coefficient located at n=6 and m=0 a value of said one dimensional array frequency coefficient located at p =38;
assigns a two dimensional array frequency coefficient located at n=5 and m=2 a value of said one dimensional array frequency coefficient located at p =39;
assigns a two dimensional array frequency coefficient located at n=4 and m=4 a value of said one dimensional array frequency coefficient located at p =40;
assigns a two dimensional array frequency coefficient located at n=4 and m=5 a value of said one dimensional array frequency coefficient located at p =41;
assigns a two dimensional array frequency coefficient located at n=4 and m=6 a value of said one dimensional array frequency coefficient located at p =42;
assigns a two dimensional array frequency coefficient located at n=4 and m=7 a value of said one dimensional array frequency coefficient located at p =43;
assigns a two dimensional array frequency coefficient located at n=5 and m=3 a value of said one dimensional array frequency coefficient located at p =44;
assigns a two dimensional array frequency coefficient located at n=6 and m=1 a value of said one dimensional array frequency coefficient located at p =45;
assigns a two dimensional array frequency coefficient located at n=6 and m=2 a value of said one dimensional array frequency coefficient located at p =46;
assigns a two dimensional array frequency coefficient located at n=5 and m=4 a value of said one dimensional array frequency coefficient located at p =47;
assigns a two dimensional array frequency coefficient located at n=5 and m=5 a value of said one dimensional array frequency coefficient located at p =48;
assigns a two dimensional array frequency coefficient located at n=5 and m=6 a value of said one dimensional array frequency coefficient located at p =49;
assigns a two dimensional array frequency coefficient located at n=5 and m=7 a value of said one dimensional array frequency coefficient located at p =50;
assigns a two dimensional array frequency coefficient located at n=6 and m=3 a value of said one dimensional array frequency coefficient located at p =51;
assigns a two dimensional array frequency coefficient located at n=7 and m=0 a value of said one dimensional array frequency coefficient located at p =52;
assigns a two dimensional array frequency coefficient located at n=7 and m=1 a value of said one dimensional array frequency coefficient located at p =53;
assigns a two dimensional array frequency coefficient located at n=6 and m=4 a value of said one dimensional array frequency coefficient located at p =54;
assigns a two dimensional array frequency coefficient located at n=6 and m=5 a value of said one dimensional array frequency coefficient located at p =55;
assigns a two dimensional array frequency coefficient located at n=6 and m=6 a value of said one dimensional array frequency coefficient located at p =56;
assigns a two dimensional array frequency coefficient located at n=6 and m=7 a value of said one dimensional array frequency coefficient located at p =57;

assigns a two dimensional array frequency coefficient located at n=7 and m=2 a value of said one dimensional array frequency coefficient located at p =58;

assigns a two dimensional array frequency coefficient located at n=7 and m=3 a value of said one dimensional array frequency coefficient located at p =59;

assigns a two dimensional array frequency coefficient located at n=7 and m=4 a value of said one dimensional array frequency coefficient located at p =60;

assigns a two dimensional array frequency coefficient located at n=7 and m=5 a value of said one dimensional array frequency coefficient located at p =61;

assigns a two dimensional array frequency coefficient located at n=7 and m=6 a value of said one dimensional array frequency coefficient located at p =62; and assigns a two dimensional array frequency coefficient located at n=7 and m=7 a value of said one dimensional array frequency coefficient located at p =63.

37. A transform-based encoding system for encoding digital video content, said digital video content comprising a stream of pictures, slices, or macroblocks each of which are at least one of intra, predicted or bi-predicted pictures, slices, or macroblocks, in the form of blocks of pixels forming a two dimensional array of two dimensional array frequency coefficients including high-energy low frequency coefficients and low-energy high frequency coefficients, said system comprising:

means for sequentially scanning said two dimensional array frequency coefficients from each of said blocks in a manner that is vertically biased, wherein the high-energy low frequency coefficients are scanned before the low-energy high frequency coefficients; and means for producing a one dimensional array of one dimensional array frequency coefficients, wherein when said two dimensional array of said two dimensional array frequency coefficients comprises 4 columns of frequency coefficients and 4 rows of frequency coefficients, said system further comprises:

means for representing said columns with a variable n=0, 1, 2, or 3, wherein n=0 is at least one of a first or leftmost column, n=1 is a second column, n=2 is a third column, and n=3 is at least one of a fourth or rightmost column:

means for representing said rows with a variable m=0, 1, 2, or 3, wherein m=0 is at least one of a first or top row, m=1 is a second row, m=2 is a third row, and m=3 is at least one of a fourth or bottom row; and means for sequentially scanning said two dimensional array of said two dimensional array frequency coefficients in a sequential scanning order that is vertically biased, said scanning order starting at 0 and ending at 15, wherein said means for sequentially scanning said two dimensional array frequency coefficients in a vertically biased manner further comprises:

means for assigning a scanning order =0 for a two dimensional array frequency coefficient located at n=0 and m=0;

means for assigning a scanning order =1 for a two dimensional array frequency coefficient located at n=0 and m=1;

means for assigning a scanning order =2 for a two dimensional array frequency coefficient located at n=1 and m=0;

means for assigning a scanning order =3 for a two dimensional array frequency coefficient located at n=0 and m=2;

means for assigning a scanning order =4 for a two dimensional array frequency coefficient located at n=0 and m=3;

means for assigning a scanning order =5 for a two dimensional array frequency coefficient located at n=1 and m=1;

means for assigning a scanning order =6 for a two dimensional array frequency coefficient located at n=1 and m=2;

means for assigning a scanning order =7 for a two dimensional array frequency coefficient located at n=1 and m=3;

means for assigning a scanning order =8 for a two dimensional array frequency coefficient located at n=2 and m=0;

means for assigning a scanning order =9 for a two dimensional array frequency coefficient located at n=2 and m=1;

means for assigning a scanning order =10 for a two dimensional array frequency coefficient located at n=2 and m=2;

means for assigning a scanning order =11 for a two dimensional array frequency coefficient located at n=2 and m=3;

means for assigning a scanning order =12 for a two dimensional array frequency coefficient located at n=3 and m=0;

means for assigning a scanning order =13 for a two dimensional array frequency coefficient located at n=3 and m=1;

means for assigning a scanning order =14 for a two dimensional array frequency coefficient located at n=3 and m=2; and means for assigning a scanning order =15 for a two dimensional array frequency coefficient located at n=3 and m=3.

38. The system of claim 37, wherein if said two dimensional array of said two dimensional array frequency coefficients comprises 4 columns of frequency coefficients and 8 rows of frequency coefficients, said system further comprises:

means for representing said columns with a variable n=0, 1, 2, or 3, wherein n=0 is at least one of a first or leftmost column, n=1 is a second column, n=2 is a third column, and n=3 is at least one of a fourth or rightmost column;

means for representing said rows with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row; and means for sequential sequentially scanning said two dimensional array of said two dimensional array frequency coefficients in a sequential scanning order that is vertically biased, said sequential scanning order starting at 0 and ending at 31.

39. The system of claim 38, wherein said means for sequentially scanning said two dimensional array frequency coefficients in a vertically biased manner when said two dimensional array of said two dimensional array frequency coefficients comprises 4 columns of frequency coefficients and 8 rows of frequency coefficients further comprises:

means for assigning a scanning order =0 for a two dimensional array frequency coefficient located at n=0 and m=0;

means for assigning a scanning order =1 for a two dimensional array frequency coefficient located at n=0 and m=1;

means for assigning a scanning order =2 for a two dimensional array frequency coefficient located at n=0 and m=2;

means for assigning a scanning order =3 for a two dimensional array frequency coefficient located at n=0 and m=3;

means for assigning a scanning order =4 for a two dimensional array frequency coefficient located at n=1 and m=0;

means for assigning a scanning order =5 for a two dimensional array frequency coefficient located at n=1 and m=1;

means for assigning a scanning order =6 for a two dimensional array frequency coefficient located at n=1 and m=2;

means for assigning a scanning order =7 for a two dimensional array frequency coefficient located at n=0 and m=4;

means for assigning a scanning order =8 for a two dimensional array frequency coefficient located at n=0 and m=5;

means for assigning a scanning order =9 for a two dimensional array frequency coefficient located at n=0 and m=6;

means for assigning a scanning order =10 for a two dimensional array frequency coefficient located at n=0 and m=7;

means for assigning a scanning order =11 for a two dimensional array frequency coefficient located at n=1 and m=3;

means for assigning a scanning order =12 for a two dimensional array frequency coefficient located at n=2 and m=0;

means for assigning a scanning order =13 for a two dimensional array frequency coefficient located at n=2 and m=1;

means for assigning a scanning order =14 for a two dimensional array frequency coefficient located at n=2 and m=2;

means for assigning a scanning order =15 for a two dimensional array frequency coefficient located at n=1 and m=4;

means for assigning a scanning order =16 for a two dimensional array frequency coefficient located at n=1 and m=5;

means for assigning a scanning order =17 for a two dimensional array frequency coefficient located at n=1 and m=6;

means for assigning a scanning order =18 for a two dimensional array frequency coefficient located at n=1 and m=7;

means for assigning a scanning order =19 for a two dimensional array frequency coefficient located at n=2 and m=3;

means for assigning a scanning order =20 for a two dimensional array frequency coefficient located at n=3 and m=0;

means for assigning a scanning order =21 for a two dimensional array frequency coefficient located at n=3 and m=1;

means for assigning a scanning order =22 for a two dimensional array frequency coefficient located at n=3 and m=2;

means for assigning a scanning order =23 for a two dimensional array frequency coefficient located at n=2 and m=4;

means for assigning a scanning order =24 for a two dimensional array frequency coefficient located at n=2 and m=5;

means for assigning a scanning order =25 for a two dimensional array frequency coefficient located at n=2 and m=6;

means for assigning a scanning order =26 for a two dimensional array frequency coefficient located at n=2 and m=7;

means for assigning a scanning order =27 for a two dimensional array frequency coefficient located at n=3 and m=3;

means for assigning a scanning order =28 for a two dimensional array frequency coefficient located at n=3 and m=4;

means for assigning a scanning order =29 for a two dimensional array frequency coefficient located at n=3 and m=5;

means for assigning a scanning order =30 for a two dimensional array frequency coefficient located at n=3 and m=6; and means for assigning a scanning order =31 for a two dimensional array frequency coefficient located at n=3 and m=7.

40. The system of claim 37, wherein if said two dimensional array of said two dimensional array frequency coefficients comprises 8 columns of frequency coefficients and 4 rows of frequency coefficients, said system further comprises:

means for representing said columns with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column;

means for representing said rows with a variable m=0, 1, 2, or 3, wherein m0 is at least one of a first or top row, m=1 is a second row, m=2 is a third row, and m=3 is at least one of a fourth or bottom row; and means for sequentially scanning said two dimensional array of said two dimensional array frequency coefficients in a sequential scanning order that is vertically biased, said sequential scanning order starting at 0 and ending at 31.

41. The system of claim 40, wherein said means for sequentially scanning said two dimensional array frequency coefficients in a vertically biased manner when said two dimensional array of said two dimensional array frequency coefficients comprises 8 columns of frequency coefficients and 4 rows of frequency coefficients further comprises:

means for assigning a scanning order =0 for a two dimensional array frequency coefficient located at n=0 and m=0;

means for assigning a scanning order =1 for a two dimensional array frequency coefficient located at n=0 and m=1;

means for assigning a scanning order =2 for a two dimensional array frequency coefficient located at n=1 and m=0;

means for assigning a scanning order =3 for a two dimensional array frequency coefficient located at n=0 and m=2;

means for assigning a scanning order =4 for a two dimensional array frequency coefficient located at n=0 and m=3;

means for assigning a scanning order =5 for a two dimensional array frequency coefficient located at n=1 and m=1;

means for assigning a scanning order =6 for a two dimensional array frequency coefficient located at n=2 and m=0;

means for assigning a scanning order =7 for a two dimensional array frequency coefficient located at n=1 and m=2;

means for assigning a scanning order =8 for a two dimensional array frequency coefficient located at n=1 and m=3;

means for assigning a scanning order =9 for a two dimensional array frequency coefficient located at n=2 and m=1;

means for assigning a scanning order =10 for a two dimensional array frequency coefficient located at n=3 and m=0;

means for assigning a scanning order =11 for a two dimensional array frequency coefficient located at n=2 and m=2;

means for assigning a scanning order =12 for a two dimensional array frequency coefficient located at n=2 and m=3;

means for assigning a scanning order =13 for a two dimensional array frequency coefficient located at n=3 and m=1;

means for assigning a scanning order =14 for a two dimensional array frequency coefficient located at n=4 and m=0;

means for assigning a scanning order =15 for a two dimensional array frequency coefficient located at n=3 and m=2;

means for assigning a scanning order =16 for a two dimensional array frequency coefficient located at n=3 and m=3;

means for assigning a scanning order =17 for a two dimensional array frequency coefficient located at n=4 and m=1;

means for assigning a scanning order =18 for a two dimensional array frequency coefficient located at n=5 and m=0;

means for assigning a scanning order =19 for a two dimensional array frequency coefficient located at n=4 and m=2;

means for assigning a scanning order =20 for a two dimensional array frequency coefficient located at n=4 and m=3;

means for assigning a scanning order =21 for a two dimensional array frequency coefficient located at n=5 and m=1;

means for assigning a scanning order =22 for a two dimensional array frequency coefficient located at n=6 and m=0;

means for assigning a scanning order =23 for a two dimensional array frequency coefficient located at n=5 and m=2;

means for assigning a scanning order =24 for a two dimensional array frequency coefficient located at n=5 and m=3;

means for assigning a scanning order =25 for a two dimensional array frequency coefficient located at n=6 and m=1;

means for assigning a scanning order =26 for a two dimensional array frequency coefficient located at n=7 and m=0;

means for assigning a scanning order =27 for a two dimensional array frequency coefficient located at n=6 and m=2;

means for assigning a scanning order =28 for a two dimensional array frequency coefficient located at n=6 and m=3;

means for assigning a scanning order =29 for a two dimensional array frequency coefficient located at n=7 and m=1;

means for assigning a scanning order =30 for a two dimensional array frequency coefficient located at n=7 and m=2; and means for assigning a scanning order =31 for a two dimensional array frequency coefficient located at n=7 and m=3.

42. The system of claim 37, wherein if said two dimensional array of said two dimensional array frequency coefficients comprises 8 columns of frequency coefficients and 8 rows of frequency coefficients, said system further comprises:

means for representing said columns with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column;

means for representing said rows with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row; and means for sequentially scanning said two dimensional array of said two dimensional array frequency coefficients in a sequential scanning order that is vertically biased, said sequential scanning order starting at 0 and ending at 63.

43. The system of claim 42, wherein said means for sequentially scanning said two dimensional array frequency coefficients in a vertically biased manner when said two dimensional array of said two dimensional array frequency coefficients comprises 8 columns of frequency coefficients and 8 rows of frequency coefficients further comprises:

means for assigning a scanning order =0 for a two dimensional array frequency coefficient located at n=0 and m=0;

means for assigning a scanning order =1 for a two dimensional array frequency coefficient located at n=0 and m=1;

means for assigning a scanning order =2 for a two dimensional array frequency coefficient located at n=0 and m=2;

means for assigning a scanning order =3 for a two dimensional array frequency coefficient located at n=1 and m=0;

means for assigning a scanning order =4 for a two dimensional array frequency coefficient located at n=1 and m=1;

means for assigning a scanning order =5 for a two dimensional array frequency coefficient located at n=0 and m=3;

means for assigning a scanning order =6 for a two dimensional array frequency coefficient located at n=0 and m=4;

means for assigning a scanning order =7 for a two dimensional array frequency coefficient located at n=1 and m=2;

means for assigning a scanning order =8 for a two dimensional array frequency coefficient located at n=2 and m=0;

means for assigning a scanning order =9 for a two dimensional array frequency coefficient located at n=1 and m=3;

means for assigning a scanning order =10 for a two dimensional array frequency coefficient located at n=0 and m=5;

means for assigning a scanning order =11 for a two dimensional array frequency coefficient located at n=0 and m=6;

means for assigning a scanning order =12 for a two dimensional array frequency coefficient located at n=0 and m=7;

means for assigning a scanning order =13 for a two dimensional array frequency coefficient located at n=1 and m=4;

means for assigning a scanning order =14 for a two dimensional array frequency coefficient located at n=2 and m=1;

means for assigning a scanning order =15 for a two dimensional array frequency coefficient located at n=3 and m=0;

means for assigning a scanning order =16 for a two dimensional array frequency coefficient located at n=2 and m=2;

means for assigning a scanning order =17 for a two dimensional array frequency coefficient located at n=1 and m=5;

means for assigning a scanning order =18 for a two dimensional array frequency coefficient located at n=1 and m=6;

means for assigning a scanning order =19 for a two dimensional array frequency coefficient located at n=1 and m=7;

means for assigning a scanning order =20 for a two dimensional array frequency coefficient located at n=2 and m=3;

means for assigning a scanning order =21 for a two dimensional array frequency coefficient located at n=3 and m=1;

means for assigning a scanning order =22 for a two dimensional array frequency coefficient located at n=4 and m=0;

means for assigning a scanning order =23 for a two dimensional array frequency coefficient located at n=3 and m=2;

means for assigning a scanning order =24 for a two dimensional array frequency coefficient located at n=2 and m=4;

means for assigning a scanning order =25 for a two dimensional array frequency coefficient located at n=2 and m=5;

means for assigning a scanning order =26 for a two dimensional array frequency coefficient located at n=2 and m=6;

means for assigning a scanning order =27 for a two dimensional array frequency coefficient located at n=2 and m=7;

means for assigning a scanning order =28 for a two dimensional array frequency coefficient located at n=3 and m=3;

means for assigning a scanning order =29 for a two dimensional array frequency coefficient located at n=4 and m=1;

means for assigning a scanning order =30 for a two dimensional array frequency coefficient located at n=5 and m=0;

means for assigning a scanning order =31 for a two dimensional array frequency coefficient located at n=4 and m=2;

means for assigning a scanning order =32 for a two dimensional array frequency coefficient located at n=3 and m=4;

means for assigning a scanning order =33 for a two dimensional array frequency coefficient located at n=3 and m=5;

means for assigning a scanning order =34 for a two dimensional array frequency coefficient located at n=3 and m=6;

means for assigning a scanning order =35 for a two dimensional array frequency coefficient located at n=3 and m=7;

means for assigning a scanning order =36 for a two dimensional array frequency coefficient located at n=4 and m=3;

means for assigning a scanning order =37 for a two dimensional array frequency coefficient located at n=5 and m=1;

means for assigning a scanning order =38 for a two dimensional array frequency coefficient located at n=6 and m=0;

means for assigning a scanning order =39 for a two dimensional array frequency coefficient located at n=5 and m=2;

means for assigning a scanning order =40 for a two dimensional array frequency coefficient located at n=4 and m=4;

means for assigning a scanning order =41 for a two dimensional array frequency coefficient located at n=4 and m=5;

means for assigning a scanning order =42 for a two dimensional array frequency coefficient located at n=4 and m=6;

means for assigning a scanning order =43 for a two dimensional array frequency coefficient located at n=4 and m=7;

means for assigning a scanning order =44 for a two dimensional array frequency coefficient located at n=5 and m=3;

means for assigning a scanning order =45 for a two dimensional array frequency coefficient located at n=6 and m=1;

means for assigning a scanning order =46 for a two dimensional array frequency coefficient located at n=6 and m=2;

means for assigning a scanning order =47 for a two dimensional array frequency coefficient located at n=5 and m=4;

means for assigning a scanning order =48 for a two dimensional array frequency coefficient located at n=5 and m=5;

means for assigning a scanning order =49 for a two dimensional array frequency coefficient located at n=5 and m=6;

means for assigning a scanning order =50 for a two dimensional array frequency coefficient located at n=5 and m=7;

means for assigning a scanning order =51 for a two dimensional array frequency coefficient located at n=6 and m=3;
means for assigning a scanning order =52 for a two dimensional array frequency coefficient located at n=7 and m=0;
means for assigning a scanning order =53 for a two dimensional array frequency coefficient located at n=7 and m=1;
means for assigning a scanning order =54 for a two dimensional array frequency coefficient located at n=6 and m=4;
means for assigning a scanning order =55 for a two dimensional array frequency coefficient located at n=6 and m=5;
means for assigning a scanning order =56 for a two dimensional array frequency coefficient located at n=6 and m=6;
means for assigning a scanning order =57 for a two dimensional array frequency coefficient located at n=6 and m=7;
means for assigning a scanning order =58 for a two dimensional array frequency coefficient located at n=7 and m=2;
means for assigning a scanning order =59 for a two dimensional array frequency coefficient located at n=7 and m=3;
means for assigning a scanning order =60 for a two dimensional array frequency coefficient located at n=7 and m=4;
means for assigning a scanning order =61 for a two dimensional array frequency coefficient located at n=7 and m=5;
means for assigning a scanning order =62 for a two dimensional array frequency coefficient located at n=7 and m=6; and
means for assigning a scanning order =63 for a two dimensional array frequency coefficient located at n=7 and m=7.

44. The system of claim 37, wherein if said one dimensional array of said one dimensional array frequency coefficients comprises sixteen one dimensional array frequency coefficients, said system further comprises:
means for representing said sixteen one dimensional array frequency coefficients with a variable p=0, 1, 2, 3, 4, 5, 6, 7, 8, 9, 10, 11, 12, 13, 14, 15, in a numerical sequential order, wherein a first one dimensional array frequency coefficient is represented by p=0 and a sixteenth one dimensional array frequency coefficient is represented by p=15; and
means for sequentially scanning said one dimensional array of said one dimensional array frequency coefficients in said numerical sequential order, said sequential scanning starting at p=0 and ending at p=15 and producing said two dimensional array of said two dimensional array frequency coefficients.

45. The system of claim 44, wherein if said two dimensional array of said two dimensional array frequency coefficients comprises 4 columns of frequency coefficients and 4 rows of frequency coefficients, wherein said columns are represented with a variable n=0, 1, 2, or 3, wherein n=0 is at least one of a first or leftmost column, n=1 is a second column, n=2 is a third column, and n=3 is at least one of a fourth or rightmost column, and wherein said rows are represented with a variable m=0, 1, 2, or 3, wherein m=0 is at least one of a first or top row, m=1 is a second row, m=2 is a third row, and m=3 is at least one of a fourth or bottom row, said means for sequentially scanning said one dimensional array frequency coefficients further comprises:
means for assigning a two dimensional array frequency coefficient located at n=0 and m=0 a value of said one dimensional array frequency coefficient located at p=0;
means for assigning a two dimensional array frequency coefficient located at n=0 and m=1 a value of said one dimensional array frequency coefficient located at p=1;
means for assigning a two dimensional array frequency coefficient located at n=1 and m=0 a value of said one dimensional array frequency coefficient located at p=2;
means for assigning a two dimensional array frequency coefficient located at n=0 and m=2 a value of said one dimensional array frequency coefficient located at p=3;
means for assigning a two dimensional array frequency coefficient located at n=0 and m=3 a value of said one dimensional array frequency coefficient located at p=4;
means for assigning a two dimensional array frequency coefficient located at n=1 and m=1 a value of said one dimensional array frequency coefficient located at p=5;
means for assigning a two dimensional array frequency coefficient located at n=1 and m=2 a value of said one dimensional array frequency coefficient located at p=6;
means for assigning a two dimensional array frequency coefficient located at n=1 and m=3 a value of said one dimensional array frequency coefficient located at p=7;
means for assigning a two dimensional array frequency coefficient located at n=2 and m=0 a value of said one dimensional array frequency coefficient located at p=8;
means for assigning a two dimensional array frequency coefficient located at n=2 and m=1 a value of said one dimensional array frequency coefficient located at p=9;
means for assigning a two dimensional array frequency coefficient located at n=2 and m=2 a value of said one dimensional array frequency coefficient located at p=10;
means for assigning a two dimensional array frequency coefficient located at n=2 and m=3 a value of said one dimensional array frequency coefficient located at p=11;
means for assigning a two dimensional array frequency coefficient located at n=3 and m=0 a value of said one dimensional array frequency coefficient located at p=12;
means for assigning a two dimensional array frequency coefficient located at n=3 and m=1 a value of said one dimensional array frequency coefficient located at p=13;
means for assigning a two dimensional array frequency coefficient located at n=3 and m=2 a value of said one dimensional array frequency coefficient located at p=14 ; and
means for assigning a two dimensional array frequency coefficient located at n=3 and m=3 a value of said one dimensional array frequency coefficient located at p=15.

46. The system of claim 37, wherein if said one dimensional array of said one dimensional array frequency coefficients comprises thirty-two one dimensional array frequency coefficients, said system further comprises:
means for representing said thirty-two one dimensional array frequency coefficients with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, in a numerical sequential order, wherein a first one dimensional array frequency coefficient is represented by p=0 and a thirty-second one dimensional array frequency coefficient is represented by p=31; and
means for sequentially scanning said one dimensional array of said one dimensional array frequency coefficients in said numerical sequential order, said sequential scanning starting at p=0 and ending at p=31 and producing said two dimensional array of said two dimensional array frequency coefficients.

47. The system of claim 46, wherein if said two dimensional array of said two dimensional array frequency coefficients comprises 4 columns of frequency coefficients and 8 rows of frequency coefficients, wherein said columns are represented with a variable n=0, 1, 2, or 3, wherein n=0 is at least a first or leftmost column, n=1 is a second column, n=2 is a third column, and n=3 is a fourth or rightmost column, and wherein said rows are represented with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row, said means for sequentially scanning said one dimensional array frequency coefficients further comprises:

means for assigning a two dimensional array frequency coefficient located at n=0 and m=0 a value of said one dimensional array frequency coefficient located at p=0;
means for assigning a two dimensional array frequency coefficient located at n=0 and m=1 a value of said one dimensional array frequency coefficient located at p=1;
means for assigning a two dimensional array frequency coefficient located at n=0 and m=2 a value of said one dimensional array frequency coefficient located at p=2;
means for assigning a two dimensional array frequency coefficient located at n=0 and m=3 a value of said one dimensional array frequency coefficient located at p=3;
means for assigning a two dimensional array frequency coefficient located at n=1 and m=0 a value of said one dimensional array frequency coefficient located at p=4;
means for assigning a two dimensional array frequency coefficient located at n=1 and m=1 a value of said one dimensional array frequency coefficient located at p=5;
means for assigning a two dimensional array frequency coefficient located at n=1 and m=2 a value of said one dimensional array frequency coefficient located at p=6;
means for assigning a two dimensional array frequency coefficient located at n=0 and m=4 a value of said one dimensional array frequency coefficient located at p=7;
means for assigning a two dimensional array frequency coefficient located at n=0 and m=5 a value of said one dimensional array frequency coefficient located at p=8;
means for assigning a two dimensional array frequency coefficient located at n=0 and m=6 a value of said one dimensional array frequency coefficient located at p=9;
means for assigning a two dimensional array frequency coefficient located at n=0 and m=7 a value of said one dimensional array frequency coefficient located at p=10;
means for assigning a two dimensional array frequency coefficient located at n=1 and m=3 a value of said one dimensional array frequency coefficient located at p=11;
means for assigning a two dimensional array frequency coefficient located at n=2 and m=0 a value of said one dimensional array frequency coefficient located at p=12;
means for assigning a two dimensional array frequency coefficient located at n=2 and m=1 a value of said one dimensional array frequency coefficient located at p=13;
means for assigning a two dimensional array frequency coefficient located at n=2 and m=2 a value of said one dimensional array frequency coefficient located at p=14;
means for assigning a two dimensional array frequency coefficient located at n=1 and m=4 a value of said one dimensional array frequency coefficient located at p=15;
means for assigning a two dimensional array frequency coefficient located at n=1 and m=5 a value of said one dimensional array frequency coefficient located at p=16;
means for assigning a two dimensional array frequency coefficient located at n=1 and m=6 a value of said one dimensional array frequency coefficient located at p=17;
means for assigning a two dimensional array frequency coefficient located at n=1 and m=7 a value of said one dimensional array frequency coefficient located at p=18;
means for assigning a two dimensional array frequency coefficient located at n=2 and m=3 a value of said one dimensional array frequency coefficient located at p=19;
means for assigning a two dimensional array frequency coefficient located at n=3 and m=0 a value of said one dimensional array frequency coefficient located at p=20;
means for assigning a two dimensional array frequency coefficient located at n=3 and m=1 a value of said one dimensional array frequency coefficient located at p=21;
means for assigning a two dimensional array frequency coefficient located at n=3 and m=2 a value of said one dimensional array frequency coefficient located at p=22;
means for assigning a two dimensional array frequency coefficient located at n=2 and m=4 a value of said one dimensional array frequency coefficient located at p=23;
means for assigning a two dimensional array frequency coefficient located at n=2 and m=5 a value of said one dimensional array frequency coefficient located at p=24;
means for assigning a two dimensional array frequency coefficient located at n=2 and m=6 a value of said one dimensional array frequency coefficient located at p=25;
means for assigning a two dimensional array frequency coefficient located at n=2 and m=7 a value of said one dimensional array frequency coefficient located at p=26;
means for assigning a two dimensional array frequency coefficient located at n=3 and m=3 a value of said one dimensional array frequency coefficient located at p=27;
means for assigning a two dimensional array frequency coefficient located at n=3 and m=4 a value of said one dimensional array frequency coefficient located at p=28;
means for assigning a two dimensional array frequency coefficient located at n=3 and m=5 a value of said one dimensional array frequency coefficient located at p=29;
means for assigning a two dimensional array frequency coefficient located at n=3 and m=6 a value of said one dimensional array frequency coefficient located at p=30; and
means for assigning a two dimensional array frequency coefficient located at n=3 and m=7 a value of said one dimensional array frequency coefficient located at p=31.

48. The system of claim 46, wherein if said two dimensional array of said two dimensional array frequency coefficients comprises 8 columns of frequency coefficients and 4 rows of frequency coefficients, wherein said columns are represented with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column, and wherein said rows are represented with a variable m=0, 1, 2, or 3, wherein m=0 is at least one of a first or top row, m=1 is a second row, m=2 is a third row, and m=3 is at least one of a fourth or bottom row, said means for sequentially scanning said one dimensional array frequency coefficients further comprises:

means for assigning a two dimensional array frequency coefficient located at n=0 and m=0 a value of said one dimensional array frequency coefficient located at p=0;
means for assigning a two dimensional array frequency coefficient located at n=0 and m=1 a value of said one dimensional array frequency coefficient located at p=1;

means for assigning a two dimensional array frequency coefficient located at n=1 and m=0 a value of said one dimensional array frequency coefficient located at p=2;

means for assigning a two dimensional array frequency coefficient located at n=0 and m=2 a value of said one dimensional array frequency coefficient located at p=3;

means for assigning a two dimensional array frequency coefficient located at n=0 and m=3 a value of said one dimensional array frequency coefficient located at p=4;

means for assigning a two dimensional array frequency coefficient located at n=1 and m=1 a value of said one dimensional array frequency coefficient located at p=5;

means for assigning a two dimensional array frequency coefficient located at n=2 and m=0 a value of said one dimensional array frequency coefficient located at p=6;

means for assigning a two dimensional array frequency coefficient located at n=1 and m=2 a value of said one dimensional array frequency coefficient located at p=7;

means for assigning a two dimensional array frequency coefficient located at n=1 and m=3 a value of said one dimensional array frequency coefficient located at p=8;

means for assigning a two dimensional array frequency coefficient located at n=2 and m=1 a value of said one dimensional array frequency coefficient located at p=9;

means for assigning a two dimensional array frequency coefficient located at n=3 and m=0 a value of said one dimensional array frequency coefficient located at p=10;

means for assigning a two dimensional array frequency coefficient located at n=2 and m=2 a value of said one dimensional array frequency coefficient located at p=11;

means for assigning a two dimensional array frequency coefficient located at n=2 and m=3 a value of said one dimensional array frequency coefficient located at p=12;

means for assigning a two dimensional array frequency coefficient located at n=3 and m=1 a value of said one dimensional array frequency coefficient located at p=13;

means for assigning a two dimensional array frequency coefficient located at n=4 and m=0 a value of said one dimensional array frequency coefficient located at p=14;

means for assigning a two dimensional array frequency coefficient located at n=3 and m=2 a value of said one dimensional array frequency coefficient located at p=15;

means for assigning a two dimensional array frequency coefficient located at n=3 and m=3 a value of said one dimensional array frequency coefficient located at p=16;

means for assigning a two dimensional array frequency coefficient located at n=4 and m=1 a value of said one dimensional array frequency coefficient located at p=17;

means for assigning a two dimensional array frequency coefficient located at n=5 and m=0 a value of said one dimensional array frequency coefficient located at p=18;

means for assigning a two dimensional array frequency coefficient located at n=4 and m=2 a value of said one dimensional array frequency coefficient located at p=19;

means for assigning a two dimensional array frequency coefficient located at n=4 and m=3 a value of said one dimensional array frequency coefficient located at p=20;

means for assigning a two dimensional array frequency coefficient located at n=5 and m=1 a value of said one dimensional array frequency coefficient located at p=21;

means for assigning a two dimensional array frequency coefficient located at n=6 and m=0 a value of said one dimensional array frequency coefficient located at p=22;

means for assigning a two dimensional array frequency coefficient located at n=5 and m=2 a value of said one dimensional array frequency coefficient located at p=23;

means for assigning a two dimensional array frequency coefficient located at n=5 and m=3 a value of said one dimensional array frequency coefficient located at p=24;

means for assigning a two dimensional array frequency coefficient located at n=6 and m=1 a value of said one dimensional array frequency coefficient located at p=25;

means for assigning a two dimensional array frequency coefficient located at n=7 and m=0 a value of said one dimensional array frequency coefficient located at p=26;

means for assigning a two dimensional array frequency coefficient located at n=6 and m=2 a value of said one dimensional array frequency coefficient located at p=27;

means for assigning a two dimensional array frequency coefficient located at n=6 and m=3 a value of said one dimensional array frequency coefficient located at p=28;

means for assigning a two dimensional array frequency coefficient located at n=7 and m=1 a value of said one dimensional array frequency coefficient located at p=29;

means for assigning a two dimensional array frequency coefficient located at n=7 and m=2 a value of said one dimensional array frequency coefficient located at p=30; and means for assigning a two dimensional array frequency coefficient located at n=7 and m=3 a value of said one dimensional array frequency coefficient located at p=31.

49. The system of claim 37, wherein if said one dimensional array of said one dimensional array frequency coefficients comprises sixty-four one dimensional array frequency coefficients, said system further comprises:

means for representing said sixty-four one dimensional array frequency coefficients with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, in a numerical sequential order, wherein a first one dimensional array frequency coefficient is represented by p=0 and a sixty-fourth one dimensional array frequency coefficient is represented by p=63; and means for sequentially scanning said one dimensional array of said one dimensional array frequency coefficients in said numerical sequential order, said sequentially scanning starting at p=0 and ending at p=63 and producing said two dimensional array of said two dimensional array frequency coefficients.

50. The system of claim 49, wherein if said two dimensional array of said two dimensional array frequency coefficients comprises 8 columns of frequency coefficients and 8 rows of frequency coefficients, wherein said columns are represented with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column, and wherein said rows are represented with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row, said means for sequentially scanning said one dimensional array frequency coefficients further comprises:

means for assigning a two dimensional array frequency coefficient located at n=0 and m=0 a value of said one dimensional array frequency coefficient located at p=0;

means for assigning a two dimensional array frequency coefficient located at n=0 and m=1 a value of said one dimensional array frequency coefficient located at p=1;

means for assigning a two dimensional array frequency coefficient located at n=0 and m=2 a value of said one dimensional array frequency coefficient located at p=2;

means for assigning a two dimensional array frequency coefficient located at n=1 and m=0 a value of said one dimensional array frequency coefficient located at p=3;

means for assigning a two dimensional array frequency coefficient located at n=1 and m=1 a value of said one dimensional array frequency coefficient located at p=4;

means for assigning a two dimensional array frequency coefficient located at n=0 and m=3 a value of said one dimensional array frequency coefficient located at p=5;

means for assigning a two dimensional array frequency coefficient located at n=0 and m=4 a value of said one dimensional array frequency coefficient located at p=6;

means for assigning a two dimensional array frequency coefficient located at n=1 and m=2 a value of said one dimensional array frequency coefficient located at p=7;

means for assigning a two dimensional array frequency coefficient located at n=2 and m=0 a value of said one dimensional array frequency coefficient located at p=8;

means for assigning a two dimensional array frequency coefficient located at n=1 and m=3 a value of said one dimensional array frequency coefficient located at p=9;

means for assigning a two dimensional array frequency coefficient located at n=0 and m=5 a value of said one dimensional array frequency coefficient located at p=10;

means for assigning a two dimensional array frequency coefficient located at n=0 and m=6 a value of said one dimensional array frequency coefficient located at p=11;

means for assigning a two dimensional array frequency coefficient located at n=0 and m=7 a value of said one dimensional array frequency coefficient located at p=12;

means for assigning a two dimensional array frequency coefficient located at n=1 and m=4 a value of said one dimensional array frequency coefficient located at p=13;

means for assigning a two dimensional array frequency coefficient located at n=2 and m=1 a value of said one dimensional array frequency coefficient located at p=14;

means for assigning a two dimensional array frequency coefficient located at n=3 and m=0 a value of said one dimensional array frequency coefficient located at p=15;

means for assigning a two dimensional array frequency coefficient located at n=2 and m=2 a value of said one dimensional array frequency coefficient located at p=16;

means for assigning a two dimensional array frequency coefficient located at n=1 and m=5 a value of said one dimensional array frequency coefficient located at p=17;

means for assigning a two dimensional array frequency coefficient located at n=1 and m=6 a value of said one dimensional array frequency coefficient located at p=18;

means for assigning a two dimensional array frequency coefficient located at n=1 and m=7 a value of said one dimensional array frequency coefficient located at p=19;

means for assigning a two dimensional array frequency coefficient located at n=2 and m=3 a value of said one dimensional array frequency coefficient located at p=20;

means for assigning a two dimensional array frequency coefficient located at n=3 and m=1 a value of said one dimensional array frequency coefficient located at p=21;

means for assigning a two dimensional array frequency coefficient located at n=4 and m=0 a value of said one dimensional array frequency coefficient located at p=22;

means for assigning a two dimensional array frequency coefficient located at n=3 and m=2 a value of said one dimensional array frequency coefficient located at p=23;

means for assigning a two dimensional array frequency coefficient located at n=2 and m=4 a value of said one dimensional array frequency coefficient located at p=24;

means for assigning a two dimensional array frequency coefficient located at n=2 and m=5 a value of said one dimensional array frequency coefficient located at p=25;

means for assigning a two dimensional array frequency coefficient located at n=2 and m=6 a value of said one dimensional array frequency coefficient located at p=26;

means for assigning a two dimensional array frequency coefficient located at n=2 and m=7 a value of said one dimensional array frequency coefficient located at p=27;

means for assigning a two dimensional array frequency coefficient located at n=3 and m=3 a value of said one dimensional array frequency coefficient located at p=28;

means for assigning a two dimensional array frequency coefficient located at n=4 and m=1 a value of said one dimensional array frequency coefficient located at p=29;

means for assigning a two dimensional array frequency coefficient located at n=5 and m=0 a value of said one dimensional array frequency coefficient located at p=30;

means for assigning a two dimensional array frequency coefficient located at n=4 and m=2 a value of said one dimensional array frequency coefficient located at p=31;

means for assigning a two dimensional array frequency coefficient located at n=3 and m=4 a value of said one dimensional array frequency coefficient located at p=32;

means for assigning a two dimensional array frequency coefficient located at n=3 and m=5 a value of said one dimensional array frequency coefficient located at p=33;

means for assigning a two dimensional array frequency coefficient located at n=3 and m=6 a value of said one dimensional array frequency coefficient located at p=34;

means for assigning a two dimensional array frequency coefficient located at n=3 and m=7 a value of said one dimensional array frequency coefficient located at p=35;

means for assigning a two dimensional array frequency coefficient located at n=4 and m=3 a value of said one dimensional array frequency coefficient located at p=36;

means for assigning a two dimensional array frequency coefficient located at n=5 and m=1 a value of said one dimensional array frequency coefficient located at p=37;

means for assigning a two dimensional array frequency coefficient located at n=6 and m=0 a value of said one dimensional array frequency coefficient located at p=38;

means for assigning a two dimensional array frequency coefficient located at n=5 and m=2 a value of said one dimensional array frequency coefficient located at p=39;

means for assigning a two dimensional array frequency coefficient located at n=4 and m=4 a value of said one dimensional array frequency coefficient located at p=40;

means for assigning a two dimensional array frequency coefficient located at n=4 and m=5 a value of said one dimensional array frequency coefficient located at p=41;

means for assigning a two dimensional array frequency coefficient located at n=4 and m=6 a value of said one dimensional array frequency coefficient located at p=42;

means for assigning a two dimensional array frequency coefficient located at n=4 and m=7 a value of said one dimensional array frequency coefficient located at p=43;

means for assigning a two dimensional array frequency coefficient located at n=5 and m=3 a value of said one dimensional array frequency coefficient located at p=44;

means for assigning a two dimensional array frequency coefficient located at n=6 and m=1 a value of said one dimensional array frequency coefficient located at p=45;

means for assigning a two dimensional array frequency coefficient located at n=6 and m=2 a value of said one dimensional array frequency coefficient located at p=46;

means for assigning a two dimensional array frequency coefficient located at n=5 and m=4 a value of said one dimensional array frequency coefficient located at p=7;

means for assigning a two dimensional array frequency coefficient located at n=5 and m=5 a value of said one dimensional array frequency coefficient located at p=48;

means for assigning a two dimensional array frequency coefficient located at n=5 and m=6 a value of said one dimensional array frequency coefficient located at p=49;

means for assigning a two dimensional array frequency coefficient located at n=5 and m=7 a value of said one dimensional array frequency coefficient located at p=50;

means for assigning a two dimensional array frequency coefficient located at n=6 and m=3 a value of said one dimensional array frequency coefficient located at p=51;

means for assigning a two dimensional array frequency coefficient located at n=7 and m=0 a value of said one dimensional array frequency coefficient located at p=52;

means for assigning a two dimensional array frequency coefficient located at n=7 and m=1 a value of said one dimensional array frequency coefficient located at p=53;

means for assigning a two dimensional array frequency coefficient located at n=6 and m=4 a value of said one dimensional array frequency coefficient located at p=54;

means for assigning a two dimensional array frequency coefficient located at n=6 and m=5 a value of said one dimensional array frequency coefficient located at p=55;

means for assigning a two dimensional array frequency coefficient located at n=6 and m=6 a value of said one dimensional array frequency coefficient located at p=56;

means for assigning a two dimensional array frequency coefficient located at n=6 and m=7 a value of said one dimensional array frequency coefficient located at p=57;

means for assigning a two dimensional array frequency coefficient located at n=7 and m=2 a value of said one dimensional array frequency coefficient located at p=58;

means for assigning a two dimensional array frequency coefficient located at n=7 and m=3 a value of said one dimensional array frequency coefficient located at p=59;

means for assigning a two dimensional array frequency coefficient located at n=7 and m=4 a value of said one dimensional array frequency coefficient located at p=60;

means for assigning a two dimensional array frequency coefficient located at n=7 and m=5 a value of said one dimensional array frequency coefficient located at p=61;

means for assigning a two dimensional array frequency coefficient located at n=7 and m=6 a value of said one dimensional array frequency coefficient located at p=62; and means for assigning a two dimensional array frequency coefficient located at n=7 and m=7 a value of said one dimensional array frequency coefficient located at p=63.

51. A system for encoding digital video content and decoding encoded digital video content, said digital video content and said encoded digital video content comprising a stream of pictures, slices, or macroblocks, which are at least one of intra, predicted or bi-predicted pictures, slices, or macroblocks, in the form of blocks of pixels, said system comprising:

an encoder configured to perform transform-based encoding of said digital video content, wherein said encoder scans said form of blocks of pixels forming a two dimensional array of two dimensional array frequency coefficients in a manner that is vertically biased, said encoder producing a one dimensional array of one dimensional array frequency coefficients including high-energy low frequency coefficients and low-energy high frequency coefficients, wherein the high-energy low frequency coefficients are scanned before the low- energy high frequency coefficients; and a decoder for transform-based decoding of said encoded digital video content, wherein said decoder receives said one dimensional array of one dimensional array frequency coefficients, scanned by said encoder, and scans said one dimensional array frequency coefficients in numerical sequential order thereby producing said two dimensional array of said two dimensional array frequency coefficients, wherein when said two dimensional array of said two dimensional array frequency coefficients comprises 4 columns of frequency coefficients and 4 rows of frequency coefficients, said system:

represents said columns with a variable n=0, 1, 2, or 3, wherein n=0 is at least one of a first or leftmost column, n=1 is a second column, n=2 is a third column, and n=3 is at least one of a fourth or rightmost column;

represents said rows with a variable m=0, 1, 2, or 3, wherein m=0 is at least one of a first or top row, m=1 is a second row, m=2 is a third row, and m=3 is at least one of a fourth or bottom row; and wherein said encoder sequentially scans said two dimensional array of said two dimensional array frequency coefficients in a sequential scanning order that is vertically biased, said scanning order starting at 0 and ending at 15 and producing said one dimensional array of said one dimensional array frequency coefficients, wherein in sequentially scanning said two dimensional array frequency coefficients in a vertically biased manner, said encoder:

assigns a scanning order =0 for a two dimensional array frequency coefficient located at n=0 and m=0;

assigns a scanning order =1 for a two dimensional array frequency coefficient located at n=0 and m=1;

assigns a scanning order =2 for a two dimensional array frequency coefficient located at n=1 and m=0;

assigns a scanning order =3 for a two dimensional array frequency coefficient located at n=0 and m=2;

assigns a scanning order =4 for a two dimensional array frequency coefficient located at n=0 and m=3;

assigns a scanning order =5 for a two dimensional array frequency coefficient located at n=1 and m=1;

assigns a scanning order =6 for a two dimensional array frequency coefficient located at n=1 and m=2;

assigns a scanning order =7 for a two dimensional array frequency coefficient located at n=1 and m=3;

assigns a scanning order =8 for a two dimensional array frequency coefficient located at n=2 and m=0;

assigns a scanning order =9 for a two dimensional array frequency coefficient located at n=2 and m=1 assigns a scanning order =10 for a two dimensional array frequency coefficient located at n=2 and m=2;

assigns a scanning order =11 for a two dimensional array frequency coefficient located at n=2 and m=3;

assigns a scanning order =12 for a two dimensional array frequency coefficient located at n=3 and m=0;

assigns a scanning order =13 for a two dimensional array frequency coefficient located at n=3 and m=1;

assigns a scanning order =14 for a two dimensional array frequency coefficient located at n=3 and m=2; and assigns a scanning order =15 for a two dimensional array frequency coefficient located at n=3 and m=3.

52. The system of claim 51, wherein if said one dimensional array of said one dimensional array frequency coefficients comprises sixteen one dimensional array frequency coefficients, said system:

represents said sixteen one dimensional array frequency coefficients with a variable p=0, 1, 2, 3, 4, 5, 6, 7, 8, 9, 10, 11, 12, 13, 14, 15, in a numerical sequential order, wherein a first one dimensional array frequency coefficient is represented by p=0 and a sixteenth one dimensional array frequency coefficient is represented by p=15; and wherein said decoder sequentially scans said one dimensional array of said one dimensional array frequency coefficients in said numerical sequential order, said sequential scanning starting at p=0 and ending at p=15 and producing said two dimensional array of said two dimensional array frequency coefficients.

53. The system of claim 52, wherein if said two dimensional array of said two dimensional array frequency coefficients comprises 4 columns of frequency coefficients and 4 rows of frequency coefficients, wherein said columns are represented with a variable n=0, 1, 2, or 3, wherein n=0 is at least one of a first or leftmost column, n=1 is a second column, n=2 is a third column, and n=3 is at least one of a fourth or rightmost column, and wherein said rows are represented with a variable m=0, 1, 2, or 3, wherein m=0 is at least one of a first or top row, m=1 is a second row, m=2 is a third row, and m=3 is at least one of a fourth or bottom row, wherein in sequentially scanning said one dimensional array frequency coefficients, said decoder:

assigns a two dimensional array frequency coefficient located at n=0 and m=0 a value of said one dimensional array frequency coefficient located at p=0;

assigns a two dimensional array frequency coefficient located at n=0 and m=1 a value of said one dimensional array frequency coefficient located at p=1;

assigns a two dimensional array frequency coefficient located at n=1 and m=0 a value of said one dimensional array frequency coefficient located at p=2;

assigns a two dimensional array frequency coefficient located at n=0 and m=2 a value of said one dimensional array frequency coefficient located at p=23;

assigns a two dimensional array frequency coefficient located at n=0 and m=3 a value of said one dimensional array frequency coefficient located at p=4;

assigns a two dimensional array frequency coefficient located at n=1 and m=1 a value of said one dimensional array frequency coefficient located at p=5;

assigns a two dimensional array frequency coefficient located at n=1 and m=2 a value of said one dimensional array frequency coefficient located at p=6;

assigns a two dimensional array frequency coefficient located at n=1 and m=3 a value of said one dimensional array frequency coefficient located at p=7;

assigns a two dimensional array frequency coefficient located at n=2 and m=0 a value of said one dimensional array frequency coefficient located at p=8;

assigns a two dimensional array frequency coefficient located at n=2 and m=1 a value of said one dimensional array frequency coefficient located at p=9;

assigns a two dimensional array frequency coefficient located at n=2 and m=2 a value of said one dimensional array frequency coefficient located at p=10;

assigns a two dimensional array frequency coefficient located at n=2 and m=3 a value of said one dimensional array frequency coefficient located at p=11;

assigns a two dimensional array frequency coefficient located at n=3 and m=0 a value of said one dimensional array frequency coefficient located at p=12 assigns a two dimensional array frequency coefficient located at n=3 and m=1 a value of said one dimensional array frequency coefficient located at p=13;

assigns a two dimensional array frequency coefficient located at n=3 and m=2 a value of said one dimensional array frequency coefficient located at p=14; and assigns a two dimensional array frequency coefficient located at n=3 and m=3 a value of said one dimensional array frequency coefficient located at p=15.

54. The system of claim 51, wherein if said two dimensional array of said two dimensional array frequency coefficients comprises 4 columns of frequency coefficients and 8 rows of frequency coefficients, said system:

represents said columns with a variable n=0, 1, 2, or 3, wherein n=0 is at least one of a first or leftmost column, n=1 is a second column, n=2 is a third column, and n=3 is at least one of a fourth or rightmost column;

represents said rows with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row; and wherein said encoder sequentially scans said two dimensional array of said two dimensional array frequency coefficients in a sequential scanning order that is vertically biased, said sequential scanning order starting at 0 and ending at 31 and producing said one dimensional array of said one dimensional array frequency coefficients.

55. The system of claim 54, wherein in sequentially scanning said two dimensional array frequency coefficients in a vertically biased manner when said two dimensional array of said two dimensional array frequency coefficients comprises 4 columns of frequency coefficients and 8 rows of frequency coefficients, said encoder:

assigns a scanning order =0 for a two dimensional array frequency coefficient located in at n=0 and m=0;

assigns a scanning order =1 for a two dimensional array frequency coefficient located in at n=0 and m=1;

assigns a scanning order =2 for a two dimensional array frequency coefficient located in at n=0 and m=2;

assigns a scanning order =3 for a two dimensional array frequency coefficient located in at n=0 and m=3;

assigns a scanning order =4 for a two dimensional array frequency coefficient located in at n=1 and m=0;

assigns a scanning order =5 for a two dimensional array frequency coefficient located in at n=1 and m=1;

assigns a scanning order =6 for a two dimensional array frequency coefficient located in at n=1 and m=2;
assigns a scanning order =7 for a two dimensional array frequency coefficient located in at n=0 and m=4;
assigns a scanning order =8 for a two dimensional array frequency coefficient located in at n=0 and m=5;
assigns a scanning order =9 for a two dimensional array frequency coefficient located in at n=0 and m=6;
assigns a scanning order =10 for a two dimensional array frequency coefficient located in at n=0 and m=7;
assigns a scanning order =11 for a two dimensional array frequency coefficient located in at n=1 and m=3;
assigns a scanning order =12 for a two dimensional array frequency coefficient located in at n=2 and m=0;
assigns a scanning order =13 for a two dimensional array frequency coefficient located in at n=2 and m=1;
assigns a scanning order =14 for a two dimensional array frequency coefficient located in at n=2 and m=2;
assigns a scanning order =15 for a two dimensional array frequency coefficient located in at n=1 and m=4;
assigns a scanning order =16 for a two dimensional array frequency coefficient located in at n=1 and m=5;
assigns a scanning order =17 for a two dimensional array frequency coefficient located in at n=1 and m=6;
assigns a scanning order =18 for a two dimensional array frequency coefficient located in at n=l and m=7;
assigns a scanning order =19 for a two dimensional array frequency coefficient located in at n=2 and m=3;
assigns a scanning order =20 for a two dimensional array frequency coefficient located in at n=3 and m=0;
assigns a scanning order =21 for a two dimensional array frequency coefficient located in at n=3 and m=1;
assigns a scanning order =22 for a two dimensional array frequency coefficient located in at n=3 and m=2;
assigns a scanning order =23 for a two dimensional array frequency coefficient located in at n=2 and m=4;
assigns a scanning order =24 for a two dimensional array frequency coefficient located in at n=2 and m=5;
assigns a scanning order =25 for a two dimensional array frequency coefficient located in at n=2 and m=6;
assigns a scanning order =26 for a two dimensional array frequency coefficient located in at n=2 and m=7;
assigns a scanning order =27 for a two dimensional array frequency coefficient located in at n=3 and m=3;
assigns a scanning order =28 for a two dimensional array frequency coefficient located in at n=3 and m=4;
assigns a scanning order =29 for a two dimensional array frequency coefficient located in at n=3 and m=5;
assigns a scanning order =30 for a two dimensional array frequency coefficient located in at n=3 and m=6; and
assigns a scanning order =31 for a two dimensional array frequency coefficient located in at n=3 and m=7.

56. The system of claim 55, wherein if said one dimensional array of said one dimensional array frequency coefficients comprises thirty-two one dimensional array frequency coefficients, wherein said thirty-two one dimensional array frequency coefficients are represented with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, in a numerical sequential order, wherein a first one dimensional array frequency coefficient is represented by p=0 and a thirty-second one dimensional array frequency coefficient is represented by p=31, wherein in sequentially scanning said two dimensional array frequency coefficients in a vertically biased manner when said two dimensional array of said two dimensional array frequency coefficients comprises 4 columns of frequency coefficients and 8 rows of frequency coefficients, said encoder further:
assigns a one dimensional array frequency coefficient located at p=0 a value of said two dimensional array frequency coefficient located at n=0 and m=0;
assigns a one dimensional array frequency coefficient located at p=1 a value of said two dimensional array frequency coefficient located at n=0 and m=1;
assigns a one dimensional array frequency coefficient located at p=2 a value of said two dimensional array frequency coefficient located at n=0 and m=2;
assigns a one dimensional array frequency coefficient located at p=3 a value of said two dimensional array frequency coefficient located at n=0 and m=3;
assigns a one dimensional array frequency coefficient located at p=4 a value of said two dimensional array frequency coefficient located at n=1 and m=0;
assigns a one dimensional array frequency coefficient located at p=5 a value of said two dimensional array frequency coefficient located at n=1 and m=1;
assigns a one dimensional array frequency coefficient located at p=6 a value of said two dimensional array frequency coefficient located at n=1 and m=2;
assigns a one dimensional array frequency coefficient located at p=7 a value of said two dimensional array frequency coefficient located at n=0 and m=4;
assigns a one dimensional array frequency coefficient located at p=8 a value of said two dimensional array frequency coefficient located at n=0 and m=5;
assigns a one dimensional array frequency coefficient located at p=9 a value of said two dimensional array frequency coefficient located at n=0 and m=6;
assigns a one dimensional array frequency coefficient located at p=10 a value of said two dimensional array frequency coefficient located at n=0 and m=7;
assigns a one dimensional array frequency coefficient located at p=11 a value of said two dimensional array frequency coefficient located at n=1 and m=3;
assigns a one dimensional array frequency coefficient located at p=12 a value of said two dimensional array frequency coefficient located at n=2 and m=0;
assigns a one dimensional array frequency coefficient located at p=13 a value of said two dimensional array frequency coefficient located at n=2 and m=1;
assigns a one dimensional array frequency coefficient located at p=14 a value of said two dimensional array frequency coefficient located at n=2 and m=2;
assigns a one dimensional array frequency coefficient located at p=115 a value of said two dimensional array frequency coefficient located at n=1 and m=4;
assigns a one dimensional array frequency coefficient located at p=16 a value of said two dimensional array frequency coefficient located at n=1 and m=5;
assigns a one dimensional array frequency coefficient located at p=17 a value of said two dimensional array frequency coefficient located at n=1 and m=6;
assigns a one dimensional array frequency coefficient located at p=18 a value of said two dimensional array frequency coefficient located at n=1 and m=7;
assigns a one dimensional array frequency coefficient located at p=19 a value of said two dimensional array frequency coefficient located at n=2 and m=3;
assigns a one dimensional array frequency coefficient located at p=20 a value of said two dimensional array frequency coefficient located at n=3 and m=0;

assigns a one dimensional array frequency coefficient located at p=21 a value of said two dimensional array frequency coefficient located at n=3 and m=1;

assigns a one dimensional array frequency coefficient located at p=22 a value of said two dimensional array frequency coefficient located at n=3 and m=2;

assigns a one dimensional array frequency coefficient located at p=23 a value of said two dimensional array frequency coefficient located at n=2 and m=4;

assigns a one dimensional array frequency coefficient located at p=24 a value of said two dimensional array frequency coefficient located at n=2 and m=5;

assigns a one dimensional array frequency coefficient located at p=25 a value of said two dimensional array frequency coefficient located at n=2 and m=6;

assigns a one dimensional array frequency coefficient located at p=26 a value of said two dimensional array frequency coefficient located at n=2 and m=7;

assigns a one dimensional array frequency coefficient located at p=27 a value of said two dimensional array frequency coefficient located at n=3 and m=3;

assigns a one dimensional array frequency coefficient located at p=28 a value of said two dimensional array frequency coefficient located at n=3 and m=4;

assigns a one dimensional array frequency coefficient located at p=29 a value of said two dimensional array frequency coefficient located at n=3 and m=5;

assigns a one dimensional array frequency coefficient located at p=30 a value of said two dimensional array frequency coefficient located at n=3 and m=6;

and assigns a one dimensional array frequency coefficient located at p=31 a value of said two dimensional array frequency coefficient located at n=3 and m=7.

57. The system of claim 51, wherein if said one dimensional array of said one dimensional array frequency coefficients comprises thirty-two one dimensional array frequency coefficients, said system:

represents said thirty-two one dimensional array frequency coefficients with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, in a numerical sequential order, wherein a first one dimensional array frequency coefficient is represented by p=0 and a thirty-second one dimensional array frequency coefficient is represented by p=31; and wherein said decoder sequentially scans said one dimensional array of said one dimensional array frequency coefficients in said numerical sequential order, said sequential scanning starting at p=0 and ending at p=31 and producing said two dimensional array of said two dimensional array frequency coefficients.

58. The system of claim 57, wherein if said two dimensional array of said two dimensional array frequency coefficients comprises 4 columns of frequency coefficients and 8 rows of frequency coefficients, wherein said columns are represented with a variable n=0, 1, 2, or 3, wherein n=0 is at least one of a first or leftmost column, n=1 is a second column, n=2 is a third column, and n=3 is at least one of a fourth or rightmost column, and wherein said rows are represented with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row, wherein in sequentially scanning said one dimensional array frequency coefficients, said decoder:

assigns a two dimensional array frequency coefficient located at n=0 and m=0 a value of said one dimensional array frequency coefficient located at p=0;

assigns a two dimensional array frequency coefficient located at n=0 and m=1 a value of said one dimensional array frequency coefficient located at p=1;

assigns a two dimensional array frequency coefficient located at n=0 and m=2 a value of said one dimensional array frequency coefficient located at p=2;

assigns a two dimensional array frequency coefficient located at n=0 and m=3 a value of said one dimensional array frequency coefficient located at p=3;

assigns a two dimensional array frequency coefficient located at n=1 and m=0 a value of said one dimensional array frequency coefficient located at p=4;

assigns a two dimensional array frequency coefficient located at n=1 and m=1 a value of said one dimensional array frequency coefficient located at p=5;

assigns a two dimensional array frequency coefficient located at n=1 and m=2 a value of said one dimensional array frequency coefficient located at p=6;

assigns a two dimensional array frequency coefficient located at n=0 and m=4 a value of said one dimensional array frequency coefficient located at p=7;

assigns a two dimensional array frequency coefficient located at n=0 and m=5 a value of said one dimensional array frequency coefficient located at p=8;

assigns a two dimensional array frequency coefficient located at n=0 and m=6 a value of said one dimensional array frequency coefficient located at p=9;

assigns a two dimensional array frequency coefficient located at n=0 and m=7 a value of said one dimensional array frequency coefficient located at p=10;

assigns a two dimensional array frequency coefficient located at n=1 and m=3 a value of said one dimensional array frequency coefficient located at p=11;

assigns a two dimensional array frequency coefficient located at n=2 and m=0 a value of said one dimensional array frequency coefficient located at p=12;

assigns a two dimensional array frequency coefficient located at n=2 and m=1 a value of said one dimensional array frequency coefficient located at p=13;

assigns a two dimensional array frequency coefficient located at n=2 and m=2 a value of said one dimensional array frequency coefficient located at p=14;

assigns a two dimensional array frequency coefficient located at n=1 and m=4 a value of said one dimensional array frequency coefficient located at p=15;

assigns a two dimensional array frequency coefficient located at n=1 and m=5 a value of said one dimensional array frequency coefficient located at p=16;

assigns a two dimensional array frequency coefficient located at n=1 and m=6 a value of said one dimensional array frequency coefficient located at p=17;

assigns a two dimensional array frequency coefficient located at n=1 and m=7 a value of said one dimensional array frequency coefficient located at p=18;

assigns a two dimensional array frequency coefficient located at n=2 and m=3 a value of said one dimensional array frequency coefficient located at p=19;

assigns a two dimensional array frequency coefficient located at n=3 and m=0 a value of said one dimensional array frequency coefficient located at p=20;

assigns a two dimensional array frequency coefficient located at n=3 and m=1 a value of said one dimensional array frequency coefficient located at p=21;

assigns a two dimensional array frequency coefficient located at n=3 and m=2 a value of said one dimensional array frequency coefficient located at p=22;

assigns a two dimensional array frequency coefficient located at n=2 and m=4 a value of said one dimensional array frequency coefficient located at p=23;

assigns a two dimensional array frequency coefficient located at n=2 and m=5 a value of said one dimensional array frequency coefficient located at p=24;

assigns a two dimensional array frequency coefficient located at n=2 and m=6 a value of said one dimensional array frequency coefficient located at p=25;

assigns a two dimensional array frequency coefficient located at n=2 and m=7 a value of said one dimensional array frequency coefficient located at p=26;

assigns a two dimensional array frequency coefficient located at n=3 and m=3 a value of said one dimensional array frequency coefficient located at p=27;

assigns a two dimensional array frequency coefficient located at n=3 and m=4 a value of said one dimensional array frequency coefficient located at p=28;

assigns a two dimensional array frequency coefficient located at n=3 and m=5 a value of said one dimensional array frequency coefficient located at p=29;

assigns a two dimensional array frequency coefficient located at n=3 and m=6 a value of said one dimensional array frequency coefficient located at p=30;

and assigns a two dimensional array frequency coefficient located at n=3 and m=7 a value of said one dimensional array frequency coefficient located at p=31.

59. The system of claim 57, wherein if said two dimensional array of said two dimensional array frequency coefficients comprises 8 columns of frequency coefficients and 4 rows of frequency coefficients, wherein said columns are represented with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column, and wherein said rows are represented with a variable m=0, 1, 2, or 3, wherein m=0 is at least one of a first or top row, m=1 is a second row, m=2 is a third row, and m=3 is at least one of a fourth or bottom row, wherein in sequentially scanning said one dimensional array frequency coefficients said decoder:

assigns a two dimensional array frequency coefficient located at n=0 and m=0 a value of said one dimensional array frequency coefficient located at p=0;

assigns a two dimensional array frequency coefficient located at n=0 and m=1 a value of said one dimensional array frequency coefficient located at p=1;

assigns a two dimensional array frequency coefficient located at n=1 and m=0 a value of said one dimensional array frequency coefficient located at p=2;

assigns a two dimensional array frequency coefficient located at n=0 and m=2 a value of said one dimensional array frequency coefficient located at p=23;

assigns a two dimensional array frequency coefficient located at n=0 and m=3 a value of said one dimensional array frequency coefficient located at p=4;

assigns a two dimensional array frequency coefficient located at n=1 and m=1 a value of said one dimensional array frequency coefficient located at p=5;

assigns a two dimensional array frequency coefficient located at n=2 and m=0 a value of said one dimensional array frequency coefficient located at p=6;

assigns a two dimensional array frequency coefficient located at n=1 and m=2 a value of said one dimensional array frequency coefficient located at p=7;

assigns a two dimensional array frequency coefficient located at n=1 and m=3 a value of said one dimensional array frequency coefficient located at p=8;

assigns a two dimensional array frequency coefficient located at n=2 and m=1 a value of said one dimensional array frequency coefficient located at p=9;

assigns a two dimensional array frequency coefficient located at n=3 and m=0 a value of said one dimensional array frequency coefficient located at p=10;

assigns a two dimensional array frequency coefficient located at n=2 and m=2 a value of said one dimensional array frequency coefficient located at p=11;

assigns a two dimensional array frequency coefficient located at n=2 and m=3 a value of said one dimensional array frequency coefficient located at p=12;

assigns a two dimensional array frequency coefficient located at n=3 and m=1 a value of said one dimensional array frequency coefficient located at p=13;

assigns a two dimensional array frequency coefficient located at n=4 and m=0 a value of said one dimensional array frequency coefficient located at p=14;

assigns a two dimensional array frequency coefficient located at n=3 and m=2 a value of said one dimensional array frequency coefficient located at p=15;

assigns a two dimensional array frequency coefficient located at n=3 and m=3 a value of said one dimensional array frequency coefficient located at p=16;

assigns a two dimensional array frequency coefficient located at n=4 and m=1 a value of said one dimensional array frequency coefficient located at p=17;

assigns a two dimensional array frequency coefficient located at n=5 and m=0 a value of said one dimensional array frequency coefficient located at p=18;

assigns a two dimensional array frequency coefficient located at n=4 and m=2 a value of said one dimensional array frequency coefficient located at p=19;

assigns a two dimensional array frequency coefficient located at n=4 and m=3 a value of said one dimensional array frequency coefficient located at p=20;

assigns a two dimensional array frequency coefficient located at n=5 and m=1 a value of said one dimensional array frequency coefficient located at p=21;

assigns a two dimensional array frequency coefficient located at n=6 and m=0 a value of said one dimensional array frequency coefficient located at p=22;

assigns a two dimensional array frequency coefficient located at n=5 and m=2 a value of said one dimensional array frequency coefficient located at p=23;

assigns a two dimensional array frequency coefficient located at n=5 and m=3 a value of said one dimensional array frequency coefficient located at p=24;

assigns a two dimensional array frequency coefficient located at n=6 and m=1 a value of said one dimensional array frequency coefficient located at p=25;

assigns a two dimensional array frequency coefficient located at n=7 and m=0 a value of said one dimensional array frequency coefficient located at p=26;

assigns a two dimensional array frequency coefficient located at n=6 and m=2 a value of said one dimensional array frequency coefficient located at p=27;

assigns a two dimensional array frequency coefficient located at n=6 and m=3 a value of said one dimensional array frequency coefficient located at p=28;

assigns a two dimensional array frequency coefficient located at n=7 and m=1 a value of said one dimensional array frequency coefficient located at p=29;

assigns a two dimensional array frequency coefficient located at n=7 and m=2 a value of said one dimensional array frequency coefficient located at p=30; and assigns a two dimensional array frequency coefficient located at n=7 and m=3 a value of said one dimensional array frequency coefficient located at p=31.

60. The system of claim 51, wherein if said two dimensional array of said two dimensional array frequency coefficients comprises 8 columns of frequency coefficients and 4 rows of frequency coefficients, said system:

represents said columns with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column;

represents said rows with a variable m=0, 1, 2, or 3, wherein m=0 is at least one of a first or top row, m=1 is a second row, m=2 is a third row, and m=3 is at least one of a fourth or bottom row; and wherein said encoder sequentially scans said two dimensional array of said two dimensional array frequency coefficients in a sequential scanning order that is vertically biased, said sequential scanning order starting at 0 and ending at 31 and producing said one dimensional array of said one dimensional array frequency coefficients.

61. The system of claim 60, wherein in sequentially scanning said two dimensional array frequency coefficients in a vertically biased manner when said two dimensional array of said two dimensional array frequency coefficients comprises 8 columns of frequency coefficients and 4 rows of frequency coefficients, said encoder:

assigns a scanning order=0 for a two dimensional array frequency coefficient located at n=0 and m=0;

assigns a scanning order=1 for a two dimensional array frequency coefficient located at n=0 and m=1;

assigns a scanning order=2 for a two dimensional array frequency coefficient located at n=1 and m=0;

assigns a scanning order=3 for a two dimensional array frequency coefficient located at n=0 and m=2;

assigns a scanning order=4 for a two dimensional array frequency coefficient located at n=0 and m=3;

assigns a scanning order=5 for a two dimensional array frequency coefficient located atn=1 and m=1;

assigns a scanning order=6 for a two dimensional array frequency coefficient located at n=2 and m=0;

assigns a scanning order=7 for a two dimensional array frequency coefficient located at n=1 and m=2;

assigns a scanning order=8 for a two dimensional array frequency coefficient located at n=1 and m=3;

assigns a scanning order=9 for a two dimensional array frequency coefficient located at n=2 and m=1;

assigns a scanning order=10 for a two dimensional array frequency coefficient located at n=3 and m=0;

assigns a scanning order=11 for a two dimensional array frequency coefficient located at n=2 and m=2;

assigns a scanning order=12 for a two dimensional array frequency coefficient located at n=2 and m=3;

assigns a scanning order=13 for a two dimensional array frequency coefficient located at n=3 and m=1;

assigns a scanning order=14 for a two dimensional array frequency coefficient located at n=4 and m=0;

assigns a scanning order=15 for a two dimensional array frequency coefficient located at n=3 and m=2;

assigns a scanning order=16 for a two dimensional array frequency coefficient located at n=3 and m=3;

assigns a scanning order=17 for a two dimensional array frequency coefficient located at n=4 and m=1;

assigns a scanning order=18 for a two dimensional array frequency coefficient located at n=5 and m=0;

assigns a scanning order=19 for a two dimensional array frequency coefficient located at n=4 and m=2;

assigns a scanning order=20 for a two dimensional array frequency coefficient located at n=4 and m=3;

assigns a scanning order=21 for a two dimensional array frequency coefficient located at n=5 and m=1;

assigns a scanning order=22 for a two dimensional array frequency coefficient located at n=6 and m=0;

assigns a scanning order=23 for a two dimensional array frequency coefficient located at n=5 and m=2;

assigns a scanning order=24 for a two dimensional array frequency coefficient located at n=5 and m=3;

assigns a scanning order=25 for a two dimensional array frequency coefficient located at n=6 and m=1;

assigns a scanning order=26 for a two dimensional array frequency coefficient located at n=7 and m=0;

assigns a scanning order=27 for a two dimensional array frequency coefficient located at n=6 and m=2;

assigns a scanning order=28 for a two dimensional array frequency coefficient located at n=6 and m=3;

assigns a scanning order=29 for a two dimensional array frequency coefficient located at n=7 and m=1;

assigns a scanning order=30 for a two dimensional array frequency coefficient located at n=7 and m=2; and assigns a scanning order=31 for a two dimensional array frequency coefficient located at n=7 and m=3 if said scanning order=31.

62. The system of claim 61, wherein if said one dimensional array of said one dimensional array frequency coefficients comprises thirty-two one dimensional array frequency coefficients, wherein said thirty-two one dimensional array frequency coefficients are represented with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, in a numerical sequential order, wherein a first one dimensional array frequency coefficient is represented by p=0 and a thirty-second one dimensional array frequency coefficient is represented by p=31, wherein in scanning said two dimensional array frequency coefficients in a vertically biased manner when said two dimensional array of said two dimensional array frequency coefficients comprises 8 columns of frequency coefficients and 4 rows of frequency coefficients, said encoder further:

assigns a one dimensional array frequency coefficient located at p=0 a value of said two dimensional array frequency coefficient located at n=0 and m=0;

assigns a one dimensional array frequency coefficient located at p=1 a value of said two dimensional array frequency coefficient located at n=0 and m=1;

assigns a one dimensional array frequency coefficient located at p=2 a value of said two dimensional array frequency coefficient located at n=1 and m=0;

assigns a one dimensional array frequency coefficient located at p=3 a value of said two dimensional array frequency coefficient located at n=0 and m=2;

assigns a one dimensional array frequency coefficient located at p=4 a value of said two dimensional array frequency coefficient located at n=0 and m=3;

assigns a one dimensional array frequency coefficient located at p=5 a value of said two dimensional array frequency coefficient located at n=1 and m=1;
assigns a one dimensional array frequency coefficient located at p=6 a value of said two dimensional array frequency coefficient located at n=2 and m=0;
assigns a one dimensional array frequency coefficient located at p=7 a value of said two dimensional array frequency coefficient located at n=1 and m=2;
assigns a one dimensional array frequency coefficient located at p=8 a value of said two dimensional array frequency coefficient located at n=1 and m=3;
assigns a one dimensional array frequency coefficient located at p=9 a value of said two dimensional array frequency coefficient located at n=2 and m=1;
assigns a one dimensional array frequency coefficient located at p=10 a value of said two dimensional array frequency coefficient located at n=3 and m=0;
assigns a one dimensional array frequency coefficient located at p=11 a value of said two dimensional array frequency coefficient located at n=2 and m=2;
assigns a one dimensional array frequency coefficient located at p=12 a value of said two dimensional array frequency coefficient located at n=2 and m=3;
assigns a one dimensional array frequency coefficient located at p=13 a value of said two dimensional array frequency coefficient located at n=3 and m=1;
assigns a one dimensional array frequency coefficient located at p=14 a value of said two dimensional array frequency coefficient located at n=4 and m=0;
assigns a one dimensional array frequency coefficient located at p=15 a value of said two dimensional array frequency coefficient located at n=3 and m=2;
assigns a one dimensional array frequency coefficient located at p=16 a value of said two dimensional array frequency coefficient located at n=3 and m=3;
assigns a one dimensional array frequency coefficient located at p=17 a value of said two dimensional array frequency coefficient located at n=4 and m=1;
assigns a one dimensional array frequency coefficient located at p=18 a value of said two dimensional array frequency coefficient located at n=5 and m=0;
assigns a one dimensional array frequency coefficient located at p=19 a value of said two dimensional array frequency coefficient located at n=4 and m=2;
assigns a one dimensional array frequency coefficient located at p=20 a value of said two dimensional array frequency coefficient located at n=4 and m=3;
assigns a one dimensional array frequency coefficient located at p=21 a value of said two dimensional array frequency coefficient located at n=5 and m=1;
assigns a one dimensional array frequency coefficient located at p=22 a value of said two dimensional array frequency coefficient located at n=6 and m=0;
assigns a one dimensional array frequency coefficient located at p=23 a value of said two dimensional array frequency coefficient located at n=5 and m=2;
assigns a one dimensional array frequency coefficient located at p=24 a value of said two dimensional array frequency coefficient located at n=5 and m=3;
assigns a one dimensional array frequency coefficient located at p=25 a value of said two dimensional array frequency coefficient located at n=6 and m=1;
assigns a one dimensional array frequency coefficient located at p=26 a value of said two dimensional array frequency coefficient located at n=7 and m=0;
assigns a one dimensional array frequency coefficient located at p=27 a value of said two dimensional array frequency coefficient located at n=6 and m=2;
assigns a one dimensional array frequency coefficient located at p=28 a value of said two dimensional array frequency coefficient located at n=6 and m=3;
assigns a one dimensional array frequency coefficient located at p=29 a value of said two dimensional array frequency coefficient located at n=7 and m=1;
assigns a one dimensional array frequency coefficient located at p=30 a value of said two dimensional array frequency coefficient located at n=7 and m=2; and
assigns a one dimensional array frequency coefficient located at p=31 a value of said two dimensional array frequency coefficient located at n=7 and m=3.

63. The system of claim 51, wherein if said two dimensional array of said two dimensional array frequency coefficients comprises 8 columns of frequency coefficients and 8 rows of frequency coefficients, said system:
represents said columns with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column;
represents said rows with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row; and
wherein said encoder sequentially scans said two dimensional array of said two dimensional array frequency coefficients in a sequential scanning order that is vertically biased, said sequential scanning order starting at 0 and ending at 63 and producing said one dimensional array of said one dimensional array frequency coefficients.

64. The system of claim 63 wherein in sequentially scanning said two dimensional array frequency coefficients in a vertically biased manner when said two dimensional array of said two dimensional array frequency coefficients comprises 8 columns of frequency coefficients and 8 rows of frequency coefficients, said encoder:
assigns a scanning order=0 for a two dimensional array frequency coefficient located at n=0 and m=0;
assigns a scanning order=1 for a two dimensional array frequency coefficient located at n=0 and m=1;
assigns a scanning order=2 for a two dimensional array frequency coefficient located at n=0 and m=2;
assigns a scanning order=3 for a two dimensional array frequency coefficient located at n=1 and m=0;
assigns a scanning order=4 for a two dimensional array frequency coefficient located at n=1 and m=1;
assigns a scanning order=5 for a two dimensional array frequency coefficient located at n=0 and m=3;
assigns a scanning order=6 for a two dimensional array frequency coefficient located at n=0 and m=4;
assigns a scanning order=7 for a two dimensional array frequency coefficient located at n=1 and m=2;
assigns a scanning order=8 for a two dimensional array frequency coefficient located at n=2 and m=0;
assigns a scanning order=9 for a two dimensional array frequency coefficient located at n=1 and m=3;
assigns a scanning order=10 for a two dimensional array frequency coefficient located at n=0 and m=5;

assigns a scanning order=11 for a two dimensional array frequency coefficient located at n=0 and m=6;
assigns a scanning order=12 for a two dimensional array frequency coefficient located at n=0 and m=7;
assigns a scanning order=13 for a two dimensional array frequency coefficient located at n=1 and m=4;
assigns a scanning order=14 for a two dimensional array frequency coefficient located at n=2 and m=1;
assigns a scanning order=15 for a two dimensional array frequency coefficient located at n=3 and m=0;
assigns a scanning order=16 for a two dimensional array frequency coefficient located at n=2 and m=2;
assigns a scanning order=17 for a two dimensional array frequency coefficient located at n=1 and m=5;
assigns a scanning order=18 for a two dimensional array frequency coefficient located at n=1 and m=6;
assigns a scanning order=19 for a two dimensional array frequency coefficient located at n=1 and m=7;
assigns a scanning order=20 for a two dimensional array frequency coefficient located at n=2 and m=3;
assigns a scanning order=21 for a two dimensional array frequency coefficient located at n=3 and m=1;
assigns a scanning order=22 for a two dimensional array frequency coefficient located at n=4 and m=0;
assigns a scanning order=23 for a two dimensional array frequency coefficient located at n=3 and m=2;
assigns a scanning order=24 for a two dimensional array frequency coefficient located at n=2 and m=4;
assigns a scanning order=25 for a two dimensional array frequency coefficient located at n=2 and m=5;
assigns a scanning order=26 for a two dimensional array frequency coefficient located at n=2 and m=6;
assigns a scanning order=27 for a two dimensional array frequency coefficient located at n=2 and m=7;
assigns a scanning order=28 for a two dimensional array frequency coefficient located at n=3 and m=3;
assigns a scanning order=29 for a two dimensional array frequency coefficient located at n=4 and m=1;
assigns a scanning order=30 for a two dimensional array frequency coefficient located at n=5 and m=0;
assigns a scanning order=31 for a two dimensional array frequency coefficient located at n=4 and m=2;
assigns a scanning order=32 for a two dimensional array frequency coefficient located at n=3 and m=4;
assigns a scanning order=33 for a two dimensional array frequency coefficient located at n=3 and m=5;
assigns a scanning order=34 for a two dimensional array frequency coefficient located at n=3 and m=6;
assigns a scanning order=35 for a two dimensional array frequency coefficient located at n=3 and m=7;
assigns a scanning order=36 for a two dimensional array frequency coefficient located at n=4 and m=3;
assigns a scanning order=37 for a two dimensional array frequency coefficient located at n=5 and m=1;
assigns a scanning order=38 for a two dimensional array frequency coefficient located at n=6 and m=0;
assigns a scanning order=39 for a two dimensional array frequency coefficient located at n=5 and m=2;
assigns a scanning order=40 for a two dimensional array frequency coefficient located at n=4 and m=4;
assigns a scanning order=41 for a two dimensional array frequency coefficient located at n=4 and m=5;
assigns a scanning order=42 for a two dimensional array frequency coefficient located at n=4 and m=6;
assigns a scanning order=43 for a two dimensional array frequency coefficient located at n=4 and m=7;
assigns a scanning order=44 for a two dimensional array frequency coefficient located at n=5 and m=3;
assigns a scanning order=45 for a two dimensional array frequency coefficient located at n=6 and m=1;
assigns a scanning order=46 for a two dimensional array frequency coefficient located at n=6 and m=2;
assigns a scanning order=47 for a two dimensional array frequency coefficient located at n=5 and m=4;
assigns a scanning order=48 for a two dimensional array frequency coefficient located at n=5 and m=5;
assigns a scanning order=49 for a two dimensional array frequency coefficient located at n=5 and m=6;
assigns a scanning order=50 for a two dimensional array frequency coefficient located at n=5 and m=7;
assigns a scanning order=51 for a two dimensional array frequency coefficient located at n=6 and m=3;
assigns a scanning order=52 for a two dimensional array frequency coefficient located at n=7 and m=0;
assigns a scanning order=53 for a two dimensional array frequency coefficient located at n=7 and m=1;
assigns a scanning order=54 for a two dimensional array frequency coefficient located at n=6 and m=4;
assigns a scanning order=55 for a two dimensional array frequency coefficient located at n=6 and m=5;
assigns a scanning order=56 for a two dimensional array frequency coefficient located at n=6 and m=6;
assigns a scanning order=57 for a two dimensional array frequency coefficient located at n=6 and m=7;
assigns a scanning order=58 for a two dimensional array frequency coefficient located at n=7 and m=2;
assigns a scanning order=59 for a two dimensional array frequency coefficient located at n=7 and m=3;
assigns a scanning order=60 for a two dimensional array frequency coefficient located at n=7 and m=4;
assigns a scanning order=61 for a two dimensional array frequency coefficient located at n=7 and m=5;
assigns a scanning order=62 for a two dimensional array frequency coefficient located at n=7 and m=6; and
assigns a scanning order=63 for a two dimensional array frequency coefficient located at n=7 and m=7.

65. The system of claim 64, wherein if said one dimensional array of said one dimensional array frequency coefficients comprises sixty-four one dimensional array frequency coefficients, wherein said sixty-four one dimensional array frequency coefficients are represented with a variable p=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, in a numerical sequential order, wherein a first one dimensional array frequency coefficient is represented by p=0 and a sixty-fourth one dimensional array frequency coefficient is represented by p=63, wherein in scanning said two dimensional array frequency coefficients in a vertically biased manner when said two dimensional array of said two dimensional array frequency coefficients comprises 8 columns of frequency coefficients and 8 rows of frequency coefficients, said encoder further:
assigns a one dimensional array frequency coefficient located at p=0 a value of said two dimensional array frequency coefficient located at n=0 and m=0;
assigns a one dimensional array frequency coefficient located at p=1 a value of said two dimensional array frequency coefficient located at n=0 and m=1;
assigns a one dimensional array frequency coefficient located at p=2 a value of said two dimensional array frequency coefficient located at n=0 and m=2;

assigns a one dimensional array frequency coefficient located at p=3 a value of said two dimensional array frequency coefficient located at n=1 and m=0;

assigns a one dimensional array frequency coefficient located at p=4 a value of said two dimensional array frequency coefficient located at n=1 and m=1;

assigns a one dimensional array frequency coefficient located at p=5 a value of said two dimensional array frequency coefficient located at n=0 and m=3;

assigns a one dimensional array frequency coefficient located at p=6 a value of said two dimensional array frequency coefficient located at n=0 and m=4;

assigns a one dimensional array frequency coefficient located at p=7 a value of said two dimensional array frequency coefficient located at n=1 and m=2;

assigns a one dimensional array frequency coefficient located at p=8 a value of said two dimensional array frequency coefficient located at n=2 and m=0;

assigns a one dimensional array frequency coefficient located at p=9 a value of said two dimensional array frequency coefficient located at n=1 and m=3;

assigns a one dimensional array frequency coefficient located at p=10 a value of said two dimensional array frequency coefficient located at n=0 and m=5;

assigns a one dimensional array frequency coefficient located at p=11 a value of said two dimensional array frequency coefficient located at n=0 and m=6;

assigns a one dimensional array frequency coefficient located at p=12 a value of said two dimensional array frequency coefficient located at n=0 and m=7;

assigns a one dimensional array frequency coefficient located at p=13 a value of said two dimensional array frequency coefficient located at n=1 and m=4;

assigns a one dimensional array frequency coefficient located at p=14 a value of said two dimensional array frequency coefficient located at n=2 and m=1;

assigns a one dimensional array frequency coefficient located at p=15 a value of said two dimensional array frequency coefficient located at n=3 and m=0;

assigns a one dimensional array frequency coefficient located at p=16 a value of said two dimensional array frequency coefficient located at n=2 and m=2;

assigns a one dimensional array frequency coefficient located at p=17 a value of said two dimensional array frequency coefficient located at n=1 and m=5;

assigns a one dimensional array frequency coefficient located at p=18 a value of said two dimensional array frequency coefficient located at n=1 and m=6;

assigns a one dimensional array frequency coefficient located at p=19 a value of said two dimensional array frequency coefficient located at n=1 and m=7;

assigns a one dimensional array frequency coefficient located at p=20a value of said two dimensional array frequency coefficient located at n=2 and m=3;

assigns a one dimensional array frequency coefficient located at p=21a value of said two dimensional array frequency coefficient located at n=3 and m=1;

assigns a one dimensional array frequency coefficient located at p=22 a value of said two dimensional array frequency coefficient located at n=4 and m=0;

assigns a one dimensional array frequency coefficient located at p=23 a value of said two dimensional array frequency coefficient located at n=3 and m=2;

assigns a one dimensional array frequency coefficient located at p=24 a value of said two dimensional array frequency coefficient located at n=2 and m=4;

assigns a one dimensional array frequency coefficient located at p=25 a value of said two dimensional array frequency coefficient located at n=2 and m=5;

assigns a one dimensional array frequency coefficient located at p=26 a value of said two dimensional array frequency coefficient located at n=2 and m=6;

assigns a one dimensional array frequency coefficient located at p=27 a value of said two dimensional array frequency coefficient located at n=2 and m=7;

assigns a one dimensional array frequency coefficient located at p=28 a value of said two dimensional array frequency coefficient located at n=3 and m=3;

assigns a one dimensional array frequency coefficient located at p=29 a value of said two dimensional array frequency coefficient located at n=4 and m=1;

assigns a one dimensional array frequency coefficient located at p=30 a value of said two dimensional array frequency coefficient located at n=5 and m=0;

assigns a one dimensional array frequency coefficient located at p=31 a value of said two dimensional array frequency coefficient located at n=4 and m=2;

assigns a one dimensional array frequency coefficient located at p=32 a value of said two dimensional array frequency coefficient located at n=3 and m=4;

assigns a one dimensional array frequency coefficient located at p=33 a value of said two dimensional array frequency coefficient located at n=3 and m=5;

assigns a one dimensional array frequency coefficient located at p=34 a value of said two dimensional array frequency coefficient located at n=3 and m=6;

assigns a one dimensional array frequency coefficient located at p=35 a value of said two dimensional array frequency coefficient located at n=3 and m=7;

assigns a one dimensional array frequency coefficient located at p=36 a value of said two dimensional array frequency coefficient located at n=4 and m=3;

assigns a one dimensional array frequency coefficient located at p=37 a value of said two dimensional array frequency coefficient located at n=5 and m=1;

assigns a one dimensional array frequency coefficient located at p=38 a value of said two dimensional array frequency coefficient located at n=6 and m=0;

assigns a one dimensional array frequency coefficient located at p=39 a value of said two dimensional array frequency coefficient located at n=5 and m=2;

assigns a one dimensional array frequency coefficient located at p=40 a value of said two dimensional array frequency coefficient located at n=4 and m=4;

assigns a one dimensional array frequency coefficient located at p=41 a value of said two dimensional array frequency coefficient located at n=4 and m=5;

assigns a one dimensional array frequency coefficient located at p=42 a value of said two dimensional array frequency coefficient located at n=4 and m=6;

assigns a one dimensional array frequency coefficient located at p=43 a value of said two dimensional array frequency coefficient located at n=4 and m=7;

assigns a one dimensional array frequency coefficient located at p=44 a value of said two dimensional array frequency coefficient located at n=5 and m=3;

assigns a one dimensional array frequency coefficient located at p=45 a value of said two dimensional array frequency coefficient located at n=6 and m=1;

assigns a one dimensional array frequency coefficient located at p=46 a value of said two dimensional array frequency coefficient located at n=6 and m=2;

assigns a one dimensional array frequency coefficient located at p=47 a value of said two dimensional array frequency coefficient located at n=5 and m=4;
assigns a one dimensional array frequency coefficient located at p=48 a value of said two dimensional array frequency coefficient located at n=5 and m=5;
assigns a one dimensional array frequency coefficient located at p=49 a value of said two dimensional array frequency coefficient located at n=5 and m=6;
assigns a one dimensional array frequency coefficient located at p=50 a value of said two dimensional array frequency coefficient located at n=5 and m=7;
assigns a one dimensional array frequency coefficient located at p=51 a value of said two dimensional array frequency coefficient located at n=6 and m=3;
assigns a one dimensional array frequency coefficient located at p=52 a value of said two dimensional array frequency coefficient located at n=7 and m=0;
assigns a one dimensional array frequency coefficient located at p=53 a value of said two dimensional array frequency coefficient located at n=7 and m=1;
assigns a one dimensional array frequency coefficient located at p=54 a value of said two dimensional array frequency coefficient located at n=6 and m=4;
assigns a one dimensional array frequency coefficient located at p=55 a value of said two dimensional array frequency coefficient located at n=6 and m=5;
assigns a one dimensional array frequency coefficient located at p=56 a value of said two dimensional array frequency coefficient located at n=6 and m=6;
assigns a one dimensional array frequency coefficient located at p=57 a value of said two dimensional array frequency coefficient located at n=6 and m=7;
assigns a one dimensional array frequency coefficient located at p=58 a value of said two dimensional array frequency coefficient located at n=7 and m=2;
assigns a one dimensional array frequency coefficient located at p=59 a value of said two dimensional array frequency coefficient located at n=7 and m=3;
assigns a one dimensional array frequency coefficient located at p=60 a value of said two dimensional array frequency coefficient located at n=7 and m=4;
assigns a one dimensional array frequency coefficient located at p=61 a value of said two dimensional array frequency coefficient located at n=7 and m=5;
assigns a one dimensional array frequency coefficient located at p=62 a value of said two dimensional array frequency coefficient located at n=7 and m=6; and
assigns a one dimensional array frequency coefficient located at p=63 a value of said two dimensional array frequency coefficient located at n=7 and m=7.

66. The system of claim 51, wherein if said one dimensional array of said one dimensional array frequency coefficients comprises sixty-four one dimensional array frequency coefficients, said system:
represents said sixty-four one dimensional array frequency coefficients with a variable p=0, 1,2,3,4,5,6,7,8,9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, in a numerical sequential order,
wherein a first one dimensional array frequency coefficient is represented by p=0 and a sixty-fourth one dimensional array frequency coefficient is represented by p=63;
wherein said decoder sequentially scans said one dimensional array of said one dimensional array frequency coefficients in said numerical sequential order, said sequential scanning starting at p=0 and ending at p=63 and producing said two dimensional array of said two dimensional array frequency coefficients.

67. The system of claim 66, wherein if said two dimensional array of said two dimensional array frequency coefficients comprises 8 columns of frequency coefficients and 8 rows of frequency coefficients, wherein said columns are represented with a variable n=0, 1, 2, 3, 4, 5, 6, or 7, wherein n=0 is at least one of a first or leftmost column, n=1 is a second column, n=2 is a third column, n=3 is a fourth column, n=4 is a fifth column, n=5 is a sixth column, n=6 is a seventh column, and n=7 is at least one of an eighth or rightmost column, and wherein said rows are represented with a variable m=0, 1, 2, 3, 4, 5, 6, or 7, wherein m=0 is at least one of a first or top row, m=1 is a second row, m=2 is a third row, m=3 is a fourth row, m=4 is a fifth row, m=5 is a sixth row, m=6 is a seventh row, and m=7 is at least one of an eighth or bottom row, wherein in sequentially scanning said one dimensional array frequency coefficients said decoder:
assigns a two dimensional array frequency coefficient located at n=0 and m=0 a value of said one dimensional array frequency coefficient located at p=0;
assigns a two dimensional array frequency coefficient located at n=0 and m=1 a value of said one dimensional array frequency coefficient located at p=1;
assigns a two dimensional array frequency coefficient located at n=0 and m=2 a value of said one dimensional array frequency coefficient located at p=2;
assigns a two dimensional array frequency coefficient located at n=1 and m=0 a value of said one dimensional array frequency coefficient located at p=23;
assigns a two dimensional array frequency coefficient located at n=1 and m=1 a value of said one dimensional array frequency coefficient located at p=4;
assigns a two dimensional array frequency coefficient located at n=0 and m=3 a value of said one dimensional array frequency coefficient located at p=5;
assigns a two dimensional array frequency coefficient located at n=0 and m=4 a value of said one dimensional array frequency coefficient located at p=6;
assigns a two dimensional array frequency coefficient located at n=1 and m=2 a value of said one dimensional array frequency coefficient located at p=7;
assigns a two dimensional array frequency coefficient located at n=2 and m=0 a value of said one dimensional array frequency coefficient located at p=8;
assigns a two dimensional array frequency coefficient located at n=1 and m=3 a value of said one dimensional array frequency coefficient located at p=9;
assigns a two dimensional array frequency coefficient located at n=0 and m=5 a value of said one dimensional array frequency coefficient located at p=10;
assigns a two dimensional array frequency coefficient located at n=0 and m=6 a value of said one dimensional array frequency coefficient located at p=11;
assigns a two dimensional array frequency coefficient located at n=0 and m=7 a value of said one dimensional array frequency coefficient located at p=2;
assigns a two dimensional array frequency coefficient located at n=1 and m=4 a value of said one dimensional array frequency coefficient located at p=3;
assigns a two dimensional array frequency coefficient located at n=2 and m=1 a value of said one dimensional array frequency coefficient located at p=4;

assigns a two dimensional array frequency coefficient located at n=3 and m=0 a value of said one dimensional array frequency coefficient located at p=5;

assigns a two dimensional array frequency coefficient located at n=2 and m=2 a value of said one dimensional array frequency coefficient located at p=6;

assigns a two dimensional array frequency coefficient located at n=1 and m=5 a value of said one dimensional array frequency coefficient located at p=7;

assigns a two dimensional array frequency coefficient located at n=1 and m=6 a value of said one dimensional array frequency coefficient located at p=8;

assigns a two dimensional array frequency coefficient located at n=1 and m=7 a value of said one dimensional array frequency coefficient located at p=9;

assigns a two dimensional array frequency coefficient located at n=2 and m=3 a value of said one dimensional array frequency coefficient located at p=10;

assigns a two dimensional array frequency coefficient located at n=3 and m=1 a value of said one dimensional array frequency coefficient located at p=11;

assigns a two dimensional array frequency coefficient located at n=4 and m=0 a value of said one dimensional array frequency coefficient located at p=22;

assigns a two dimensional array frequency coefficient located at n=3 and m=2 a value of said one dimensional array frequency coefficient located at p=23;

assigns a two dimensional array frequency coefficient located at n=2 and m=4 a value of said one dimensional array frequency coefficient located at p=24;

assigns a two dimensional array frequency coefficient located at n=2 and m=5 a value of said one dimensional array frequency coefficient located at p=25;

assigns a two dimensional array frequency coefficient located at n=2 and m=6 a value of said one dimensional array frequency coefficient located at p=26;

assigns a two dimensional array frequency coefficient located at n=2 and m=7 a value of said one dimensional array frequency coefficient located at p=27;

assigns a two dimensional array frequency coefficient located at n=3 and m=3 a value of said one dimensional array frequency coefficient located at p=28;

assigns a two dimensional array frequency coefficient located at n=4 and m=1 a value of said one dimensional array frequency coefficient located at p=29;

assigns a two dimensional array frequency coefficient located at n=5 and m=0 a value of said one dimensional array frequency coefficient located at p=30;

assigns a two dimensional array frequency coefficient located at n=4 and m=2 a value of said one dimensional array frequency coefficient located at p=31;

assigns a two dimensional array frequency coefficient located at n=3 and m=4 a value of said one dimensional array frequency coefficient located at p=32;

assigns a two dimensional array frequency coefficient located at n=3 and m=5 a value of said one dimensional array frequency coefficient located at p=33;

assigns a two dimensional array frequency coefficient located at n=3 and m=6 a value of said one dimensional array frequency coefficient located at p=34;

assigns a two dimensional array frequency coefficient located at n=3 and m=7 a value of said one dimensional array frequency coefficient located at p=35;

assigns a two dimensional array frequency coefficient located at n=4 and m=3 a value of said one dimensional array frequency coefficient located at p=36;

assigns a two dimensional array frequency coefficient located at n=5 and m=1 a value of said one dimensional array frequency coefficient located at p=37;

assigns a two dimensional array frequency coefficient located at n=6 and m=0 a value of said one dimensional array frequency coefficient located at p=38;

assigns a two dimensional array frequency coefficient located at n=5 and m=2 a value of said one dimensional array frequency coefficient located at p=39;

assigns a two dimensional array frequency coefficient located at n=4 and m=4 a value of said one dimensional array frequency coefficient located at p=40;

assigns a two dimensional array frequency coefficient located at n=4 and m=5 a value of said one dimensional array frequency coefficient located at p=41;

assigns a two dimensional array frequency coefficient located at n=4 and m=6 a value of said one dimensional array frequency coefficient located at p=42;

assigns a two dimensional array frequency coefficient located at n=4 and m=7 a value of said one dimensional array frequency coefficient located at p=43;

assigns a two dimensional array frequency coefficient located at n=5 and m=3 a value of said one dimensional array frequency coefficient located at p=44;

assigns a two dimensional array frequency coefficient located at n=6 and m=1 a value of said one dimensional array frequency coefficient located at p=45;

assigns a two dimensional array frequency coefficient located at n=6 and m=2 a value of said one dimensional array frequency coefficient located at p=46;

assigns a two dimensional array frequency coefficient located at n=5 and m=4 a value of said one dimensional array frequency coefficient located at p=47;

assigns a two dimensional array frequency coefficient located at n=5 and m=5 a value of said one dimensional array frequency coefficient located at p=48;

assigns a two dimensional array frequency coefficient located at n=5 and m=6 a value of said one dimensional array frequency coefficient located at p=49;

assigns a two dimensional array frequency coefficient located at n=5 and m=7 a value of said one dimensional array frequency coefficient located at p=50;

assigns a two dimensional array frequency coefficient located at n=6 and m=3 a value of said one dimensional array frequency coefficient located at p=51;

assigns a two dimensional array frequency coefficient located at n=7 and m=0 a value of said one dimensional array frequency coefficient located at p=52;

assigns a two dimensional array frequency coefficient located at n=7 and m=1 a value of said one dimensional array frequency coefficient located at p=53;

assigns a two dimensional array frequency coefficient located at n=6 and m=4 a value of said one dimensional array frequency coefficient located at p=54;

assigns a two dimensional array frequency coefficient located at n=6 and m=5 a value of said one dimensional array frequency coefficient located at p=55;

assigns a two dimensional array frequency coefficient located at n=6 and m=6 a value of said one dimensional array frequency coefficient located at p=56;

assigns a two dimensional array frequency coefficient located at n=6 and m=7 a value of said one dimensional array frequency coefficient located at p=57;

assigns a two dimensional array frequency coefficient located at n=7 and m=2 a value of said one dimensional array frequency coefficient located at p=58;

assigns a two dimensional array frequency coefficient located at n=7 and m=3 a value of said one dimensional array frequency coefficient located at p=59;

assigns a two dimensional array frequency coefficient located at n=7 and m=4 a value of said one dimensional array frequency coefficient located at p=60;

assigns a two dimensional array frequency coefficient located at n=7 and m=5 a value of said one dimensional array frequency coefficient located at p=61;

assigns a two dimensional array frequency coefficient located at n=7 and m=6 a value of said one dimensional array frequency coefficient located at p=62; and assigns a two dimensional array frequency coefficient located at n=7 and m=7 a value of said one dimensional array frequency coefficient located at p=63.

* * * * *

UNITED STATES PATENT AND TRADEMARK OFFICE
CERTIFICATE OF CORRECTION

PATENT NO. : 7,555,044 B2  Page 1 of 1
APPLICATION NO. : 10/679911
DATED : June 30, 2009
INVENTOR(S) : Wang et al.

It is certified that error appears in the above-identified patent and that said Letters Patent is hereby corrected as shown below:

Column 35, Line 1, in Claim 18, delete "n1" and insert --n=1--
Column 64, Line 41, in Claim 40, delete "m0" and insert --m=0--

Signed and Sealed this

Sixth Day of July, 2010

David J. Kappos
*Director of the United States Patent and Trademark Office*